United States Patent
Ryu et al.

(10) Patent No.: US 9,814,017 B2
(45) Date of Patent: Nov. 7, 2017

(54) METHOD AND APPARATUS FOR PROVIDING NOTIFICATION

(71) Applicant: SAMSUNG ELECTRONICS CO., LTD., Suwon-si (KR)

(72) Inventors: Jong-hyun Ryu, Daejeon (KR); Han-joo Chae, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/590,699

(22) Filed: Jan. 6, 2015

(65) Prior Publication Data

US 2015/0341901 A1 Nov. 26, 2015

(30) Foreign Application Priority Data

May 23, 2014 (KR) ........................ 10-2014-0062622

(51) Int. Cl.
*H04W 68/00* (2009.01)
*H04W 68/02* (2009.01)
*H04W 88/02* (2009.01)
*H04W 92/18* (2009.01)
*H04W 4/20* (2009.01)
*H04M 1/725* (2006.01)

(52) U.S. Cl.
CPC ......... *H04W 68/02* (2013.01); *H04M 1/7253* (2013.01); *H04M 1/72569* (2013.01); *H04W 4/20* (2013.01); *H04W 88/02* (2013.01); *H04W 92/18* (2013.01); *H04M 2250/12* (2013.01)

(58) Field of Classification Search
CPC ...... H04W 68/02; H04W 88/02; H04W 92/18
USPC .......................................................... 455/458
See application file for complete search history.

(56) References Cited

U.S. PATENT DOCUMENTS

| | | | |
|---|---|---|---|
| 8,744,113 B1 * | 6/2014 | Rickards | 381/381 |
| 9,197,738 B2 | 11/2015 | Peev et al. | |
| 2002/0167488 A1 | 11/2002 | Hinckley et al. | |
| 2004/0030753 A1 | 2/2004 | Horvitz | |
| 2004/0046667 A1 * | 3/2004 | Copley | 340/573.4 |
| 2005/0195805 A1 | 9/2005 | Hanaoka et al. | |
| 2005/0272408 A1 | 12/2005 | Wilkes-Gibbs et al. | |

(Continued)

FOREIGN PATENT DOCUMENTS

| | | |
|---|---|---|
| JP | 2013-93893 A | 5/2013 |
| KR | 10-2007-0090815 A | 9/2007 |

(Continued)

OTHER PUBLICATIONS

Communication dated Mar. 20, 2015 issued by the International Searching Authority in counterpart International Patent Application No. PCT/KR2014/012465.

(Continued)

*Primary Examiner* — Nader Bolourchi
(74) *Attorney, Agent, or Firm* — Sughrue Mion, PLLC

(57) ABSTRACT

An electronic device is provided. The electronic device includes: a transceiver configured to communicate with at least one wearable device and receive, from the at least one wearable device, status information indicating whether the at least one wearable device is currently being worn; and a processor configured to determine whether to send a notification request to the at least one wearable device based on the status information received by the transceiver.

17 Claims, 69 Drawing Sheets

(56) References Cited

U.S. PATENT DOCUMENTS

| | | | |
|---|---|---|---|
| 2006/0036642 A1 | 2/2006 | Horvitz et al. | |
| 2006/0282021 A1* | 12/2006 | DeVaul et al. | 600/595 |
| 2008/0146892 A1* | 6/2008 | LeBoeuf et al. | 600/300 |
| 2010/0177599 A1* | 7/2010 | Pan | 368/11 |
| 2011/0080289 A1 | 4/2011 | Minton | |
| 2011/0234414 A1 | 9/2011 | Ojeda et al. | |
| 2012/0052922 A1* | 3/2012 | Li | 455/567 |
| 2012/0218101 A1 | 8/2012 | Ford | |
| 2013/0002441 A1 | 1/2013 | Khan | |
| 2013/0325922 A1 | 12/2013 | Chaudhri et al. | |
| 2015/0182163 A1* | 7/2015 | Utter | 600/301 |
| 2015/0279168 A1* | 10/2015 | Avrahami | 340/539.11 |

FOREIGN PATENT DOCUMENTS

| | | | |
|---|---|---|---|
| KR | 10-2012-0103129 A | 9/2012 | |
| KR | 10-2014-0008495 A | 1/2014 | |
| RU | 2011 122 602 A | 12/2012 | |

OTHER PUBLICATIONS

Communication dated Aug. 19, 2015, issued by the International Searching Authority in counterpart International Application No. PCT/KR2015/004835 (PCT/ISA/210, 220, 237).
Communication dated Sep. 5, 2016, issued by the European Patent Office in counterpart European Application No. 15734551.3.
Communication dated Jul. 28, 2017 by the Australian Patent Office in counterpart Australian Patent Application No. 2014394452.
Communication dated Sep. 14, 2017 issued by the Russian Patent Office in counterpart Russian Patent Application No. 2016150654.

* cited by examiner

FIG. 3

| WEARING STATE | WHEN LOCKING STRUCTURE OF WEARABLE DEVICE IS FASTENED, AND REFERENCE TIME OR LESS PASSES AFTER MOTION OF WEARABLE DEVICE IS DETECTED |
|---|---|
| | WHEN REFERENCE TIME OR LESS PASSES AFTER BIO-SIGNAL IS DETECTED IN WEARABLE DEVICE |
| | WHEN LOCKING STRUCTURE OF WEARABLE DEVICE IS FASTENED AND BIO-SIGNAL IS DETECTED IN WEARABLE DEVICE |

FIG. 9

| SOUND NOTIFICATION | VIBRATION NOTIFICATION | SCREEN NOTIFICATION |
|---|---|---|
| SMART GLASSES | SMART WATCH | SMART GLASSES |
| SMART WATCH | SMART BAND | SMART WATCH |
| SMART BAND | SMART GLASSES | ⋮ |
| ⋮ | ⋮ | |

FIG. 12

| IN USE | WHEN MUSIC OR VIDEO IS BEING REPRODUCED |
| --- | --- |
| | WHEN REFERENCE TIME OR LESS PASSES AFTER USER INPUT IS DETECTED |
| | WHEN SCREEN IS BEING UPDATED ACCORDING TO USER COMMAND |
| | SCREEN IS TURNED ON |

FIG. 19

| FUNCTION THAT DOES NOT PERMIT NOTIFICATION TO BE PROVIDED | GAME |
| --- | --- |
| | NAVIGATION |
| | VIDEO REPRODUCTION |
| | PRESENTATION |
| | ⋮ |

FIG. 30

| RECOGNIZABLE | WHEN DEVICE IS HELD WITH USER'S HAND |
| --- | --- |
| | WHEN DEVICE IS HELD BY CAR HOLDER AND NAVIGATION IS NOT RUN |
| | WHEN MUSIC IS BEING REPRODUCED |
| | WHEN CONVERSATION IS BEING CONDUCTED |
| | WHEN USER'S EYE CONTACT IS DETECTED |
| NON-RECOGNIZABLE | WHEN USER IS DRIVING CAR |
| | WHEN USER IS ON MOVE |
| | IN THEATER |
| | DO-NOT-DISTURB MODE, AIRPLANE MODE |
| | WHEN PHONE CALL IS BEING MADE |
| | WHEN DEVICE IS PUT IN BAG/POCKET |

FIG. 38

| TYPE OF NOTIFICATION EVENT | DEVICE TO WHICH NOTIFICATION IS TO BE PROVIDED |
|---|---|
| CALL | ELECTRONIC DEVICE AND SMART WATCH |
| DISCONNECTED FROM ELECTRONIC DEVICE | ELECTRONIC DEVICE |
| LOW BATTERY CAPACITY | ELECTRONIC DEVICE AND DEVICE HAVING LOW BATTERY CAPACITY |
| ⋮ | ⋮ |

FIG. 44

| WHEN SOUND NOTIFICATION IS INAPPROPRIATE | WHEN INTENSITY OF NOISE IS EQUAL TO OR GREATER THAN REFERENCE LEVEL |
|---|---|
| | DURING LECTURE |
| | IN THEATER |
| | ⋮ |

FIG. 45

| Type of notification of event | State of smart watch | State of smart phone | Notification of smart watch | | Notification in smart phone | | | | |
|---|---|---|---|---|---|---|---|---|---|
| | | | VIBRATION | SCREEN IS TURNED ON | VIBRATION | SOUND | SOUND OUTPUT VIA EARPHONE | SCREEN IS TURNED ON | FLICKERING OF LED |
| NOTIFICATION EVENT EXCEPT FOR CALL | WEARING | WHEN DEVICE IS IN USE | X | X | O | O | O | O | X |
| | | WHEN MUSIC IS BEING REPRODUCED | O | O | X | O | O | O | X |
| | | WHEN DEVICE IS PUT ON TABLE | O | O | X | X | X | O | X |
| | | WHEN DEVICE IS IN POCKET/BAG | O | O | X | X | X | O | X |
| | | WHEN DEVICE IS HELD WITH USER'S HAND (DEVICE IS NOT IN USE) | X | O | X | X | X | O | X |
| | | WHEN DEVICE IS HELD BY CAR HOLDER | X | X | O | O | O | O | X |
| | | WHEN DEVICE IS IN USE | X | X | O | O | O | O | X |
| | | WHEN MUSIC IS BEING REPRODUCED | O | O | X | O | O | O | X |
| | | WHEN DEVICE IS PUT ON TABLE | O | O | X | X | X | O | X |
| | | WHEN DEVICE IS IN POCKET/BAG | O | O | X | X | X | O | X |
| | | WHEN DEVICE IS HELD WITH USER'S HAND (DEVICE IS NOT IN USE) | X | X | O | O | O | O | X |
| | NOT WEARING | WHEN DEVICE IS IN USE | X | X | O | O | O | O | X |
| | | WHEN MUSIC IS BEING REPRODUCED | X | O | O | O | O | O | X |
| | | WHEN DEVICE IS PUT ON TABLE | O | O | O | O | O | O | X |
| | | WHEN DEVICE IS IN POCKET/BAG | O | O | O | O | O | O | X |
| | | WHEN DEVICE IS HELD WITH USER'S HAND (DEVICE IS NOT IN USE) | X | X | O | O | O | O | X |
| | | WHEN DEVICE IS HELD BY CAR HOLDER | X | X | X | O | O | O | X |

FIG. 46

| TYPE OF NOTIFICATION OF EVENT | STATE OF SMART WATCH | STATE OF SMART PHONE | NOTIFICATION OF SMART WATCH | | NOTIFICATION IN SMART PHONE | | | | |
|---|---|---|---|---|---|---|---|---|---|
| | | | VIBRATION | SCREEN IS TURNED ON | VIBRATION | SOUND | SOUND OUTPUT VIA EARPHONE | SCREEN IS TURNED ON | FLICKERING OF LED |
| DISCONNECTED | WHEN DEVICE IS IN USE | WHEN DEVICE IS IN USE | X | X | O | O | O | O | X |
| | | WHEN MUSIC IS BEING REPRODUCED | O | O | X | X | X | X | O |
| | | WHEN DEVICE IS PUT ON TABLE | O | O | X | X | X | X | O |
| | | WHEN DEVICE IS IN POCKET/BAG | O | O | X | X | X | X | O |
| | | WHEN DEVICE IS HELD WITH USER'S HAND (DEVICE IS NOT IN USE) | O | O | X | X | X | X | O |
| | | WHEN DEVICE IS HELD BY CAR HOLDER | X | X | X | O | O | O | X |
| | WEARING | WHEN DEVICE IS IN USE | X | X | O | O | O | O | X |
| | | WHEN MUSIC IS BEING REPRODUCED | O | O | X | X | X | X | O |
| | | WHEN DEVICE IS PUT ON TABLE | O | O | X | X | X | X | O |
| | | WHEN DEVICE IS IN POCKET/BAG | O | O | X | X | X | X | O |
| | | WHEN DEVICE IS HELD WITH USER'S HAND (DEVICE IS NOT IN USE) | O | O | X | X | X | X | O |
| | | WHEN DEVICE IS HELD BY CAR HOLDER | X | X | X | O | O | X | O |
| | NOT WEARING | WHEN DEVICE IS IN USE | X | X | O | O | O | O | X |
| | | WHEN MUSIC IS BEING REPRODUCED | X | X | O | O | O | O | X |
| | | WHEN DEVICE IS PUT ON TABLE | O | O | O | O | O | X | O |
| | | WHEN DEVICE IS IN POCKET/BAG | O | O | O | O | O | X | O |
| | | WHEN DEVICE IS HELD WITH USER'S HAND (DEVICE IS NOT IN USE) | X | X | O | O | O | X | O |
| | | WHEN DEVICE IS HELD BY CAR HOLDER | X | X | X | O | O | O | X |

METHOD AND APPARATUS FOR PROVIDING NOTIFICATION

RELATED APPLICATIONS

This application claims the priority from Korean Patent Application No. 10-2014-0062622, filed on May 23, 2014 in the Korean Intellectual Property Office, the disclosure of which is incorporated herein in its entirety by reference.

BACKGROUND

1. Field

Methods and apparatuses consistent with exemplary embodiments relate to providing a notification from an electronic device.

2. Description of the Related Art

Various types of electronic devices, such as smartphones, smart watches, smart glasses, and tablet personal computers (PCs), have been developed. Situations or environments in which various types of electronic devices are used may vary according to the features thereof. Also, different types of electronic devices are often used together such that communication can be established therebetween. For example, a smartphone and a smart watch may be used together such that communication can be established therebetween.

A user may receive various types of notifications while using an electronic device. For example, the user may receive various types of notifications, such as a text message, an email, a message of a messenger application, etc. Accordingly, there is a need to develop a method of appropriately providing a notification to a user when the user uses various types of electronic devices together.

SUMMARY

One or more exemplary embodiments relate to preventing a notification that a user is not likely to check from being provided.

One or more exemplary embodiments relate to increasing a probability that a user will immediately check a notification.

One or more exemplary embodiments relate to providing a notification such that a user is not interrupted by the notification.

One or more exemplary embodiments relate to providing a wearable device with a notification in an appropriate form when an electronic device and the wearable device operate while communicating with each other.

Additional aspects will be set forth in part in the description which follows and, in part, will be apparent from the description, or may be learned by practice of the presented exemplary embodiments.

According to an aspect of an exemplary embodiment, there is provided an electronic device including a communication unit for communicating with at least one wearable device; a processor for obtaining information indicating whether the at least one wearable device is worn by a user, and requesting a wearable device that is being worn to provide a notification; and a notification providing unit for providing the notification.

When any one of the at least one wearable device is not worn, the notification providing unit may provide the notification.

The processor may control the notification to be provided to a device that is being used by the user from among the electronic device and the at least one wearable device When any one of the at least one wearable device is not worn, the processor may stand by until wearing of any one of the at least one wearable device is detected, and request a wearable device that is detected as being worn to provide the notification When a device that is in use is present among the electronic device and the at least one wearable device, the processor may determine whether the notification is permitted to be provided to the device in use while a function is performed by the device in use, and control the notification to be provided to the device in use when the notification is permitted to be provided.

The processor may obtain information regarding a remaining charge capacity of a battery of the wearable device that is being worn, and request the wearable device that is being worn to provide the notification when the remaining charge capacity of the battery of the wearable device that is being worn is equal to or greater than a reference level.

The electronic device may further include a sensor unit for sensing a state of the electronic device. The processor may obtain information regarding a state of the at least one wearable device, and determine a form of the notification based on at least one selected from the state of the electronic device and the state of the at least one wearable device.

The processor may transform a notification request protocol, which is to be transmitted to the wearable device that is being worn to provide the notification, based on at least one selected from an operating system and a protocol of the wearable device that is being worn.

The notification providing unit may provide the notification. The processor may provide the notification to a plurality of devices among the electronic device and the at least one wearable device, and cancel the notification provided to remaining devices when a device among the plurality of devices checks the notification According to an aspect of another exemplary embodiment, there is provided a method of providing a notification from an electronic device to at least one wearable device capable of communicating with the electronic device, the method obtaining information indicating whether the at least one wearable device is worn by a user; and requesting a wearable device that is being worn to provide the notification.

The method may further include providing the notification by the electronic device when any one of the at least one wearable device is not worn The method may further include controlling a device that is being used by the user to provide the notification from among the electronic device and the at least one wearable device.

The method may further include standing by until wearing of any one of the at least one wearable device is detected and requesting a wearable device that is detected as being worn to provide the notification, when any one of the at least one wearable device is not worn.

When a device that is in use is present among the electronic device and the at least one wearable device, the method may further include determining whether the notification is permitted to be provided to the device in use while a function is performed by the device in use; and controlling the notification to be provided to the device in use when the notification is permitted to be provided.

The method may further include obtaining information regarding a remaining charge capacity of a battery of the wearable device that is being worn. The requesting to provide the notification may include requesting the wearable device that is being worn to provide the notification when the remaining charge capacity of the battery of the wearable device, that is being worn, is equal to or greater than a reference level.

The method may further include sensing a state of the electronic device; obtaining information regarding a state of the at least one wearable device; and determining a form of the notification, based on at least one selected from the state of the electronic device and the state of the at least one wearable device The method may further include transforming a notification request protocol, which is to be transmitted to the wearable device that is being worn to provide the notification, based on at least one selected from an operating system and a protocol of the wearable device that is being worn.

The method may further include providing a notification regarding a notification event to the electronic device; and providing the notification to a plurality of devices among the electronic device and the at least one wearable device, and canceling the notification provided to remaining devices when a device among the plurality of devices checks the notification.

According to an aspect of another exemplary embodiment, there is provided a wearable device including a communication unit for communicating with at least one electronic device; a processor for obtaining information indicating whether the wearable device is worn by a user; and a notification providing unit for providing a notification when the wearable device is worn.

When the wearable device is not worn, the processor may request the electronic device to provide a notification.

According to an aspect of another exemplary embodiment, there is provided an electronic device including: a transceiver configured to communicate with at least one wearable device and receive, from the at least one wearable device, status information indicating whether the at least one wearable device is currently being worn; and a processor configured to determine whether to send a notification request to the at least one wearable device based on the status information received by the transceiver.

The processor may be further configured to, in response to the status information indicating that the at least one wearable device is currently being worn, control the transceiver to send the notification request to the at least one wearable device.

The processor may be further configured to determine whether to send the notification request to the at least one wearable device based on the status information, in response to an occurrence of an event at the electronic device.

The event may be at least one of a text message event, an appointment reminder event, a system event, a social network event, a phone call event, an e-mail event, a low battery event, and a change of setting event.

The at least one wearable device may include a plurality of wearable devices. The processor may be further configured to set an order of notification to the plurality of wearable devices based on the status information.

The processor may be further configured to determine whether to send the notification request to a wearable device from among the plurality of wearable devices based on the status information and the order of notification.

The processor may be further configured to control the transceiver to send a plurality of notification requests to the plurality of wearable devices according to the order of notification.

The processor may be further configured to, in response to the status information indicating that the at least one wearable device is currently in use, control the transceiver to send the notification to the at least one wearable device.

The processor may be further configured to determine whether the electronic device is currently in use, and in response to determining that the electronic device is currently in use, the processor may control to provide the notification on the electronic device and determine not to send the notification request to the at least one wearable device.

The processor may be further configured to determine whether the electronic device is currently in use, and in response to determining that the electronic device is currently in use, the processor may control the transceiver to send the notification request to the at least one wearable device based on the status information and determine not to provide the notification on the electronic device.

According to an aspect of another exemplary embodiment, there is provided a method for providing a notification from an electronic device is provided, the method including: receiving, from at least one wearable device, status information indicating whether the at least one wearable device is currently being worn; and determining whether to send a notification request to the at least one wearable device based on the status information.

The method may further include: in response to the status information indicating that the at least one wearable device is currently being worn, sending the notification request to the at least one wearable device.

The determining may further include determining whether to send the notification request to the at least one wearable device based on the status information in response to an occurrence of an event at the electronic device.

The event may include at least from among a text message event, an appointment reminder event, a system event, a social network event, a phone call event, an e-mail event, a low battery event, and a change of setting event.

The at least one wearable device may include a plurality of wearable devices. The method may further include setting an order of notification to the plurality of wearable devices based on the status information.

The determining further may include determining whether to send the notification request to a wearable device from among the plurality of wearable devices based on the status information and the order of notification.

The method may further include sending a plurality of notification requests to the plurality of wearable devices according to the order of notification.

The method may further include in response to the status information indicating that the at least one wearable device is currently in use, sending the notification request to the at least one wearable device.

The method may further include determining whether the electronic device is currently in use. The determining whether to send the notification request to the at least one wearable device may include determining whether to send the notification request to the at least one wearable device based on the status information and based on a result of the determining whether the electronic device is currently in use The method may further include sending the notification request to the at least one wearable device in response to determining the electronic device is currently in use.

The method may further include providing the notification on the electronic device in response to determining the electronic device is currently in use.

According to an aspect of another exemplary embodiment, there is provided a wearable device including: a transceiver configured to communicate with an electronic device; a notification provider configured to provide a notification; and a processor configured to control the transceiver to transmit status information to the electronic device and, in response to the transceiver receiving a notification request generated by the electronic device based on the transmitted status information, control the notification provider to provide the notification.

The status information may include information indicating that the wearable device is currently being worn.

The wearable device may include a sensor configured to detect whether the wearable device is currently being worn.

The sensor may be at least one from among a touch sensor, biosensor, a gyroscope, and an accelerometer.

The status information may include information indicating that the wearable device is currently in use.

According to an aspect of another exemplary embodiment, there is provided a method for providing a notification on a wearable device, the method including: transmitting status information to an electronic device; receiving, from the electronic device, a notification request generated by the electronic device based on the transmitted status information; and providing a notification in response to the notification request.

The status information may include information indicating that the wearable device is currently being worn.

The status information may include information indicating that the wearable device is currently in use.

BRIEF DESCRIPTION OF THE DRAWINGS

These and/or other aspects will become apparent and more readily appreciated from the following description of the exemplary embodiments, taken in conjunction with the accompanying drawings in which:

FIG. 3 is a diagram illustrating criteria for determining whether a wearable device is worn according to an exemplary embodiment;

FIG. 9 is a table illustrating preset priorities according to an exemplary embodiment;

FIG. 12 is a table illustrating cases in which it is determined that a device is in use according to an exemplary embodiment;

FIG. 19 is a table illustrating a list of functions that do not permit a notification to be provided while the functions are performed according to an exemplary embodiment;

FIG. 30 is a table illustrating criteria for determining whether a device is a recognizable device and a non-recognizable device according to an exemplary embodiment;

FIG. 38 is a table illustrating a device that is predetermined to provide a notification according to the form of a notification event according to an exemplary embodiment;

FIG. 44 is a table illustrating a list of cases in which a sound notification is not appropriate according to an exemplary embodiment;

FIG. 45 is a table illustrating examples of a predetermined device that will provide a notification and a predetermined form of the notification according to an exemplary embodiment;

FIG. 46 is a table illustrating examples of predetermined criteria for a device that will provide a notification of a notification event that communication between a smart watch and an electronic device is disconnected and a form of the notification when the smart watch and the electronic device are used together, according to an exemplary embodiment;

DETAILED DESCRIPTION

Figure 1:
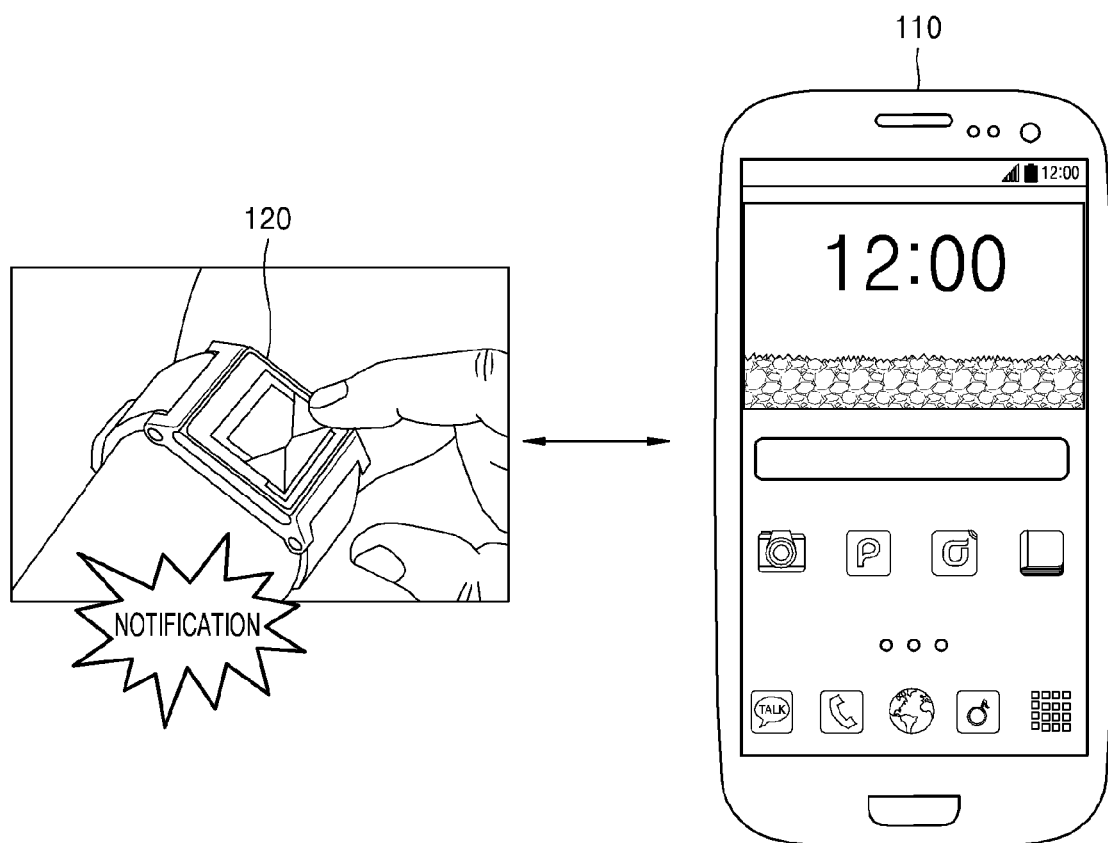
FIG. 1 is a diagram illustrating an electronic device and a wearable device according to an exemplary embodiment.

The advantages and features, and methods of accomplishing them will be apparent from exemplary embodiments that will be described below and the accompanying drawings. The exemplary embodiments may, however, be embodied in many different forms and should not be construed as being limited to the exemplary embodiments set forth herein. Rather, these exemplary embodiments are provided so that this disclosure will be thorough and complete and will fully convey the inventive concept to those of ordinary skill in the art. The spirit and scope of the inventive concept are defined by the appended claims.

The terms used herein will be briefly described and then the exemplary embodiments will be described in detail.

In the present disclosure, general terms are selected, if possible, in consideration of functions of the exemplary embodiments, but non-general terms may be selected according to the intentions of technicians in the this art, precedents, or new technologies, etc. Also, some terms may be arbitrarily chosen by the present applicant. In this case, the meanings of these terms will be explained in corresponding parts of the present disclosure in detail. Thus, the terms used herein should be defined not based on the names thereof but based on the meanings thereof and the whole context of the exemplary embodiments.

In the present disclosure, it should be understood that the terms, such as 'include' or 'have,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Also, the term 'unit' should be understood as software or a hardware element, such as a field-programmable gate array (FPGA) or an application specific integrated circuit (ASIC). The term 'unit' is capable of performing functions. However, the term 'unit' is not limited to software or hardware. The term 'unit' may be an element that can be configured to be included in an addressable storage medium or can be configured to reproduce one or more processors. Thus, examples of the term 'unit' may include elements (such as software elements, object-oriented software elements, class elements, and task elements), processes, functions, attributes, procedures, subroutines, segments of program code, drivers, firmware, micro-codes, circuits, data, a database, data structures, tables, arrays, and variables. Functions provided in elements and units may be combined using a smaller number of elements and units or may be subdivided using additional elements and units.

As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments will be described in detail with reference to the accompanying drawings so that those of ordinary skill in the art can easily accomplish them. Also, parts that are not related to describing the exemplary embodiments are omitted in the drawings for clarity.

FIG. 1 is a diagram illustrating an electronic device 110 and at least one wearable device 120 according to an exemplary embodiment.

According to one or more exemplary embodiments, the electronic device 110 and the at least one wearable device 120 operate while communicating with each other. According to the current exemplary embodiment, the at least one wearable device 120 may provide a notification regarding a notification event occurring in the electronic device 110, and the electronic device 110 may provide a notification regarding a notification event occurring in the at least one wearable device 120.

The electronic device 110 may be embodied, for example, as a smartphone, a tablet personal computer (PC), a camera, a television, a home system control device, an automobile, etc.

The at least one wearable device 120 may be embodied, for example, as a smart watch, smart glasses, smart earphones, smart shoes, a smart ring, a smart bracelet, an automobile, etc.

According to the current exemplary embodiment, when a notification occurs in the electronic device 110 or the at least one wearable device 120, the notification may be provided by the at least one wearable device 120, the electronic device 110, or both the electronic device 110 and the at least one wearable device 120, based on whether the at least one wearable device 120 is worn or not by a user.

According to one exemplary embodiment, the number of the electronic device 110 is one and the number of the at least one wearable device 120 is one or more.

The notification event is an event that a notification should be immediately provided to a user. Examples of the notification event include receiving a phone call, receiving a text message, receiving a messenger application message, receiving an email, a schedule notification, a notification of a social network service (SNS) application, notifications of various other applications, operating system notification, etc. According to one exemplary embodiment, a form of the notification event may be set by a user based on a setting menu of the electronic device 110.

Figure 2:
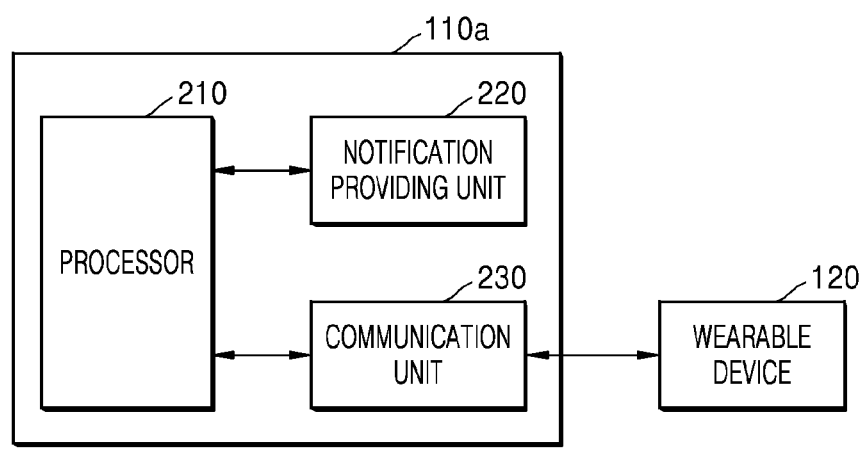
FIG. 2 is a block diagram of a structure of an electronic device according to an exemplary embodiment.

FIG. 2 is a block diagram of a structure of an electronic device 110a according to an exemplary embodiment.

According to the current exemplary embodiment, the electronic device 110a includes a processor 210, a notification providing unit 220 (e.g., a notification provider), and a communication unit 230 (e.g., a transceiver).

The processor 210 controls overall operations of the electronic device 110a. According to the current exemplary embodiment, the processor 210 detects a notification event and determines a device that will provide a notification regarding the notification event. A device that will provide the notification regarding the notification event may be one or more devices selected from among the electronic device 110a and at least one wearable device 120 that communicates with the electronic device 110a.

The processor 210 may determine the device that will provide the notification regarding the notification event, based on information indicating whether the at least one wearable device 120 is worn by a user. According to one exemplary embodiment, the processor 210 provides the notification to the at least one wearable device 120 when the at least one wearable device 120 is in a wearing state, and provides the notification using the notification providing unit 220 of the electronic device 110a when the at least one wearable device 120 is in a non-wearing state. In one exemplary embodiment, when the notification is provided to the at least one wearable device 120, the electronic device 110a may also provide the notification or may not provide the notification.

In the present disclosure, the term 'wearing state' means a state in which a user wears the at least one wearable device 120 and the term 'non-wearing state' means a state in which the user does not wear the at least one wearable device 120.

According to one exemplary embodiment, the information indicating whether the at least one wearable device 120 is worn includes sensing values of sensors included in the at least one wearable device 120. The sensing values may include, for example, a value indicating whether a locking structure is fastened, information regarding motion detection, a bio-signal, etc. According to the present exemplary embodiment, the processor 210 may determine whether the at least one wearable device 120 is in the wearing state or the non-wearing state, based on the information indicating whether the at least one wearable device 120 is worn.

According to another exemplary embodiment, the information indicating whether the at least one wearable device 120 is worn is information indicating whether the at least one wearable device 120 is in the wearing state or the non-wearing state. According to the current exemplary embodiment, whether the at least one wearable device 120 is in the wearing state or the non-wearing state is determined.

According to one exemplary embodiment, the processor 210 may receive the information indicating whether the at least one wearable device 120 is worn by requesting the at least one wearable device 120 to provide this information.

According to another exemplary embodiment, the at least one wearable device 120 may periodically transmit this information to the electronic device 110a, and the electronic device 110a may store this information in a storage unit (not shown) thereof. The processor 210 may obtain the information stored in the storage unit to determine a device to which the notification regarding the notification event is to be provided.

When the electronic device 110a is determined to provide the notification, the notification providing unit 220 provides the notification. The notification may be provided, for example, in the form of sound, vibration, turning on of a screen, flickering of a light-emitting diode (LED), etc.

The communication unit 230 communicates with at least one wearable device 120. The communication unit 230 may transmit a control signal, a signal indicating the state of the electronic device 110a, or data to the at least one wearable device 120, or receive a control signal, a signal indicating the state of the at least one wearable device 120, or data from the at least one wearable device 120.

When it is determined that the at least one wearable device 120 provides the notification or both the electronic device 110a and the at least one wearable device 120 provide the notification, the processor 210 transmits a notification request to the at least one wearable device 120 to provide the notification, via the communication unit 230. When receiving the notification request from the electronic device 110a, the at least one wearable device 120 provides the notification.

According to one exemplary embodiment, the notification request may include information regarding the type of the notification, contents of the notification, and form of the notification. The type of the notification may include, for example, a text message, a phone call, an email, a messenger message, an SNS notification, an application notification, etc. The contents of the notification may include, for example, the transmitter and contents of a text message, the caller of the phone call, the transmitter and contents of a messenger message, the contents of an SNS notification, the contents of an application notification, etc. Also, the contents of the notification may include an icon, a picture, text and/or other graphic, or the like to be displayed when the notification is provided. The form of the notification may include, for example, sound, vibration, turning on of a screen, flickering of an LED, etc.

FIG. 3 is a diagram illustrating criteria for determining whether a wearable device is worn according to an exemplary embodiment.

As described above, according to exemplary embodiments, whether the wearable device is in the wearing state or the non-wearing state may be determined by the processor 210 of the electronic device 110*a* or the at least one wearable device 120. For example, it is determined that the at least one wearable device 120 is in the wearing state in a case in which a locking structure of the at least one wearable device 120 is fastened and a reference time or less passes after a motion of the at least one wearable device 120 is detected, a case in which a reference time or less passes after a bio-signal is detected by the at least one wearable device 120, or a case in which the locking structure of the at least one wearable device 120 is fastened and a bio-signal is detected from the at least one wearable device 120.

Whether the locking structure of the at least one wearable device 120 is fastened may be determined using a sensing value of a sensor included in the locking structure of the at least one wearable device 120. Examples of the sensor included in the locking structure may include a conductive sensor, a hall sensor, a magnetic sensor, etc.

A motion of the at least one wearable device 120 may be detected using a motion sensor or an acceleration sensor included in the at least one wearable device 120.

The at least one wearable device 120 may include a biosensor that detects a bio-signal and is thus capable of detecting a bio-signal. Examples of the biosensor may include a heart rate sensor, a pulse sensor, a blood pressure sensor, a sweat sensor, a body temperature sensor, an iris sensor, a fingerprint sensor, etc.

Figure 4:
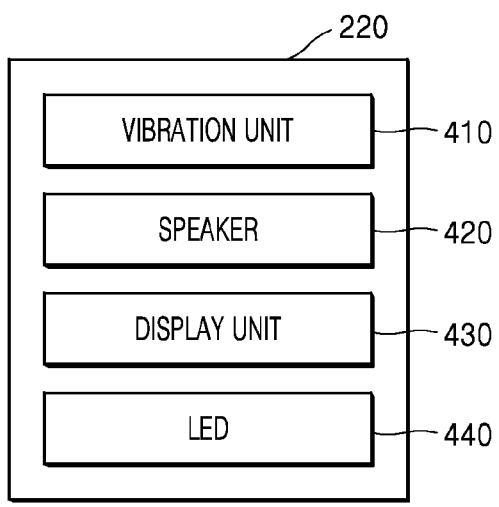
FIG. 4 is a block diagram of a structure of a notification providing unit according to an exemplary embodiment.

FIG. 4 is a block diagram of a structure of a notification providing unit 220 according to an exemplary embodiment.

According to the current exemplary embodiment, the notification providing unit 220 may include at least one selected from among a vibration unit 410 (e.g. a vibrator), a speaker 420, a display unit 430, and an LED 440. In one exemplary embodiment, the vibration unit 410, the speaker 420, the display unit 430, and the LED 440 may be selectively included.

The vibration unit 410 generates vibration in the electronic device 110*a* of FIG. 2 by using a motor or the like. According to the current exemplary embodiment, when the vibration unit 410 provides a notification in the form of vibration, the vibration unit 410 may provide the notification in the form of vibration having a predetermined pattern.

The speaker 420 outputs sound. According to the current exemplary embodiment, when the notification is provided in the form of sound, the speaker 420 may output preset notification sound. According to one exemplary embodiment, the type of the notification sound may be preset by a user. According to one exemplary embodiment, the type of the notification sound may be preset based on the type of a notification event.

The display unit 430 displays various images thereon. According to the current exemplary embodiment, when the notification is provided by turning on a screen of the display unit 430 or in the form of message, the screen of the display unit 430 is turned on or a notification message may be displayed on the display unit 430 at a time of point that the notification is provided.

The LED 440 may provide the notification by being turned on or off.

Figure 5:
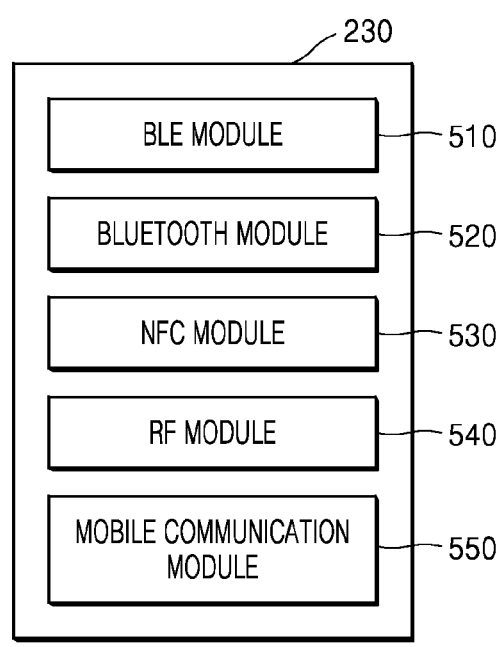
FIG. 5 is a block diagram of a structure of a communication unit according to an exemplary embodiment.

FIG. 5 is a block diagram of a structure of a communication unit 230 according to an exemplary embodiment.

According to the current exemplary embodiment, the communication unit 230 may include at least one selected from a Bluetooth low energy (BLE) module 510, a Bluetooth module 520, a near field communication (NFC) module 530, a radio-frequency (RF) module 540, and a mobile communication module 550. In one exemplary embodiment, the BLE module 510, the Bluetooth module 520, the NFC module 530, the RF module 540, and the mobile communication module 550 may be selectively included.

The mobile communication module 550 may transmit or receive a phone call or a text message or establish data communication via a mobile communication network. An example of the mobile communication network includes a communication network using at least one selected from among second-generation mobile communication (e.g., Code Division Multiple Access (CDMA), Global system for Mobile communication (GSM), or Personal Digital Cellular (PDC)), third-generation mobile communication (e.g., International Mobile Telecommunication 2000 (IMT-2000), Wideband Code Division Multiple Access (W-CDMA), or Code Division Multiple Access 2000 (CDMA2000), and fourth-generation mobile communication (e.g., Long Term Evolution (LTE) or Long Term Evolution advanced (LTE-A)).

Figure 6:
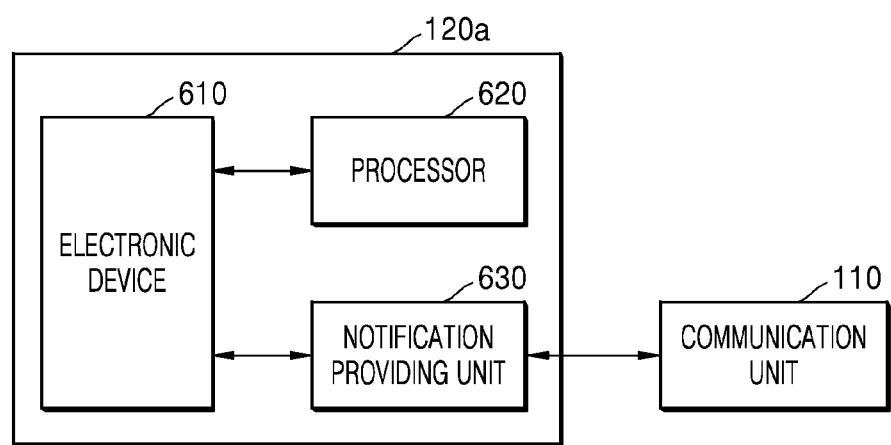
FIG. 6 is a block diagram of a structure of a wearable device according to an exemplary embodiment.

FIG. 6 is a block diagram of a structure of a wearable device 120*a* according to an exemplary embodiment.

According to the current exemplary embodiment, the wearable device 120*a* includes a processor 610, a notification providing unit 620 (e.g., a notification provider, etc.), and a communication unit 630 (e.g., a transceiver, etc.).

The processor 610 controls overall operations of the wearable device 120*a*. According to the current exemplary embodiment, when the processor 610 receives a notification request from an electronic device 110 or another wearable device, the processor 610 provides a notification by using the notification providing unit 620. The notification may be provided based on information regarding the type of the notification, contents the notification and form of the notification included in the notification request.

When a notification event occurs in the wearable device 120*a*, the processor 610 informs the electronic device 110 of the notification event. The notice of the notification event may include the type and contents of the notification event. For example, the type of the notification event includes a notification of an exercise application, a notification of an operating system (OS), etc. The contents of the notification event may include an increase in a heartbeat, a danger of a loss, a low battery capacity, a weak network signal, etc.

The processor 610 obtains information indicating whether the wearable device 120*a* is worn and transmits the information to the electronic device 110.

According to one exemplary embodiment, the information (i.e., status information) indicating whether the wearable device 120*a* is worn includes sensing values of sensors included in the wearable device 120*a*. For example, the sensing values may include information regarding whether a locking structure is fastened, information regarding motion detection, a bio-signal, etc. In an exemplary embodiment, the wearable device may sense that it is currently being worn based on a distance of the wearable device from a body of the user or from the electronic device 110. In yet another exemplary embodiment, the wearable device may sense that it is currently being worn based on whether it is in communication with the electronic device 110. According to the current exemplary embodiment, the processor 610 may transmit the sensing values to the electronic device 110.

According to another exemplary embodiment, the information indicating whether the wearable device 120*a* is worn is information indicating whether the wearable device 120*a* is in the wearing state or the non-wearing state. According to the current exemplary embodiment, the processor 610 determines whether the wearable device 120*a* is in the wearing state or the non-wearing state based on the sensing values, and transmits a result of determining whether the wearable device 120*a* is in the wearing state or the non-wearing state to the electronic device 110.

According to one exemplary embodiment, the processor 610 periodically transmits to the electronic device 110 the information indicating whether the wearable device 120*a* is worn. According to another exemplary embodiment, the processor 610 transmits the information indicating whether the wearable device 120*a* is worn to the electronic device 110 when the electronic device 110 requests the information.

When it is determined that the wearable device 120*a* will provide the notification, the notification providing unit 620 provides the notification. The notification may be provided, for example, in the form of sound, vibration, turning on of a screen, flickering of an LED, etc.

The communication unit 630 communicates with the electronic device 110. The communication unit 630 may transmit a control signal, a signal indicating a state of the wearable device 120*a*, or data to the electronic device 110 or may receive a control signal, a signal indicating a state of the electronic device 110, or data from the electronic device 110.

Figure 7:
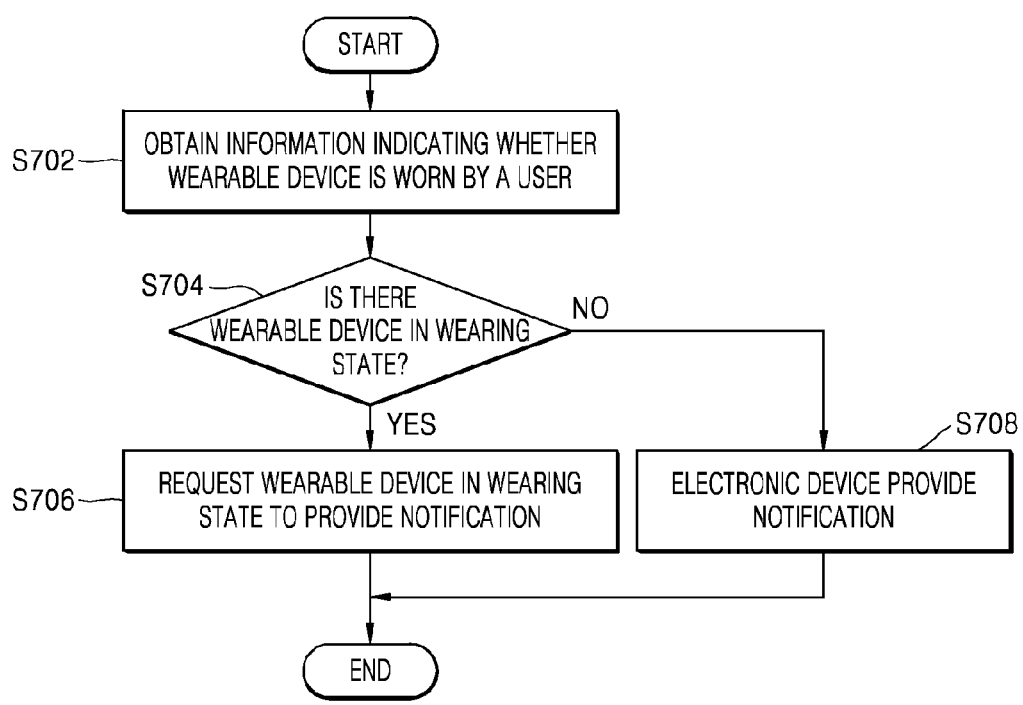
FIG. 7 is a flowchart of a method of providing a notification according to an exemplary embodiment.

FIG. 7 is a flowchart of a method of providing a notification according to an exemplary embodiment.

An electronic device that performs methods of providing a notification according to various exemplary embodiments may be, for example, the electronic device 110*a* illustrated in FIG. 2 that includes the processor 210, the notification providing unit 220, and the communication unit 230. However, exemplary embodiments are not limited to the electronic device 110*a* of FIG. 2 and methods of providing a notification may be performed by electronic devices having various structures according to exemplary embodiments. Exemplary embodiments performed by the electronic device 110*a* of FIG. 2 will be described.

The processor 210 obtains information indicating whether the at least one wearable device 120 is worn by a user (operation S702).

According to one exemplary embodiment, the information indicating whether the at least one wearable device 120 is worn includes sensing values of sensors included in the at least one wearable device 120. According to the current exemplary embodiment, the processor 210 may determine whether the at least one wearable device 120 is in the wearing state or the non-wearing state, based on the information indicating whether the at least one wearable device 120 is worn.

According to another exemplary embodiment, the information indicating whether the at least one wearable device 120 is worn is information regarding whether the at least one wearable device 120 is in the wearing state or the non-wearing state. According to the current exemplary embodiment, the at least one wearable device determines whether the at least one wearable device 120 is in the wearing state or the non-wearing state.

According to one exemplary embodiment, the processor 210 may obtain the information indicating whether the at least one wearable device 120 is worn by requesting the at least one wearable device 120 to provide this information.

According to another exemplary embodiment, the at least one wearable device 120 may periodically transmit the information indicating whether the at least one wearable device 120 is worn to the electronic device 110*a*, and the electronic device 110*a* may store this information in a storage unit thereof (not shown). The processor 210 may obtain the information stored in the storage unit to determine a device to which the notification regarding the notification event is to be provided.

Next, when it is determined that the at least one wearable device 120 is in the wearing state (operation S704), the processor 210 requests the at least one wearable device 120 to provide the notification (operation S706). When it is determined that any one of the at least one wearable device 120 is not in the wearing state (operation S704), the notification providing unit 230 of the electronic device 110*a* provides the notification (operation S708).

According to the current exemplary embodiment, a notification may be provided to a wearable device that is in the wearing state, thereby increasing a probability that a user will check the notification.

Figure 8:
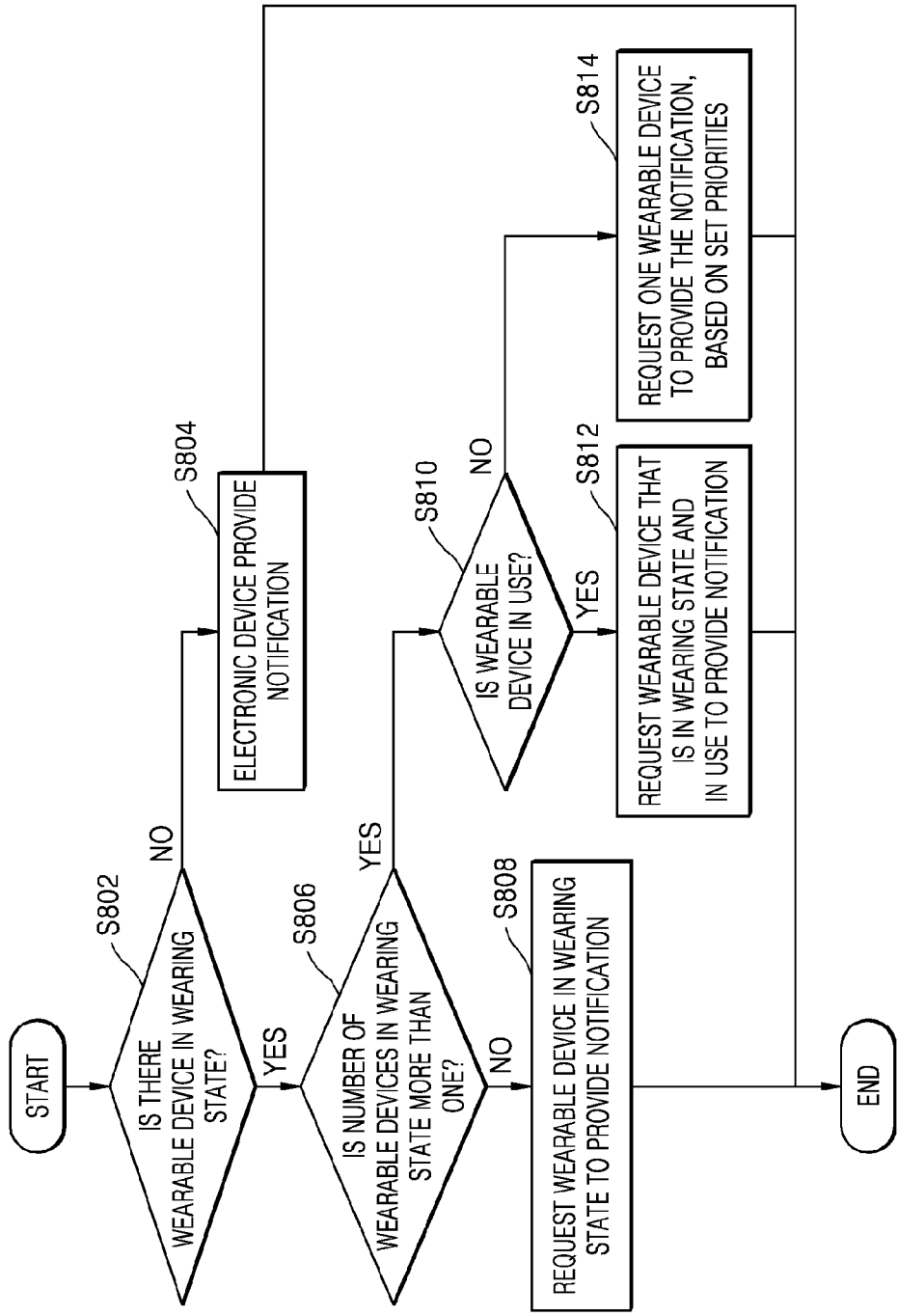
FIG. 8 is a flowchart of a method of determining a device that will provide a notification when there are a plurality of wearable devices that are in a wearing state, according to an exemplary embodiment.

FIG. 8 is a flowchart of a method of determining a device that will provide a notification when there are a plurality of wearable devices in a wearing state, according to an exemplary embodiment. The exemplary embodiment of FIG. 8 is applicable to exemplary embodiments in which whether a wearable device that is in a wearing state exists is determined.

When it is determined that there are wearable devices that are in the wearing state (operation S802—YES), the processor 210 determines whether the number of the wearable devices in the wearing state is more than one (operation S806). When it is determined that there are no wearable devices that are in the wearing state (operation S802—NO), the electronic device provides the notification (operation S804). When it is determined that there is one wearable device in the wearing state (operation S806—NO), the wearable device that is being worn is requested to provide a notification (operation S808).

When it is determined that there are a plurality of wearable devices in the wearing state (operation S806—YES), it is determined whether a wearable device that is in use is present among the plurality of wearable devices in the wearing state (operation S810). The processor 210 may request the plurality of wearable devices that are being worn to provide information indicating whether they are in use to determine whether the plurality of wearable devices are in use.

In one exemplary embodiment, the wearable device 120 or the electronic device 110 may be determined to be in use if the wearable device 120 or the electronic device 110 have received input from the user within a predetermined time, are reproducing content, the wearable device 120 or the electronic device 110 are executing an application, the wearable device 120 or the electronic device 110 are being operated in some manner by a user, or a sensor of either the wearable device 120 or the electronic device 110 is detecting the use of the wearable device 120 or the electronic device 110 by the user. The states of the wearable device 120 and the electronic device 110 may be stored in the electronic device 110, wearable device 120 or both. In addition, the state of both devices may be updated periodically or upon request of an application or a user by receiving information about use from the wearable device 120 or the electronic device 110. When a wearable device in use is present among the plurality of wearable devices in the wearing state, the wearable device that is in the wearing state and in use is requested to provide the notification (operation S812). When no wearable device in use is present among the plurality of wearable devices in the wearing state, one of the plurality of wearable devices in the wearing state is requested to provide the notification, based on set priorities (operation S814).

According to one exemplary embodiment, the set priorities may be criteria determined in consideration of a user's state, a remaining charge capacity of a battery, etc. When a plurality of wearable devices in the wearing state are present, additional criterion may be used to determine a wearable device to which the notification is to be provided.

According to another exemplary embodiment, the set priorities may be preset priorities.

FIG. 9 is a table illustrating preset priorities according to an exemplary embodiment.

The preset priorities are priorities determined beforehand by a designer or set by a user.

According to the current exemplary embodiment, the preset priorities are allocated to wearable devices that will provide a notification, based on the type of the notification. For example, in the case of a sound notification, priorities may be sequentially allocated to smart glasses, a smart watch, and a smart band. In the case of a vibration notification, priorities may be allocated to the smart watch, the smart band, and the smart glasses. In the case of a screen notification, priorities may be sequentially allocated to the smart glasses and the smart watch.

In addition, priorities may be allocated to wearable devices regardless of the type of the notification.

Figure 10:
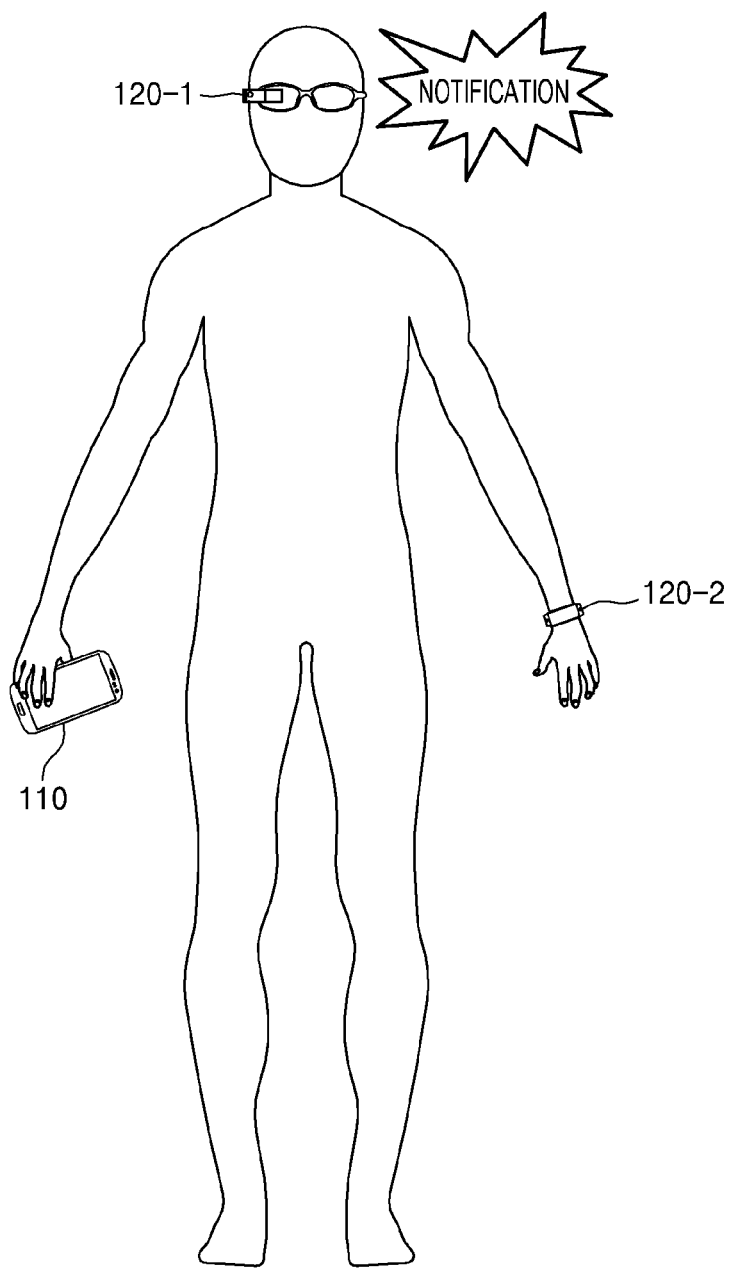
FIG. 10 is a diagram illustrating a method of providing a notification when there are a plurality of wearable devices in a wearing state according to an exemplary embodiment.

FIG. 10 is a diagram illustrating a method of providing a notification when there are a plurality of wearable devices in a wearing state according to an exemplary embodiment.

As in the exemplary embodiment described above with reference to FIG. 8, when a plurality of wearable devices are in the wearing state, only one of the plurality of wearable devices is provided with a notification in consideration of the usage states of the wearable devices and set priorities, thereby preventing a notification from being excessively provided to a user. For example, according to the current exemplary embodiment, when two wearable devices, e.g., smart glasses 120-1 and a smart watch 120-2, are in the wearable device as illustrated in FIG. 10, a notification is provided to only the smart glasses 120-1, considering whether the smart glasses 120-1 and the smart watch 120-2 are in use, the set priorities, etc. If the notification is provided to both the smart glasses 120-1 and the smart watch 120-2 in the case of FIG. 10, a user may be startled or provided with the notification more than necessary. Accordingly, according to the current exemplary embodiment, it is possible to appropriately provide a notification while minimizing interruptions that may be caused to the user.

Figure 11:
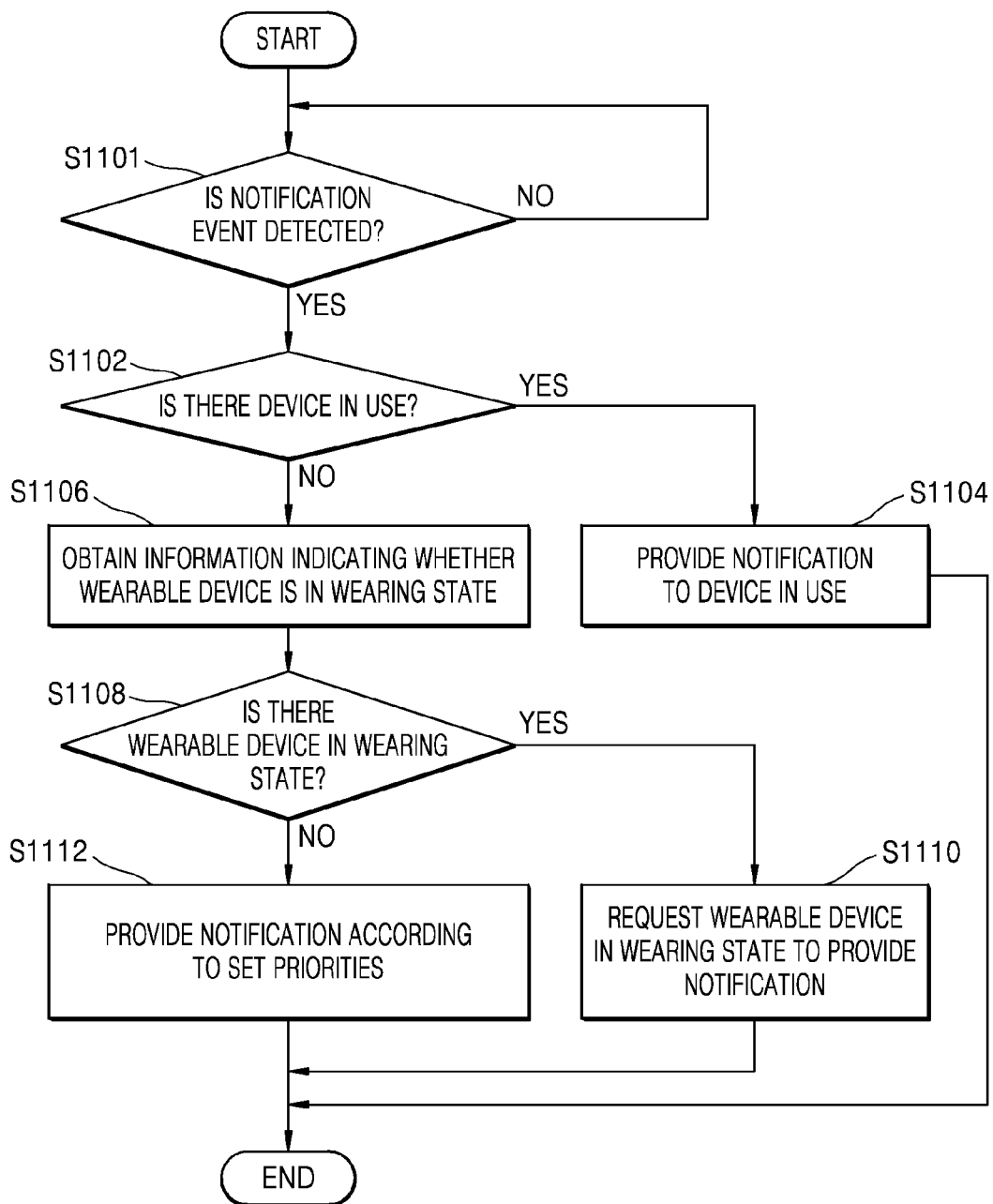
FIG. 11 is a flowchart of a method of providing a notification according to an exemplary embodiment.

FIG. 11 is a flowchart of a method of providing a notification according to an exemplary embodiment.

In the method according to the current exemplary embodiment, whether wearable devices that are in the wearing state are present and whether an electronic device or at least one wearable device that is in use is present are considered.

When a notification event is detected (operation S1101), the processor 210 determines whether any one of the electronic device 110 and the at least one wearable device 120 is in use (operation S1102). The processor 210 may determine whether the at least one wearable device 120 is in use by requesting the at least one wearable device 120 to provide information indicating whether it is in use.

When it is determined in operation S1102 that any one of the electronic device 110 and the at least one wearable device 120 is in use, a notification is provided to a device that is in use (operation S1104).

When it is determined in operation S1102 that any one of the electronic device 110 and the at least one wearable device 120 is not in use, the processor 210 obtains the information indicating whether the at least one wearable device 120 is in the wearing state (operation S1106) and determines whether any one of the at least one wearable device 120 is in the wearing state (operation S1108). If any one of the at least one wearing device 120 is in the wearing state, the wearable device in the wearing state is requested to provide the notification (operation S1110). If any one of the at least one wearing device 120 is not in the wearing state, the electronic device 110 or the at least one wearable device 120 is requested to provide the notification according to set priorities (operation S1112).

FIG. 12 is a table illustrating cases in which it is determined that a device is in use according to an exemplary embodiment.

As illustrated in FIG. 12, the processor 210 may determine that a wearable device in use in a case in which music or video is being played back, a case in which a reference time or less passes after a user input is detected, a case in which a screen is being updated according to a user command, or a case in which a screen is turned on. In one exemplary embodiment, additional criteria may be further added or various criteria may be determined.

The processor 210 of the electronic device 110a requests each wearable device to provide information indicating whether the wearable device is in use, receives this information, and determines whether the wearable device is in use, based on the information.

According to one exemplary embodiment, the information indicating whether the wearable device is in use is information indicating whether the wearable device is in use or not. In this case, it may be determined that the wearable device is in use when music or video is being played back in the wearable device, when a reference time or less passes after a user input is detected, when a screen is being updated according to a user command, or when a screen is turned on. When a state of the wearable device does not correspond to any of these cases, it may be determined that the wearable device is not in use and information indicating this fact may be transmitted to the electronic device 110a.

According to another exemplary embodiment, the information indicating whether the wearable device is in use may include information indicating whether music or video is being played back, a point of time when a latest user input is detected, information indicating whether a screen is being updated, information indicating whether the screen is turned on, etc. In this case, the processor 210 of the electronic device 110a may receive this information from the wearable device and determine whether the wearable device is in use, based on this information.

Figure 13:
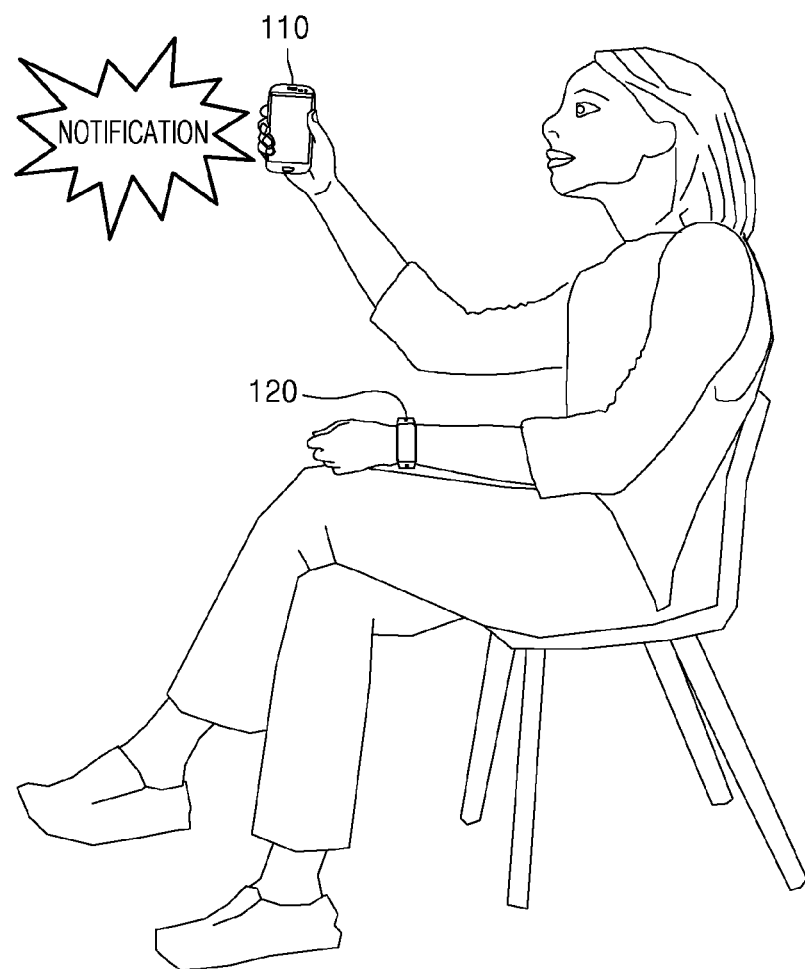
FIG. 13 is a diagram illustrating an exemplary embodiment in which whether an electronic device and at least one wearable device are in use is considered.

FIG. 13 is a diagram illustrating an exemplary embodiment in which whether the electronic device 110 and the at least one wearable device 120 are in use is considered.

In an exemplary embodiment in which a notification is provided considering whether the electronic device 110 and the at least one wearable device 120 that communicate with each other are in use, the notification may be provided to a device that a user is likely to check. In particular, when the notification is provided to a device in use, the notification may be provided to the device to which the user is currently paying attention. Accordingly, the user need not manipulate another device to check the notification, thereby increasing user convenience.

Figure 14:
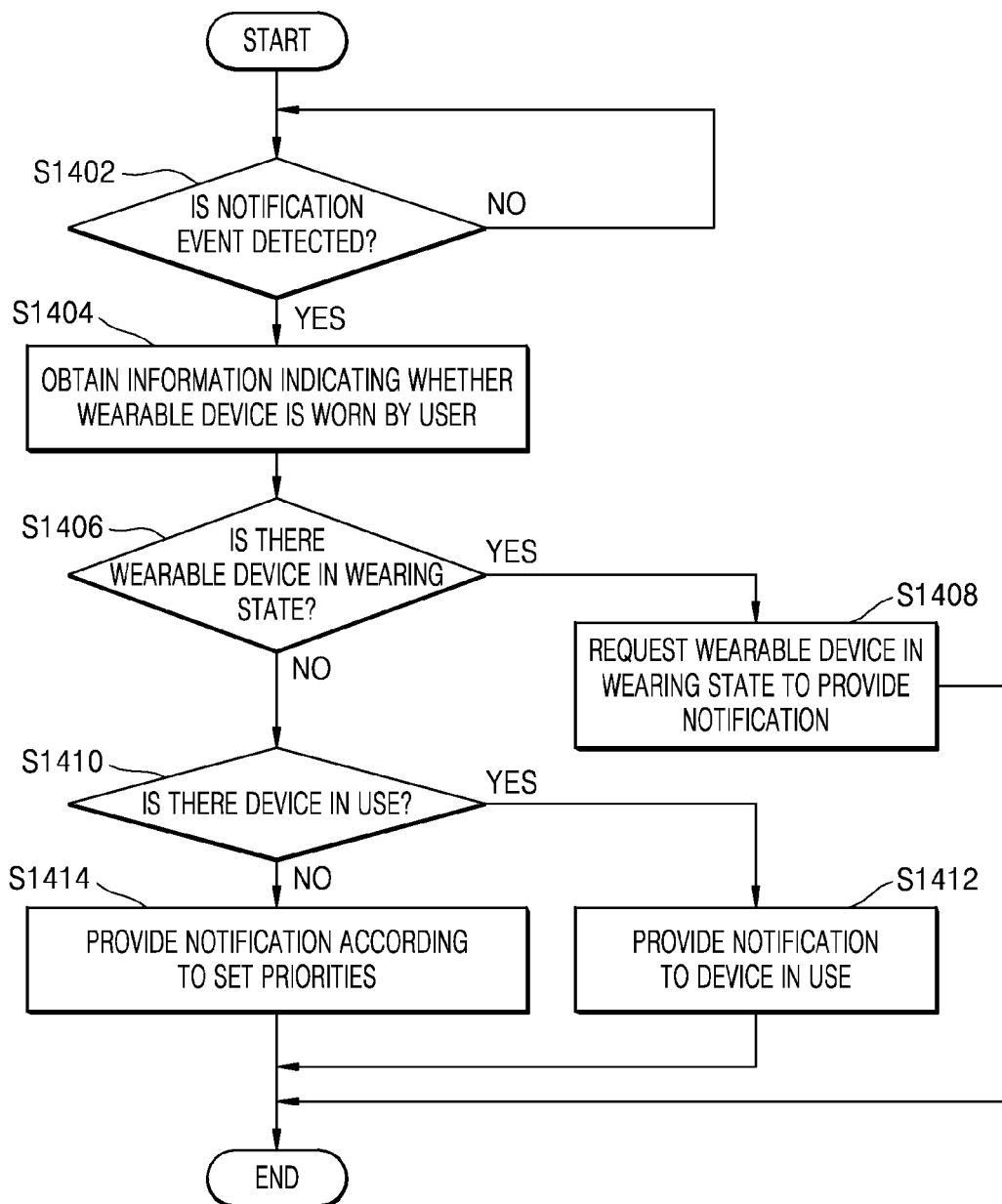
FIG. 14 is a flowchart of a method of providing a notification according to an exemplary embodiment.

FIG. 14 is a flowchart of a method of providing a notification according to an exemplary embodiment.

In the method according to the current exemplary embodiment, first, whether there is a wearable device in the wearing state is determined, and whether there is a device that is in use is determined when there is no wearable device in the wearing state, unlike in the method of FIG. 11.

When a notification event is detected (operation S1402), the processor 210 obtains information indicating whether at least one wearable device is worn by a user (operation S1404) and determines whether any one of the at least one wearable device is in the wearing state (operation S1406). When a wearable device in the wearing state is present, the wearable device is requested to provide a notification (operation S1408).

When any wearable device is not in the wearing state, the processor 210 determines whether any device is in use among the electronic device 110 and the at least one wearable device 120 (operation S1410). When it is determined in operation S1410 that a device in use is present, the notification is provided to the device in use (operation S1412).

When it is determined in operation S1410 that a device in use is not present, the electronic device 110 or the at least one wearable device 120 is requested to provide the notification according to set priorities (operation S1414).

Figure 15:
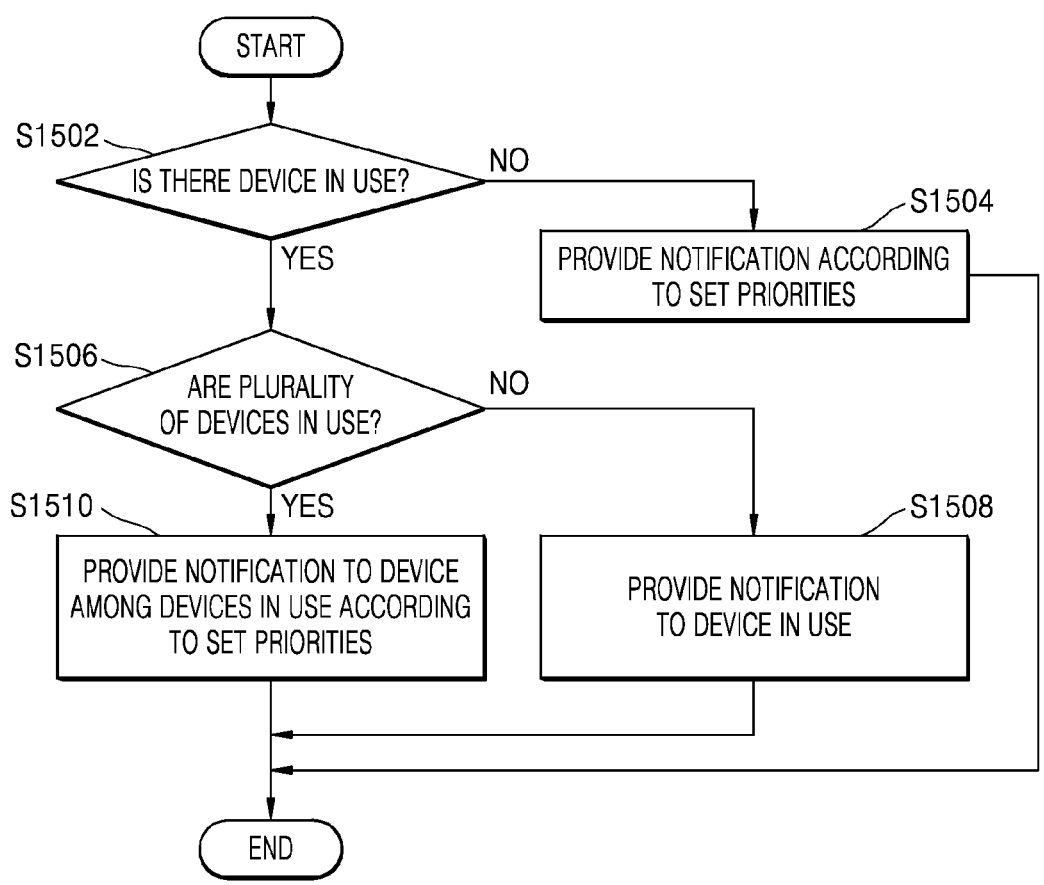
FIG. 15 is a flowchart of a method of determining a device that will provide a notification when a plurality of devices are in use according to an exemplary embodiment.

FIG. 15 is a flowchart of a method of determining a device that will provide a notification when a plurality of devices are in use according to an exemplary embodiment. The exemplary embodiment of FIG. 15 is applicable to determine whether devices that are in use are present.

When it is determined that there is a device in use (operation S1502), whether a plurality of devices are in use is determined (operation S1506). When it is determined in operation S1506 that only one device is in use, the notification is provided to the device (operation S1508). When it is determined in operation S1506 that a plurality of devices are in use, the notification is provided to the plurality of devices according to set priorities. The set priorities may be determined in various ways, e.g., such that the notification is provided to a wearable device in the wearing state or such that a device to which the notification is to be provided is determined according to predetermined and stored priorities.

When it is determined that a device in use is not present (operation S1502), the notification is provided according to the set priorities (operation S1504). The set priorities may be determined in various ways, e.g., such that the notification is provided to a wearable device in the wearing state or such that a device to which the notification is to be provided is determined according to predetermined and stored priorities.

Figure 16:
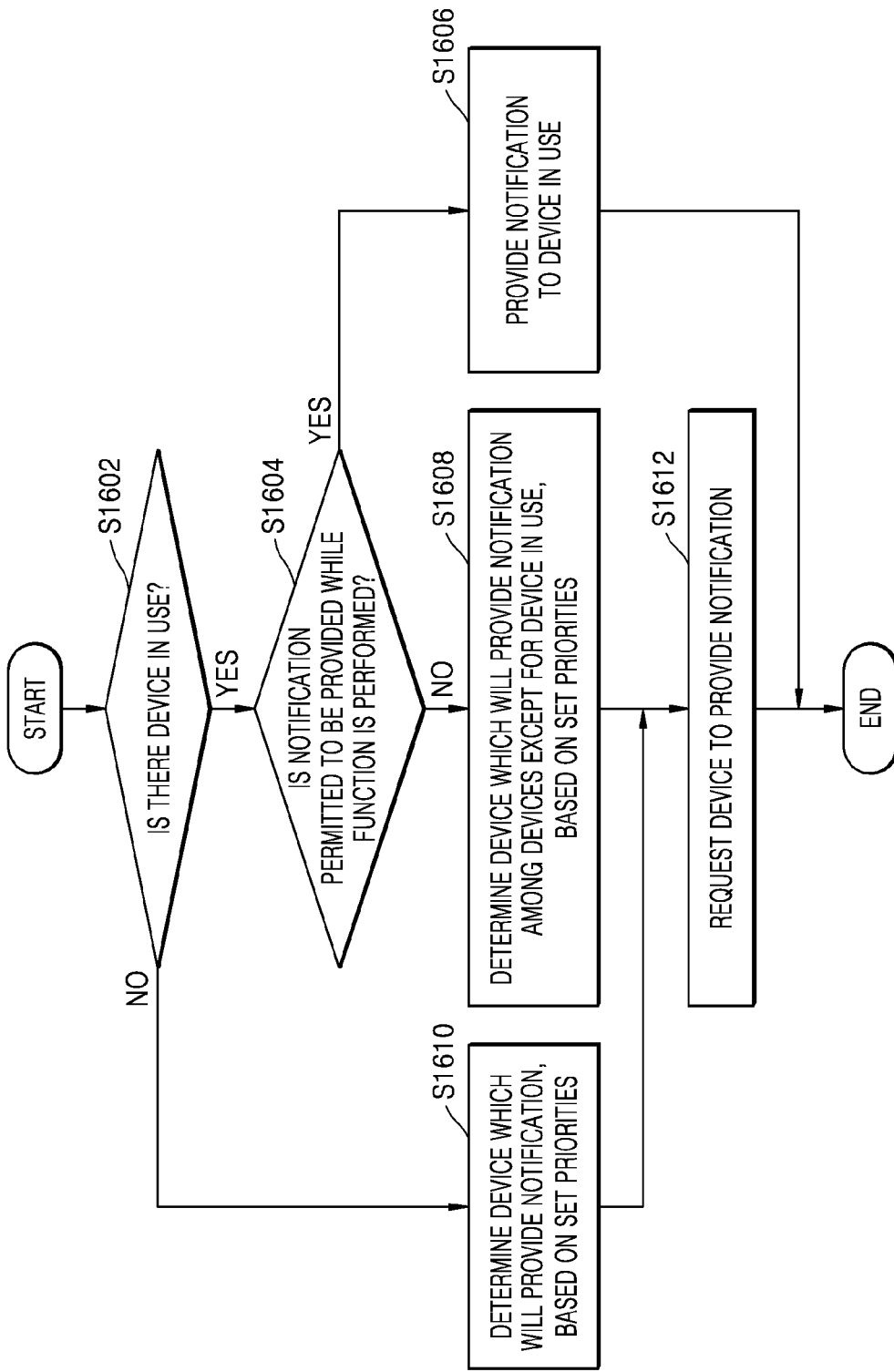
FIG. 16 is a flowchart of a method of determining a device that will provide a notification according to an exemplary embodiment.

FIG. 16 is a flowchart of a method of determining a device that will provide a notification according to an exemplary embodiment.

According to the current exemplary embodiment, if whether a device in use is present is considered when a device to which a notification is to be provided is determined, the processor 210 further considers whether a notification is permitted to be provided while a function of the device in use is performed so as to determine a device to which the notification is to be provided. The current exemplary embodiment is applicable to all of exemplary embodiments in which whether a device in use is present is considered.

First, the processor 210 determines whether a device in use is present (operation S1602).

When it is determined in operation S1602 that a device in use is present, the processor 210 determines whether the notification is permitted to be provided while a function of the device in use is performed (operation S1604).

When it is determined in operation S1604 that the notification is permitted to be provided while the function of the device in use is performed, the processor 210 provides the notification to the device in use (operation S1606).

When it is determined in operation S1604 that the notification is not permitted to be provided while the function of the device in use is performed, the processor 210 determines a device that will provide the notification among other devices except for the device in use, based on set priorities (operation S1608).

When it is determined in operation S1602 that a device in use is not present, the processor 210 determines a device that will provide the notification, based on the set priorities (operation S1610).

In operation S1612, the determined devices are then requested to provide a notification (operation S1612).

Figure 17:
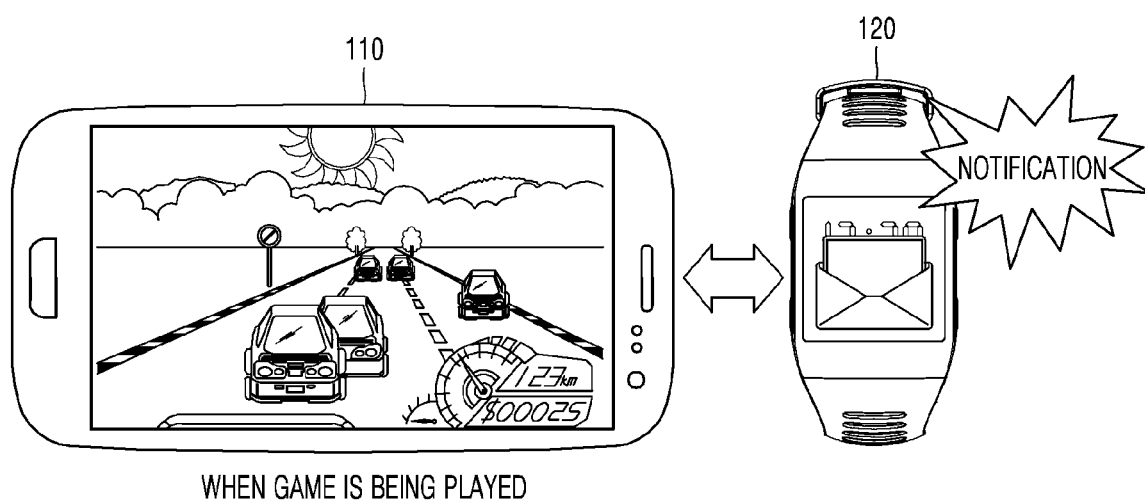
FIG. 17 is a diagram illustrating a case in which a notification is provided according to an exemplary embodiment.

FIG. 17 is a diagram illustrating a case in which a notification is provided according to an exemplary embodiment.

In the current exemplary embodiment, when a device in use is present, it is determined whether a notification is permitted to be provided while a function is performed in the device in use as described above with reference to FIG. 16. FIG. 17 illustrates a case in which a text message is input to the electronic device 110 while a game is being played in the electronic device 110. In this case, even if user input is detected within a reference time and it is thus determined that the electronic device 110 is in use, a user is interrupted when the notification is provided while the user is playing the game. Thus, the processor 210 determines that the notification is not permitted while the function is performed. Thus, the processor 210 provides the notification to the at least one wearable device 120 instead of the electronic device 110 in use.

Figure 18:
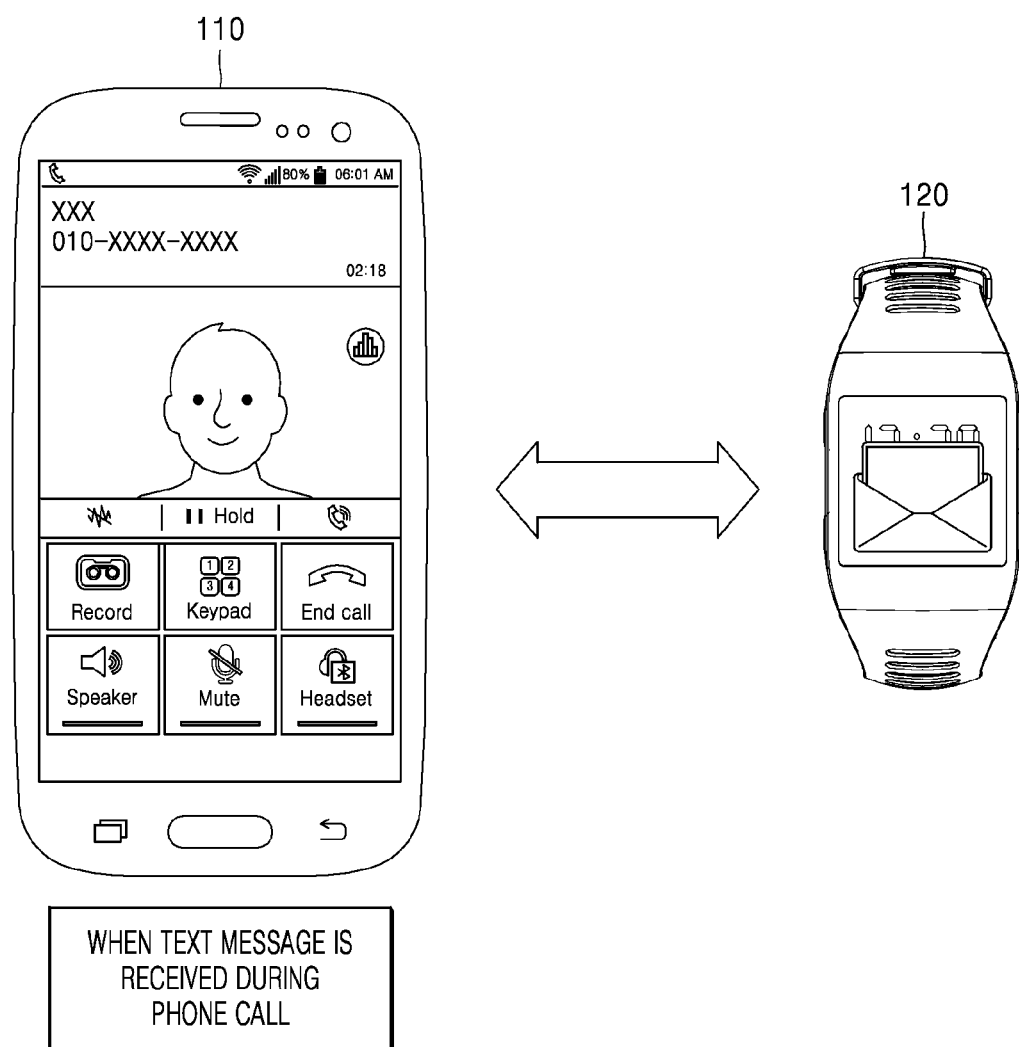
FIG. 18 is a diagram illustrating that a notification is provided according to an exemplary embodiment.

FIG. 18 is a diagram illustrating that a notification is provided according to an exemplary embodiment.

In the current exemplary embodiment, when a device in use is present, it is determined whether a notification is permitted to be provided while a function is performed in the device, as described above with reference to FIG. 16. FIG. 18 illustrates a case in which a text message is received while a user makes a phone call with the electronic device 110. For example, as illustrated in FIG. 18, if a phone call is made with the electronic device 110, a screen of the electronic device 110 is turned on and thus the electronic device 110 is determined to be in use. However, when a notification is provided during the phone call, the user is interrupted by the notification and the processor 210 thus determines that the notification is not permitted to be provided while this function is performed. Accordingly, the processor 210 provides the notification to the at least one wearable device 120 instead of the electronic device 110.

FIG. 19 is a table illustrating a list of functions that do not permit a notification to be provided while the functions are performed according to an exemplary embodiment.

According to one exemplary embodiment, the processor 210 may determine whether a notification is permitted to be provided while a function is performed, based on a list of functions that do not permit a notification to be provided while the functions are performed. For example, the list of functions may include a game function, a navigation function, video reproduction function, a presentation function, etc. The list of functions may be stored in a storage unit (not shown) or the like.

Figure 20:
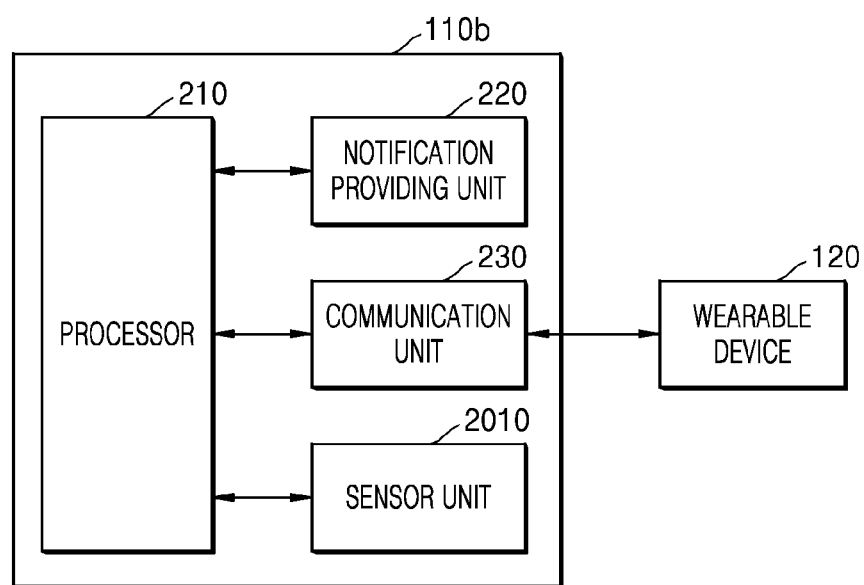
FIG. 20 is a block diagram of a structure of an electronic device according to an exemplary embodiment.

FIG. 20 is a block diagram of a structure of an electronic device 110*b* according to an exemplary embodiment.

According to the current exemplary embodiment, the electronic device 110*b* includes a processor 210, a notification providing unit 220 (e.g., a notification provider), a communication unit 230 (e.g., a communicator), and a sensor unit 2010 (e.g., a sensor).

The processor 210 controls overall operations of the electronic device 110*b*. According to the current exemplary embodiment, the processor 210 detects a notification event and determines a device to which a notification of the notification event is to be provided. The device to which the notification of the notification event is to be provided may be at least one device selected from among the electronic device 110*b* and at least one wearable device 120 that communicates with the electronic device 110*b*.

The processor 210 may determine a device to which the notification of the notification event is to be provided, based on information indicating whether the at least one wearable device 120 is worn by a user. According to one exemplary embodiment, the processor 210 provides the notification of the notification event to the at least one wearable device 120 when the at least one wearable device 120 is in the wearing state, and provides the notification by using the providing unit 220 of the electronic device 110*b* when the at least one wearable device 120 is not in the wearing state. In one exemplary embodiment, when the notification is provided to the at least one wearable device 120, the electronic device 110*b* may also provide the notification or the electronic device 110*b* may not provide the notification.

When it is determined that the electronic device 110*b* provides the notification, the notification providing unit 220 provides the notification. The notification may be provided, for example, in the form of sound, vibration, turning on of a screen, flickering of an LED, etc.

The communication unit 230 communicates with the at least one wearable device 120.

When it is determined that the at least one wearable device 120 provides the notification or both the electronic device 110*a* and the at least one wearable device 120 provide the notification, the processor 210 transmits a notification request to the at least one wearable device 120 via the communication unit 230 to request to provide the notification. When receiving the notification request from the electronic device 110*b*, the at least one wearable device 120 provides the notification to the at least one wearable device 120.

The sensor unit 2010 includes at least one sensor. The processor 210 may determine a user's state or a state of the electronic device 110*b* by using a sensing value of a sensor included in the sensor unit 2010.

Figure 21:
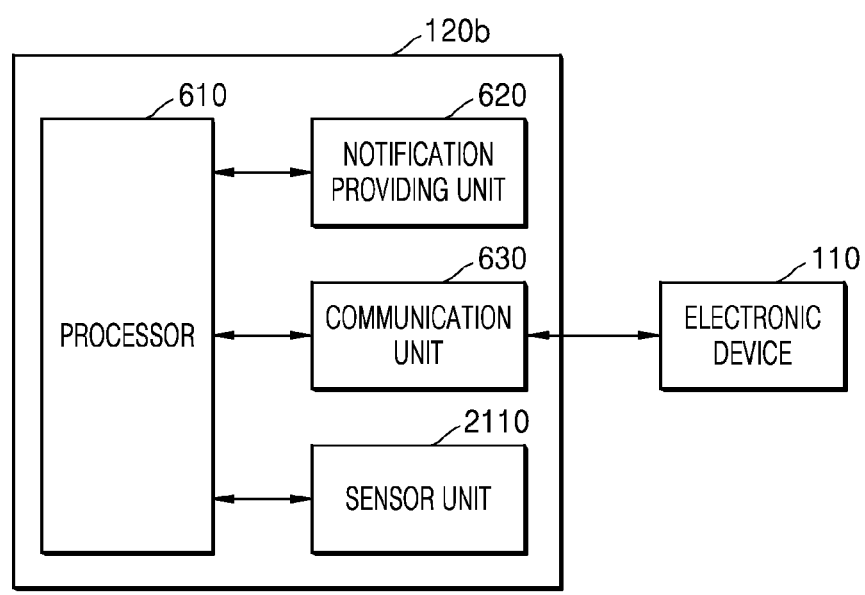
FIG. 21 is a block diagram of a structure of a wearable device according to an exemplary embodiment.

FIG. 21 is a block diagram of a structure of a wearable device 120*b* according to an exemplary embodiment;

According to the current exemplary embodiment, the wearable device 120*b* includes a processor 610, a notification providing unit 620 (e.g., a notification provider), a communication unit 630 (e.g., a communicator), and a sensor unit 2110 (e.g., a sensor).

The processor 610 controls overall operations of the wearable device 120*b*. In the current exemplary embodiment, when the processor 610 receives a notification request from an electronic device 110 or another wearable device, the processor 610 provides a notification by using the notification providing unit 620. The notification may be provided based on information regarding the type of the notification, contents of the notification, and form of the notification included in the notification request.

When a notification event occurs in the wearable device 120*b*, the processor 610 informs the electronic device 110 of the notification event. The notification of the notification event may include information regarding the type of the notification and contents of notification event.

The processor 610 obtains at least one among information regarding whether the wearable device 120*b* is worn by a user and information regarding a state of the wearable device 120*b*, and transmits the obtained information to the electronic device 110.

According to one exemplary embodiment, the information regarding whether the wearable device 120*b* is worn by a user includes sensing values of sensors included in the sensor unit 2110.

According to another exemplary embodiment, the information regarding whether the wearable device 120*b* is worn by a user indicates whether the wearable device 120*b* is in the wearing state or the non-wearing state. According to the current exemplary embodiment, the processor 2110 determines whether the wearable device 120*b* is in the wearing state or the non-wearing state based on the sensing values obtained by the sensor unit 2110, and transmits a result of determining whether the wearable device 120*b* is in the wearing state or the non-wearing state to the electronic device 110.

According to one exemplary embodiment, the information regarding the state of the wearable device 120*b* includes the sensing values of the sensors included in the sensor unit 2110.

According to another exemplary embodiment, the information regarding the state of the wearable device 120*b* is information indicating a result of determining the state of the wearable device 120*b* based on the sensing values of the sensor unit 2110 by the processor 610. According to the current exemplary embodiment, the processor 610 may determine the state of the wearable device 120*b* as being held with a user's hand, being held by a car holder, being put in a bag, etc, based on the sensing values of the sensor unit 2120.

When it is determined that the wearable device 120*b* will provide the notification, the notification providing unit 620 provides the notification. The notification may be provided, for example, in the form of sound, vibration, turning on of a screen, flickering of an LED, etc.

The communication unit 630 communicates with the electronic device 110. The communication unit 630 may transmit a control signal, a signal indicating the state of the wearable device 120*b*, data, etc. to the electronic device 110 or receive a control signal, a signal indicating the state of the electronic device 110, data, etc. from the electronic device 110.

The sensor unit 2110 includes at least one sensor. The processor 610 may determine the state of a user or the state of the wearable device 120*b*, based on a sensing value of the at least one sensor included in the sensor unit 2110.

Figure 22:
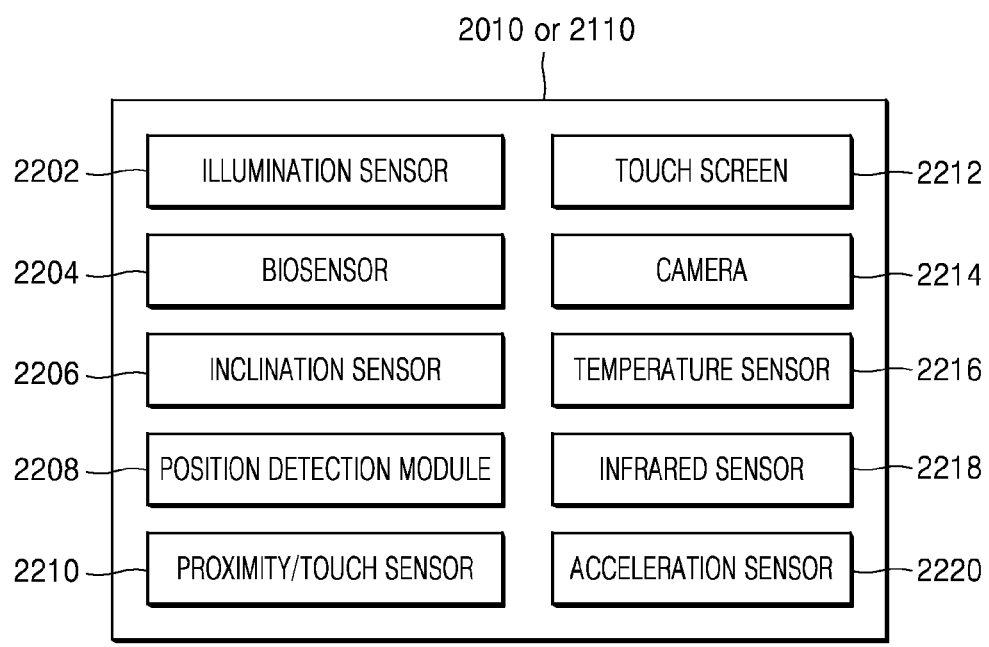
FIG. 22 is a block diagram of a structure of sensor unit included in an electronic device or a wearable device according to an exemplary embodiment.

FIG. 22 is a block diagram of a structure of a sensor unit 2010 included in the electronic device 110*b* of FIG. 20 or a structure of a sensor unit 2110 included in the wearable device 120*b* of FIG. 21 according to an exemplary embodiment.

According to one exemplary embodiment, the sensor unit 2010 or 2110 may include at least one selected among an illumination sensor 2202, a biosensor 2204, an inclination sensor 2206, a position detection module 2208, a proximity/ touch sensor 2210, a touch screen 2212, a camera 2214, a temperature sensor 2216, an infrared sensor 2218, and an acceleration sensor 2220. In addition, the sensor unit 2010 or 2110 may further include other various sensors.

The sensor unit 2010 or 2110 may include various combinations of sensors according to the types of the electronic device 110*b* and the wearable device 120*b*. For example, when the electronic device 110*b* is embodied in the form of a smartphone, the sensor unit 2010 may include the illumination sensor 2202, the inclination sensor 2206, the position detect ion module 2208, the proximity/touch sensor 2210, the touch screen 2212, the camera 2214, and the acceleration sensor 2220. When the wearable device 120*b* is embodied in the form of a smart watch, the sensor unit 2110 may include the biosensor 2204 (e.g., a heart rate sensor, a blood pressure sensor, a sweat sensor, etc.), the inclination sensor 2206, the touch screen 2212, the temperature sensor 2216, and the acceleration sensor 2220. When the wearable device 120*b* is embodied in the form of smart glasses, the sensor unit 2110 may include the illumination sensor 2202, the biosensor 2204 (e.g., a pulse sensor, an iris sensor, etc.), the inclination sensor 2206, the position detection module 2208, the proximity/touch sensor 2210, the camera 2214, and the acceleration sensor 2220.

Examples of the position detection module 2208 may include a global positioning system (GPS) module, a Wi-Fi Protected Setup (WPS) module, a Bluetooth Low Energy (BLE) module, etc.

Figure 23:
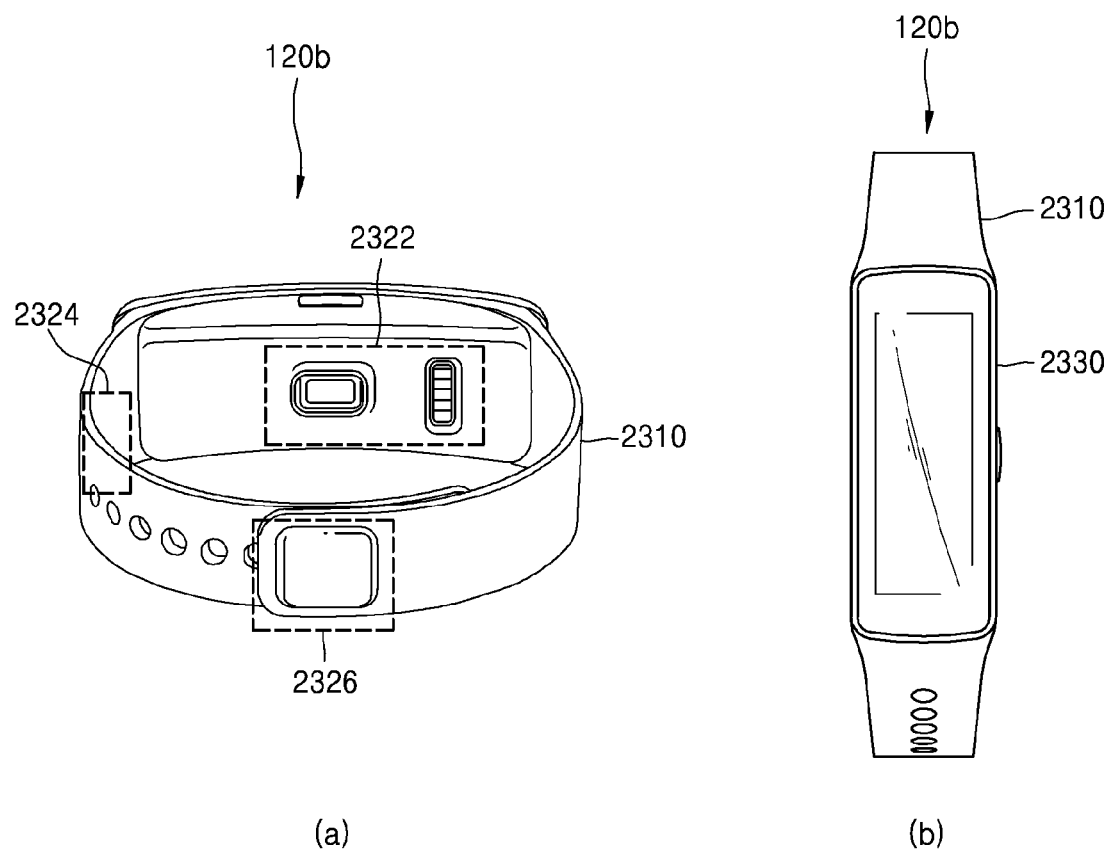
FIG. 23 is a diagram illustrating a structure of a wearable device according to an exemplary embodiment.

FIG. 23 is a diagram illustrating a structure of a wearable device 120*b* according to an exemplary embodiment.

According to one exemplary embodiment, the wearable device 120*b* may be embodied in the form of a smart watch. In the wearable device 120*b* in the form of a smart watch, the sensors included in the sensor unit 2110 may be disposed on a bottom 2322 of a watch plate 2330, an inner circumferential surface 2324 of a watch strap 2310, a locking unit 2326, etc. For example, a heart rate sensor, a temperature sensor, a sweat sensor, a blood pressure sensor, a proximity sensor, etc. may be disposed on the bottom 2322 of the watch plate 2330. A proximity/touch sensor, etc. may also be disposed on the inner circumferential surface 2424 of the watch strap 2310. A conductive sensor, a hall sensor, a magnetic sensor, etc. may be disposed on the locking unit 2326 to sense whether the locking unit 2326 is fastened. A touch screen may be disposed on the watch plate 2330. In addition, an acceleration sensor, an illumination sensor, etc. may be disposed on various locations on the wearable device 120*b*.

The wearable device 120*b* in the form of a smart watch may have a structure in which the watch strap 2310 is detachable from the watch plate 2330. In this case, a sensor (e.g., a conductive sensor, a proximity sensor, a hall sensor, a magnetic sensor, etc.) may be disposed on portions of the watch strap 2310 and the watch plate 2330 that are combined with each other to detect whether the watch strap 2310 and the watch plate 2330 are combined with each other.

In wearable device 120*b* such as a smart watch, the processor 610 may sense a motion of a user by using an acceleration sensor. For example, the processor 610 may determine whether the user is taking exercise or is driving a car, based on an acceleration pattern of sensed by the acceleration sensor.

The processor 610 may determine whether the locking unit 2326 is fastened and whether the smart watch is in the wearing state or the non-wearing state, based on a value sensed by a biosensor such as a heart rate sensor.

Figure 24:
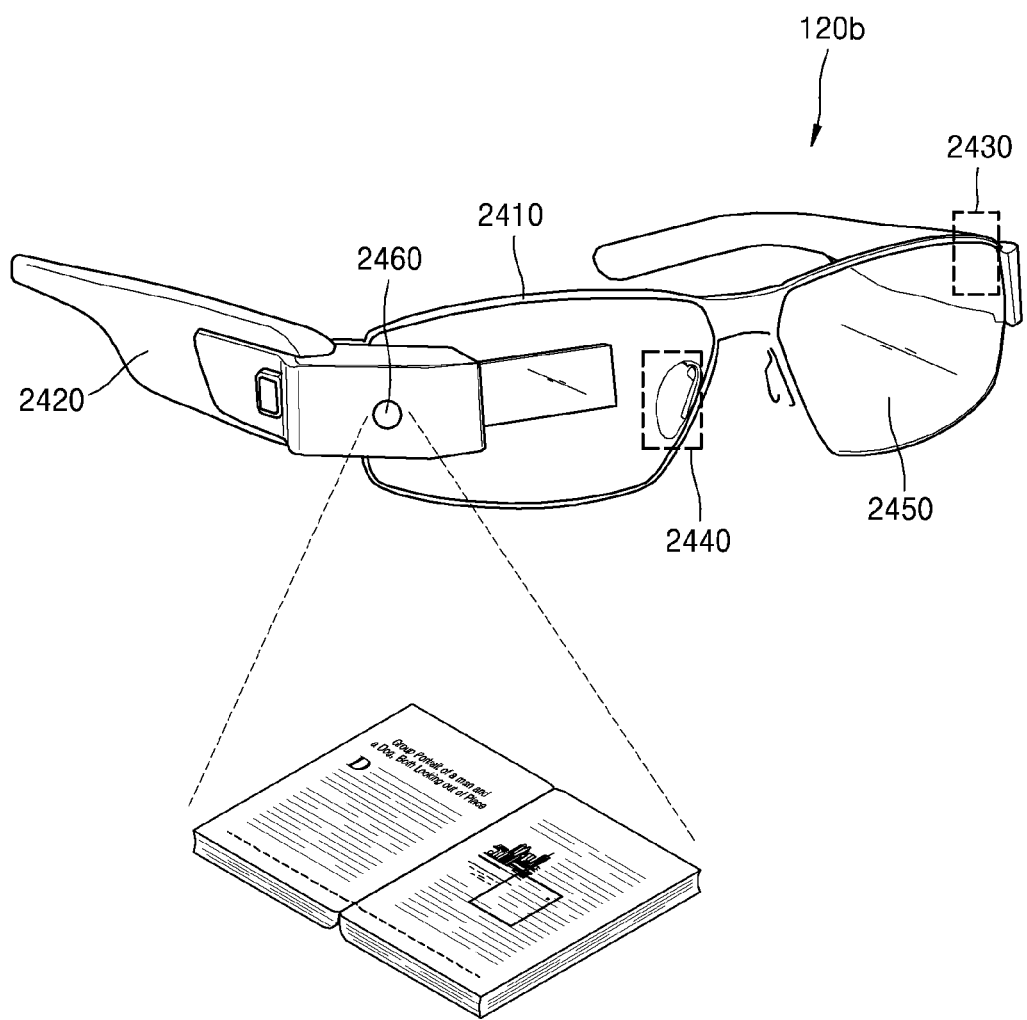
FIG. 24 is a diagram illustrating a structure of a wearable device according to an exemplary embodiment.

FIG. 24 is a diagram illustrating a structure of a wearable device 120*b* according to an exemplary embodiment.

According to the current exemplary embodiment, the wearable device 120*b* may be embodied in the form of smart glasses. In the wearable device 120*b* in the form of smart glasses, sensors may be disposed on a glass frame 2410, glass temples 2420, portions 2430 of the glass temples 2420 that contact the temples of a user, nose pads 2440, glass lenses 2450, etc. For example, a touch sensor may be disposed on the glass frame 2410 or the glass temples 2420, a pulse sensor may be disposed on the portions 2430, an acceleration sensor or a touch sensor may be disposed on the nose pads 2440, or an iris sensor may be disposed on the glass lenses 2450. That is, various sensors may be disposed on various locations on the wearable device 120*b*. According to one exemplary embodiment, a camera 2460 may be disposed on a predetermined location on the glass temples 2420 or the glass frame 2410.

According to one exemplary embodiment, the wearable device 120*b* in the form of smart glasses captures an image of a front area by using the camera 2460 and analyzes the captured image to determine the state of a user. For example, as illustrated in FIG. 24, it may be determined that the user is reading a book when a book is photographed by the camera 2460.

Figure 25:
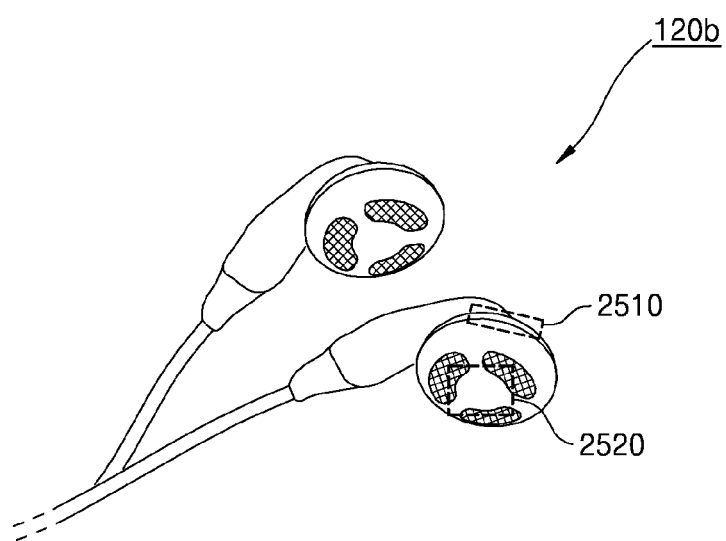
FIG. 25 is a diagram illustrating a structure of a wearable device according to an exemplary embodiment.

FIG. 25 is a diagram illustrating a structure of a wearable device 120*b* according to an exemplary embodiment.

According to the current exemplary embodiment, the wearable device 120*b* may be embodied in the form of earphones. In the wearable device 120*b* in the form of earphones, a sensor may be disposed on an outer circumferential portion 2510, a sound board 2520, etc. For example, a heart rate sensor may be disposed on the outer circumferential portion 2510 and a temperature sensor may be disposed on the sound board 2520.

Figure 26:
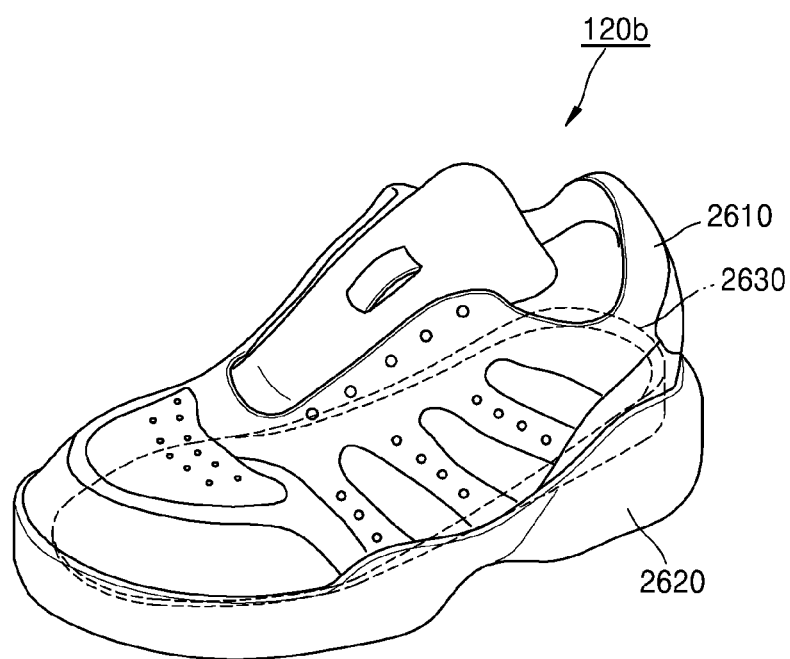
FIG. 26 is a diagram illustrating a structure of a wearable device according to an exemplary embodiment.

FIG. 26 is a diagram illustrating a structure of a wearable device 120*b* according to an exemplary embodiment.

According to the current exemplary embodiment, the wearable device 120*b* may be embodied in the form of a smart shoe. In the wearable device 120*b*, a sensor may be disposed on a body 2610, a sole 2620, an insert 2630, etc. For example, a heart rate sensor, a temperature sensor, a sweat sensor, a piezoelectric sensor, or the like may be disposed in the insert 2630. An acceleration sensor, a motion sensor, a position detection module, or the like may also be disposed in the body 2610, the sole 2620, the insert 2630, etc.

Figure 27:
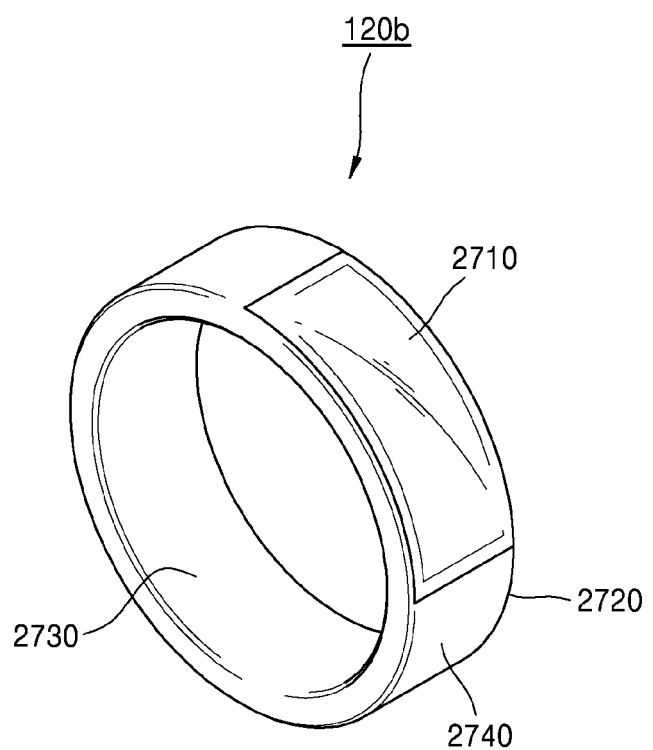
FIG. 27 is a diagram illustrating a structure of a wearable device according to an exemplary embodiment.

FIG. 27 is a diagram illustrating a structure of a wearable device 120*b* according to an exemplary embodiment.

According to the current exemplary embodiment, the wearable device 120*b* may be embodied in the form of a smart ring. In the wearable device 120*b* in the form of smart ring, a sensor may be disposed on a display unit 2710, a body 2720, an inner circumferential surface 2730, an outer circumferential surface 2740, etc. For example, a touch screen may be disposed on the display unit 2710, a temperature sensor or a heart rate sensor may be disposed on the inner circumferential surface 2730, or an acceleration sensor, a position detection module, a motion sensor, an illumination sensor, of the like may be disposed on the body 2720. A touch sensor may also be disposed on the outer circumferential surface 2740.

Figure 28:
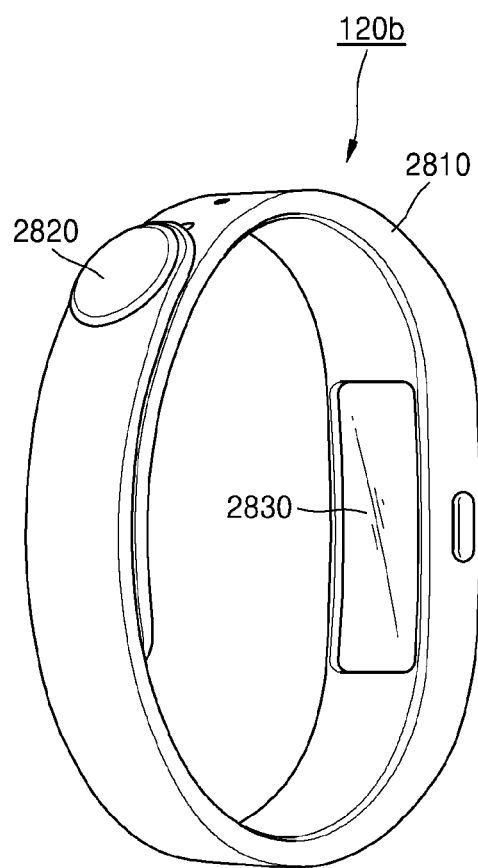
FIG. 28 is a diagram illustrating a structure of a wearable device according to an exemplary embodiment.

FIG. 28 is a diagram illustrating a structure of a wearable device 120*b* according to an exemplary embodiment.

According to the current exemplary embodiment, the wearable device 120*b* may be embodied in the form of a smart bracelet. In the wearable device 120*b* in the form of a smart bracelet, a sensor may be disposed on a body 2810, a locking unit 2820, an inner circumferential surface 2830, or the like. For example, an acceleration sensor, a motion sensor, a position detection module, or the like may be disposed on the body 2810; a conductive sensor, a hall sensor, a magnetic sensor, or the like may be disposed on the locking unit 2820 to sense whether the locking unit 2820 is fastened; or a temperature sensor, a heart rate sensor, or the like may be disposed on the inner circumferential surface 2830.

Figure 29:
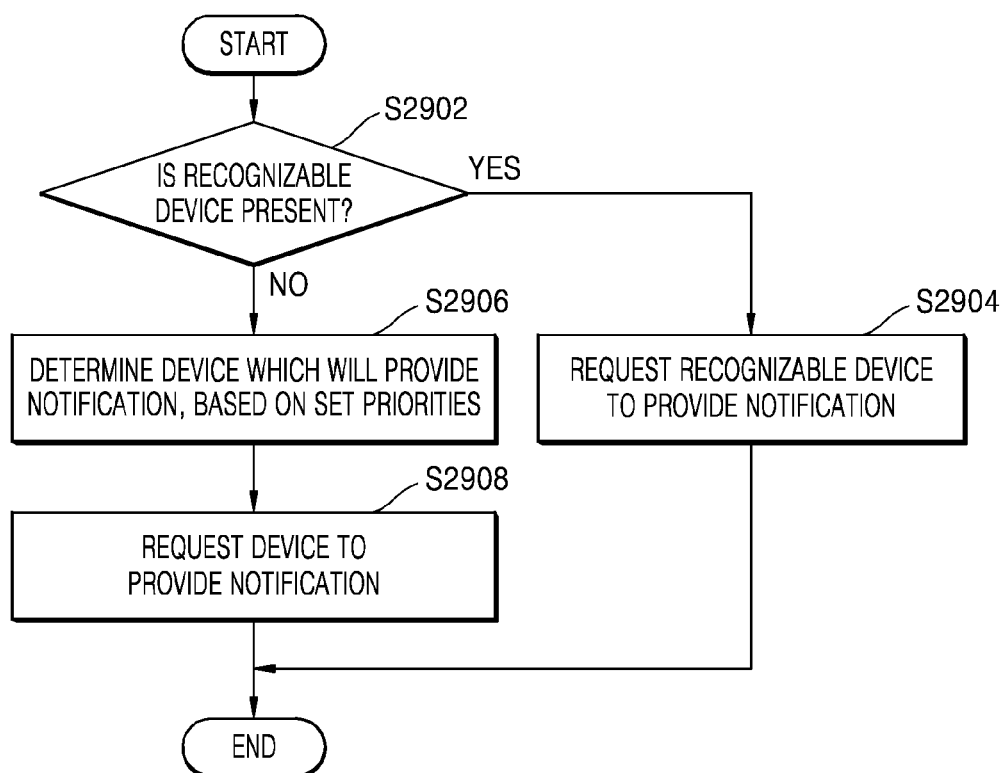
FIG. 29 is a flowchart of a method of determining a device to which a notification is to be provided according to an exemplary embodiment.

FIG. 29 is a flowchart of a method of determining a device to which a notification is to be provided according to another exemplary embodiment.

According to the current exemplary embodiment, the processor 210 of the electronic device 110a or 110b considers whether a recognizable device is present to determine a device to which a notification is to be provided.

When it is determined that recognizable device is present (operation S2902), the processor 210 requests the recognizable device to provide a notification (operation S2904). When it is determined that a recognizable device is not present (operation S2902), the processor 210 determines a device that will provide the notification, based on set priorities (operation S2906) and requests this device to provide the notification (operation S2908).

For example, in operations S814, S1112, S1414, S1504, S1510, and S1610, the exemplary embodiment of FIG. 29 may be one of the set priorities when a device to which the notification is to be provided is determined based on the set priorities.

FIG. 30 is a table illustrating criteria for determining whether a device is a recognizable device and a non-recognizable device according to an exemplary embodiment.

According to one exemplary embodiment, the processor 210 determines whether a recognizable device is present. That is, the processor 210 only determines whether a recognizable device is present, and determines a current state as a non-recognizable state when there is no recognizable device. A device that is held with a user's hand, a device that is held by a car holder but a navigation function is not run therein, a device in which music is played back, a device via which a conversation is being conducted, a device in which user's eye contact is detected, etc. may be determined a recognizable device. According to the current exemplary embodiment, the processor 210 does not determine whether a device is in a non-recognizable state.

When pressure having a reference level or more is detected by a pressure sensor included in a housing of a device and a motion is sensed, the device may be determined as a device that is held with a user's hand. As another example, a device may be determined as a device that is held with a user's hand when a fingerprint is recognized or a temperature is sensed.

Whether the electronic device 110 or the at least one wearable device 120 is combined with a car holder may be determined using a sensor included in an interface between the car holder and the electronic device 110 or the at least one wearable device 120. For example, whether the electronic device 100 is combined with the car holder may be determined using a magnetic sensor, a hall sensor, a conductive sensor, a piezoelectric sensor, or the like that is included in a housing of the electronic device 110 that contacts or that is combined with the car holder. As another example, whether the electronic device 110 or the at least one wearable device 120 is combined with the car holder may be determined by detecting whether an electrode of the car holder contacts an electrode of the electronic device 110 or an electrode of the at least one wearable device 120 or by exchanging a signal between these electrodes.

That music is being played back may be perceived through a function that is being performed in a device.

That a conversion is being conducted may be perceived by receiving external voice using a microphone and perceiving a predetermined pattern of the external voice. For example, that a conversation is being conducted may be perceived by sensing repetitive voice of a specific person.

User's eye contact may be detected by capturing an image using a camera disposed near a display unit of the electronic device 110 or the at least one wearable device 120 and detecting the eyes of a user from the image.

Figure 31:
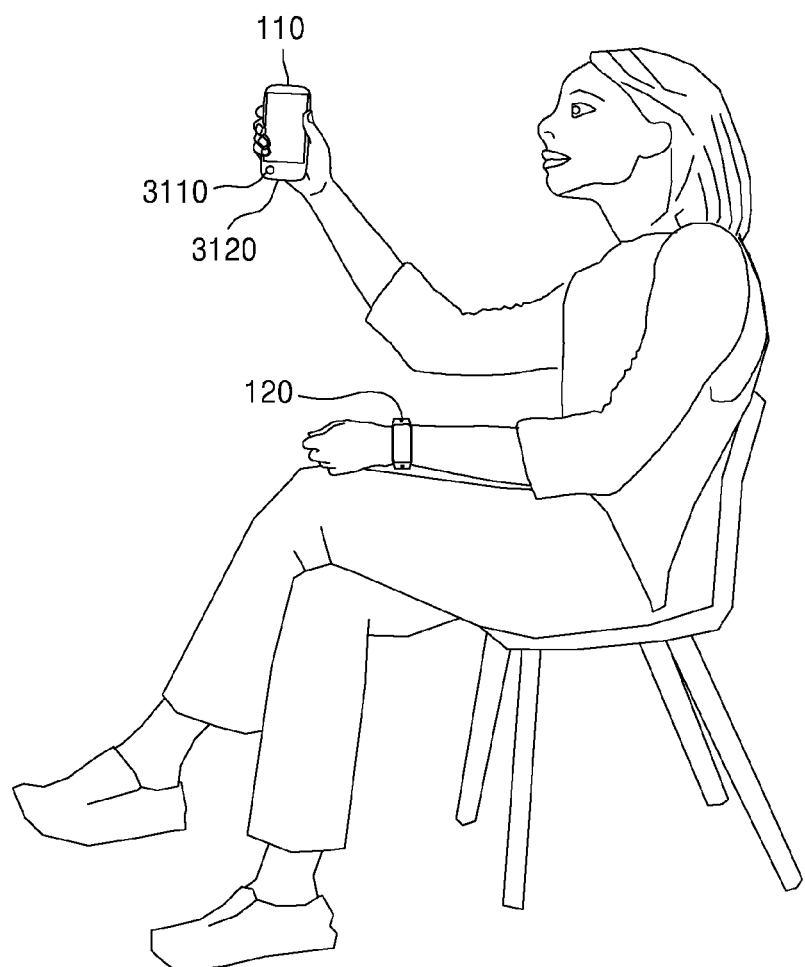
FIG. 31 is a diagram illustrating a method of detecting a line of sight according to an exemplary embodiment.

FIG. 31 is a diagram illustrating a method of detecting a line of sight according to an exemplary embodiment.

According to the current exemplary embodiment, an electronic device 110 or a wearable device 120 may include a display unit 3120 and a camera 310 capable of photographing a subject that the display unit 3120 faces. According to the current exemplary embodiment, the processor 210 of the electronic device 110 or the processor 610 of the at least one wearable device 120 may detect a line of a user's sight of by photographing a subject that the display unit 3120 faces by using the camera 3110. For example, whether the line of the user's sight is toward the electronic device 110 or the wearable device 120 may be determined by detecting the eyes of the user from an image the camera 3110.

According to the current exemplary embodiment, the electronic device 110 may perceive that the line of the user's sight is toward the electronic device 110 itself rather than the at least one wearable device 120.

According to another exemplary embodiment, the processor 210 may determine whether a non-recognizable device is present and determine a current state as a recognizable state when a non-recognizable device is not detected. In this case, the processor 210 does not determine whether a device is recognizable. For example, the processor 210 may determine that a device is in a non-recognizable state when a user is driving a car, is on the move, or is in a movie theater, when the device is in a do-not-disturb mode or in an airplane mode, when a phone call is conducted using the device, when the device is put in a bag or pocket, etc.

That the user is driving a car may be detected using the motion of a smart watch, a smart ring, or a smart bracelet. For example, it may be determined the user is driving a car when a motion of steering a handle is detected by a smart watch, a smart ring, or a smart bracelet. When a navigation function is run the electronic device 110 or the at least one wearable device 120, the processor 210 may also perceive that the user is driving a car. When an image viewed through front glass of an automobile, an image of a dashboard, an image of a side mirror, etc. is detected by a camera of smart glasses, it may also be determined that a user is driving a car.

When an irregular motion of the electronic device 110 or the wearable device 120 is detected together with a change in the location thereof, it may be determined that a user is on the move.

When the intensity of illumination is a reference level or less and a position detection module detects that a user is in a movie theater, it may be determined that the user in the movie theater. When an image of a movie theater is captured by a camera of smart glasses, it may also be determined that a user in a movie theater.

The do-not-disturb mode, the airplane mode, etc. may be perceived by determining a mode set in a device.

That a user is making a phone call may be perceived by detecting a function that is being performed in a device.

When the intensity of illumination sensed by an illumination sensor is equal to a reference level or less and a proximity sensor senses that an object is adjacent to a device, it may be determined that the device is put in a bag or a pocket.

According to another exemplary embodiment, the processor 210 may detect cases in which a device is in a recognizable state or in a non-recognizable state and may not consider whether the device can be recognized when the device is neither in the recognizable state nor the non-recognizable state.

Figure 32:
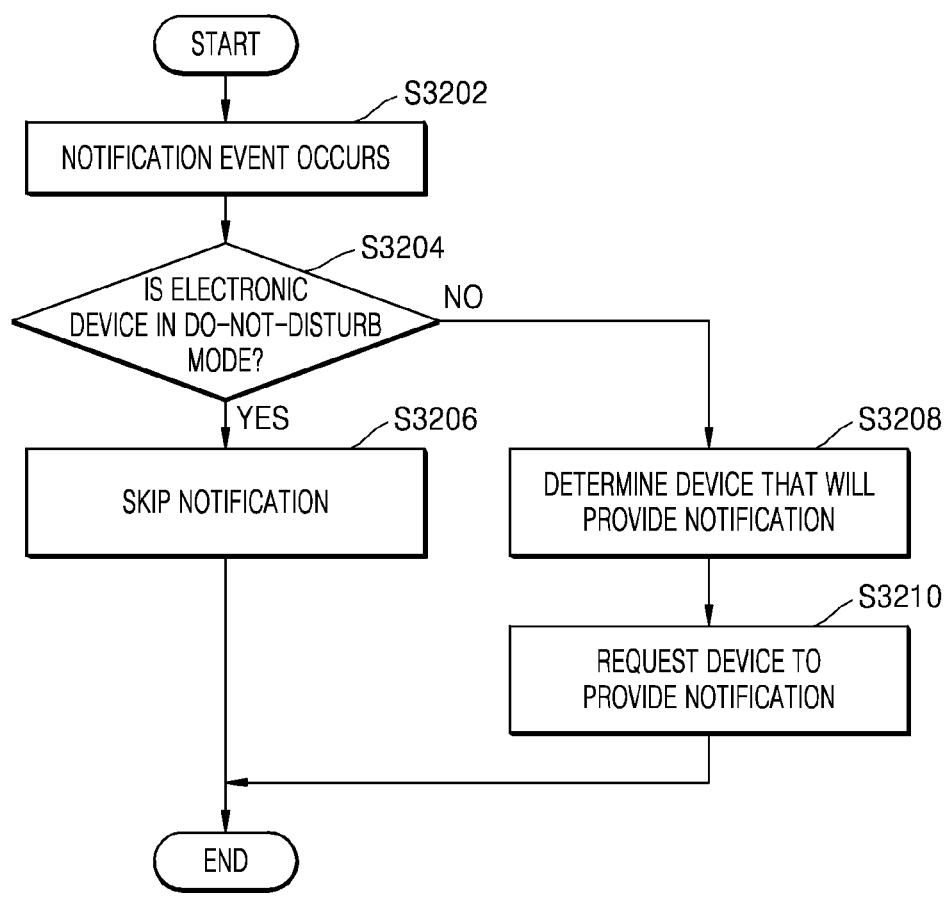
FIG. 32 is a flowchart of a method of providing a notification according to an exemplary embodiment.

FIG. 32 is a flowchart of a method of providing a notification according to an exemplary embodiment.

According to the current exemplary embodiment, even if a notification event occurs (operation S3202), when the electronic device 110 is in the do-not-disturb mode (operation S3204), providing of a notification is skipped (operation S3206).

The do-not-disturb mode is a mode in which a notification is not provided to a user. According to an exemplary embodiment, a notification of all of notification events including a phone call may be skipped in the do-not-disturb mode. According to another exemplary embodiment, in the do-not-disturb mode, a notification of a phone call may be provided but a notification of notification events except for the phone call may be skipped.

According to one exemplary embodiment, when the providing of the notification is skipped (operation S3206), the contents of the notification event may be stored in the electronic device 110 and the notification may be provided to a user when the user turns on a screen of the electronic device 110.

When the electronic device 110 is not in the do-not-disturb mode (operation S3204), the processor 210 may determine a device that will provide the notification, based various criteria according to various exemplary embodiments (operation S3208), and request the determined device to provide the notification (operation S3210).

Figure 33:
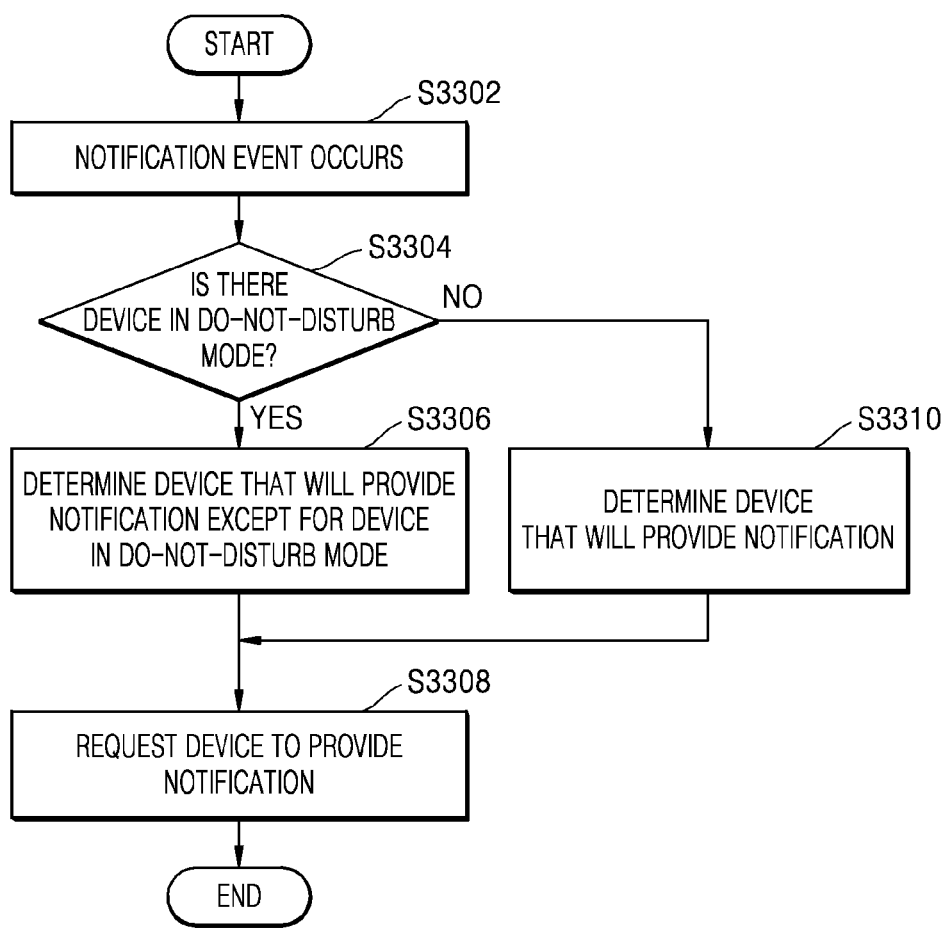
FIG. 33 is a flowchart of a method of providing a notification according to an exemplary embodiment.

FIG. 33 is a flowchart of a method of providing a notification according to an exemplary embodiment.

According to the current exemplary embodiment, when a notification event occurs (operation S3302), whether a device that is in the do-not-disturb mode is present among the electronic device 110 and the at least one wearable device 120 is determined (operation S3304). The processor 210 of the electronic device 110 may request the at least one wearable device 120 to provide information indicating whether the at least one wearable device 120 is in the do-not-disturb mode and receive this information so as to determine whether the at least one wearable device 120 is in the do-not-disturb mode.

When a device that is in the do-not-disturb mode is present among the electronic device 110 and the at least one wearable device 120 (operation S3304), a device that will provide a notification (except for the device that is in the do-not-disturb mode) is determined according to various exemplary embodiments (operation S3306). For example, when the electronic device 110 is in the do-not-disturb mode, a device that will provide the notification (except for the electronic device 110) is determined. As another example, a device that will provide the notification (except for the at least one wearable device 120 that is in the do-not-disturb mode) is determined.

When a device that is in the do-not-disturb mode is not present (operation S3304), a device that will provide the notification is selected from among the electronic device 110 and the at least one wearable device 120 (operation S3310).

When a device that will provide the notification is determined, this device is requested to provide the notification (operation S3308).

Figure 34:
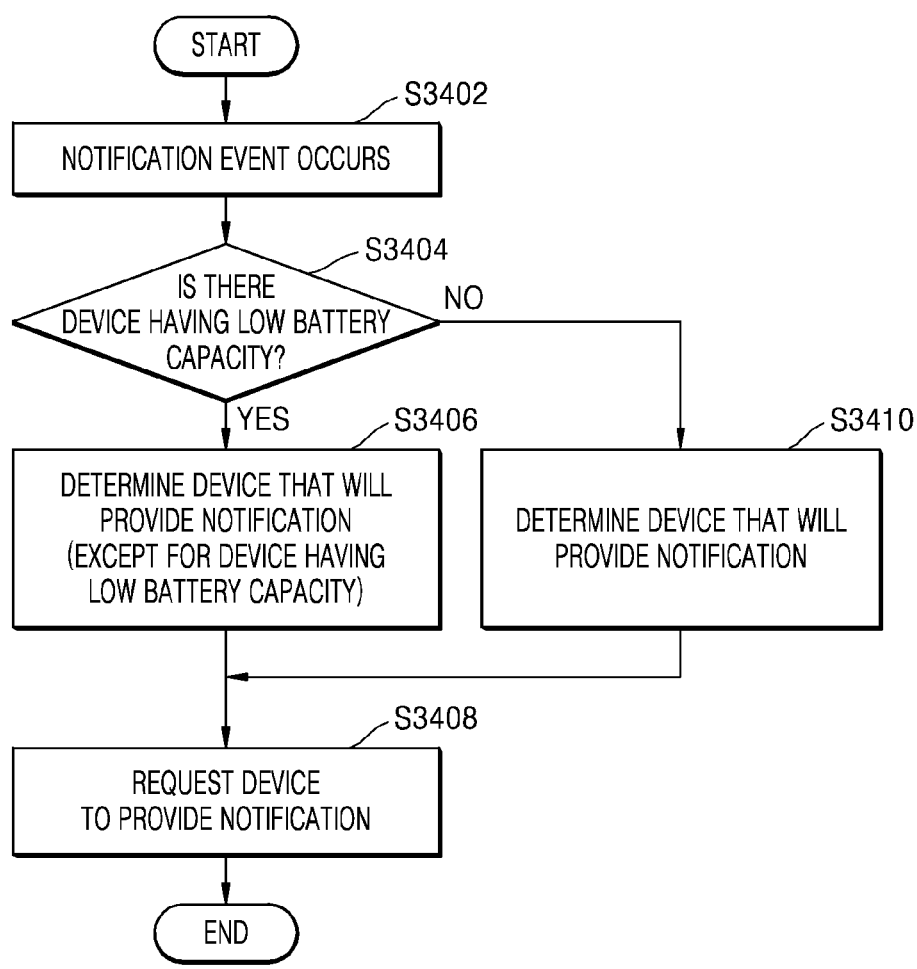
FIG. 34 is a flowchart of a method of providing a notification according to an exemplary embodiment.

FIG. 34 is a flowchart of a method of providing a notification according to an exemplary embodiment.

According to the current exemplary embodiment, when a notification event occurs (operation S3402), whether a device having an insufficient battery capacity is present among the electronic device 110 and the at least one wearable device 120 is determined (operation S3404). Here, the insufficient battery capacity means that a remaining charge capacity of a battery is less than a reference level. The reference level may be set to be the same or different for devices. The processor 210 of the electronic device 110 may request the at least one wearable device 120 to provide information regarding a remaining charge capacity of a battery thereof and receive this information so as to determine whether the at least one wearable device 120 has an insufficient battery capacity.

When a device having an insufficient battery capacity is present (operation S3404), a device that will provide the notification (except for the device having an insufficient battery capacity) is determined according to various exemplary embodiments (operation S3406). For example, when the electronic device 110 has an insufficient battery capacity, a device that will provide the notification (except for the electronic device 110) is determined. As another example, a device that will provide the notification (except for the at least one wearable device 120 having an insufficient battery capacity) is determined.

When a device having an insufficient battery capacity is not present (operation S3404), a device that will provide the notification is selected from among the electronic device 110 and the at least one wearable device 120 (operation S3410).

When a device that will provide the notification is determined, this device is requested to provide the notification (operation S3408)

Figure 35:
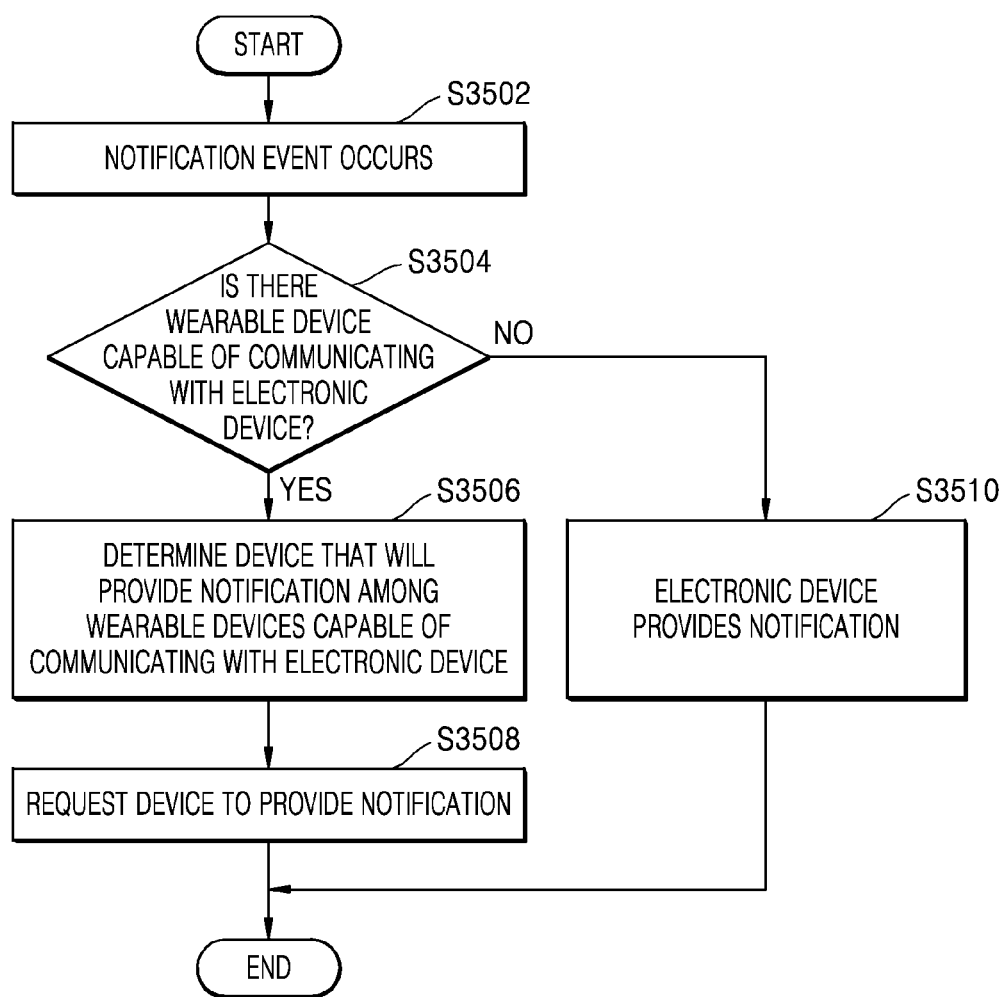
FIG. 35 is a flowchart of a method of providing a notification according to an exemplary embodiment.

FIG. 35 is a flowchart of a method of providing a notification according to an exemplary embodiment.

According to the current exemplary embodiment, when a notification event occurs (operation S3502), the processor 210 determines whether the at least one wearable device 120 capable of communicating with the electronic device 110 is present (operation S3504). The processor 210 of the electronic device 110 may detect a communication state between the electronic device 110 and the at least one wearable device 120 to determine whether the at least one wearable device 120 capable of communicating with the electronic device 110 is present.

When the at least one wearable device 120 is capable of communicating with the electronic device 110 (operation S3504), a device that will provide the notification is selected among the at least one wearable device 120 capable of communicating with the electronic device 110 according to various exemplary embodiments (operation S3506) and is requested to provide the notification (operation S3508).

When the at least one wearable device 120 capable of communicating with the electronic device 110 is not present (operation S3504), the electronic device 110 provides the notification (operation S3510).

Figure 36:
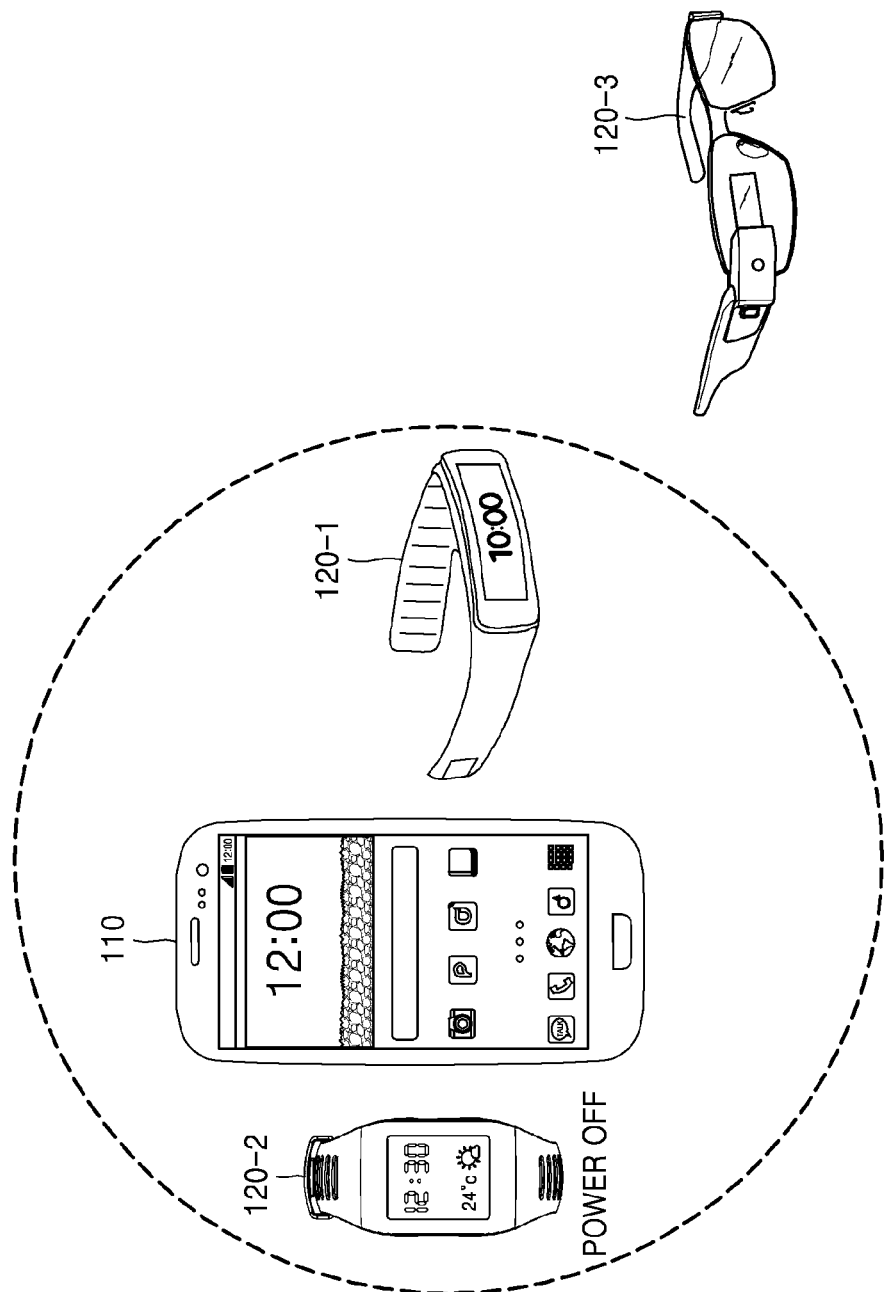
FIG. 36 is a diagram illustrating a structure for explaining a process of considering a communication state between devices according to an exemplary embodiment.

FIG. 36 is a diagram illustrating a structure for explaining a process of considering a communication state between devices according to an exemplary embodiment.

While an electronic device 110 operates such that it may communicate with first to third wearable devices 120-1, 120-2, and 120-3, the electronic device 110 may not be capable of communicating with at least one of the first to third wearable devices 120-1, 120-2, and 120-3 for example, in a case in which the second wearable device 120-2 is powered off, in a case in which the third wearable device 120-3 is distant from the electronic device 110, or in a case in which the third wearable device 120-3 or the electronic device 110 cancels a communication between the third wearable device 120-3 and the electronic device 110. According to the current exemplary embodiment, when a notification event occurs, first, a communication state between the electronic device 110 and the first to third wearable devices 120-1, 120-2, and 120-3 may be checked, thereby preventing a notification request from being not transmitted or determining of a device, which will provide the notification, from being delayed, caused when the communication state is not considered.

Figure 37:
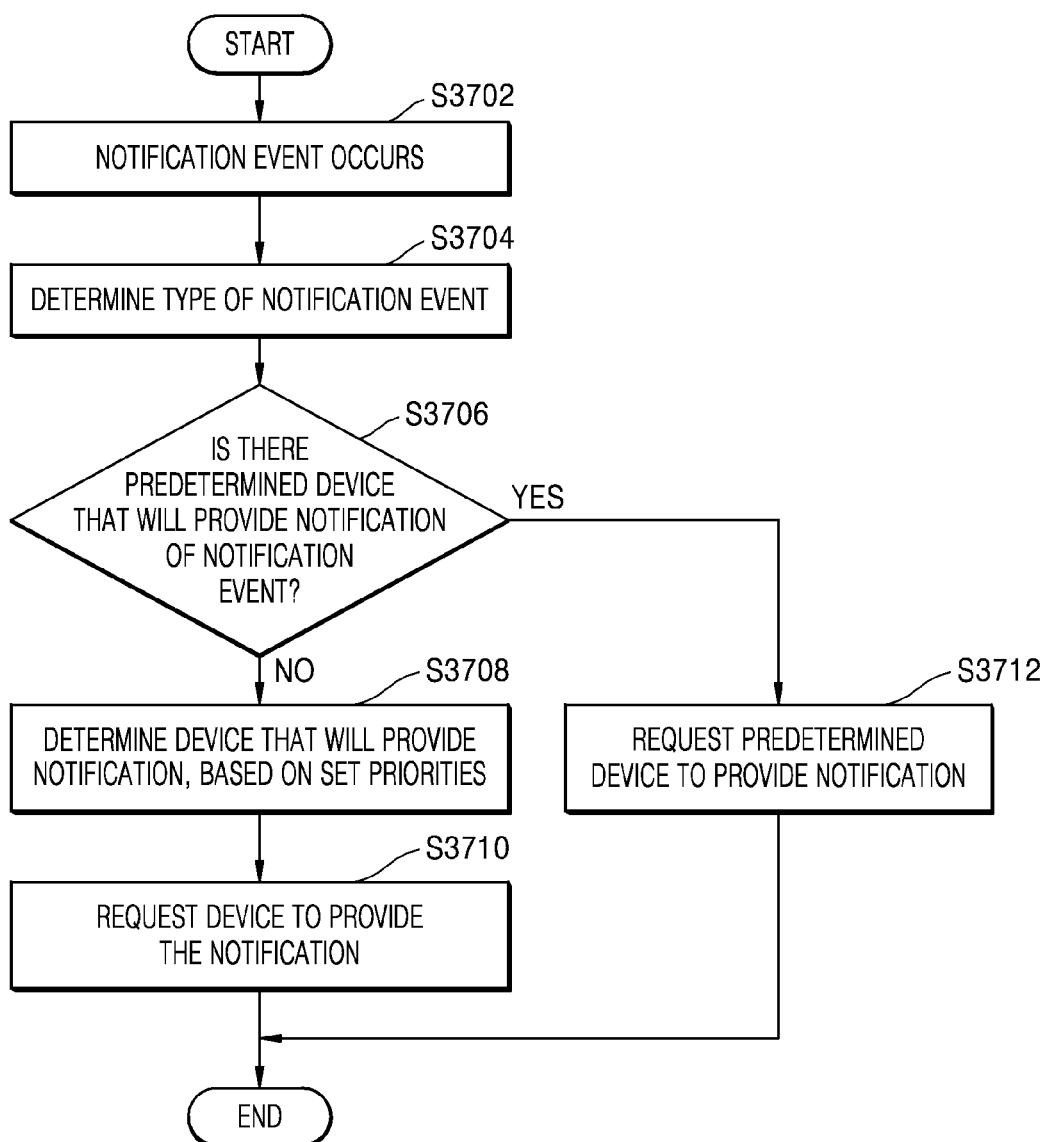
FIG. 37 is a flowchart of a method of providing a notification according to an exemplary embodiment.

FIG. 37 is a flowchart of a method of providing a notification according to an exemplary embodiment.

According to the current exemplary embodiment, when a notification event occurs (operation S3702), the type of the notification event is determined (operation S3704) and it is determined whether a predetermined device that will provide a notification of the notification event is present (operation S3706). For example, it may be determined beforehand that a notification of a phone call should be provided by the electronic device 110 and a smart watch.

When the predetermined device that will provide the notification of the notification event is present (operation S3706), the predetermined device is requested to provide the notification (operation S3712).

When the predetermined device that will provide a notification of the notification event is not present (operation S3706), a device that will provide the notification is determined based on set priorities according to various exemplary embodiments (operation S3708) and is requested to provide the notification (operation S3710).

In one exemplary embodiment, an order of notification of the plurality of wearable devices and the electronic device may be set. The plurality of wearable devices and the electronic device may then be sent notifications based on the order of notification. The order of notification may be determined based on status information of the electronic device or the plurality of wearable devices. The order of notification may also be determined based on and based on the type of notification.

FIG. 38 is a table illustrating a device that is predetermined to provide a notification according to the type of a notification event according to an exemplary embodiment.

According to the current exemplary embodiment, a device that will provide a notification is predetermined according to the type of a notification event and stored in a storage unit (not shown). For example, a notification of a phone call may be provided to the electronic device 110 and a smart watch. When communication between a device and the electronic device 110 is disconnected, a notification indicating the type of the device may be provided to the electronic device 110. When a device has an insufficient battery capacity, a notification indicating this fact may be provided to the electronic device 110 and the device having the insufficient battery capacity.

When a notification event occurs, the exemplary embodiments of FIGS. 32, 33, 34, 35, and 37 may be performed before determining the above-described criteria, i.e., whether a wearable device is in the wearing state, whether a device that is in use is present, whether a recognizable device is present, etc.

According to one exemplary embodiment, when a notification event occurs, the processor 210 may determine whether there is a device that is predetermined to provide a notification according to the type of the notification event according to the exemplary embodiment of FIG. 37, determine whether a wearable device that is able to communicate with the electronic device 110 according to the exemplary embodiment of FIG. 35, determine whether there is a device that is in the do-not-disturb mode according to the exemplary embodiment of FIG. 32 or 33, and determine whether there is a device having an insufficient battery capacity according to the exemplary embodiment of FIG. 34. The above determinations are performed according to the priorities described above but all of the criteria need not be applied and various combinations thereof may be used according to an exemplary embodiment. According to the current exemplary embodiment, first, it is determined whether a device that is predetermined to provide a notification according to the type of a notification event is present, thereby minimizing process load on the determination of a device that will provide the notification.

According to another exemplary embodiment, when a notification event occurs, the processor 210 may determine whether a wearable device that is able to communicate with the electronic device 110 is present according to the exemplary embodiment of FIG. 35, determine whether there is a device predetermined to provide a notification based on the type of the notification event according to the exemplary embodiment of FIG. 37, determine whether there is a device that is in the do-not-disturb mode according to the exemplary embodiment of FIG. 32 or 33, and determine whether there is a device having an insufficient battery capacity according to the exemplary embodiment of FIG. 34. The above determinations are performed according to the priorities described above but all of the criteria need not be applied and various combinations thereof may be used according to an exemplary embodiment. According to the current exemplary embodiment, a time delay caused by a communication failure may be minimized.

In addition, the exemplary embodiments of FIGS. 32, 33, 34, 35, and 37 may be applied in various orders.

Figure 39:
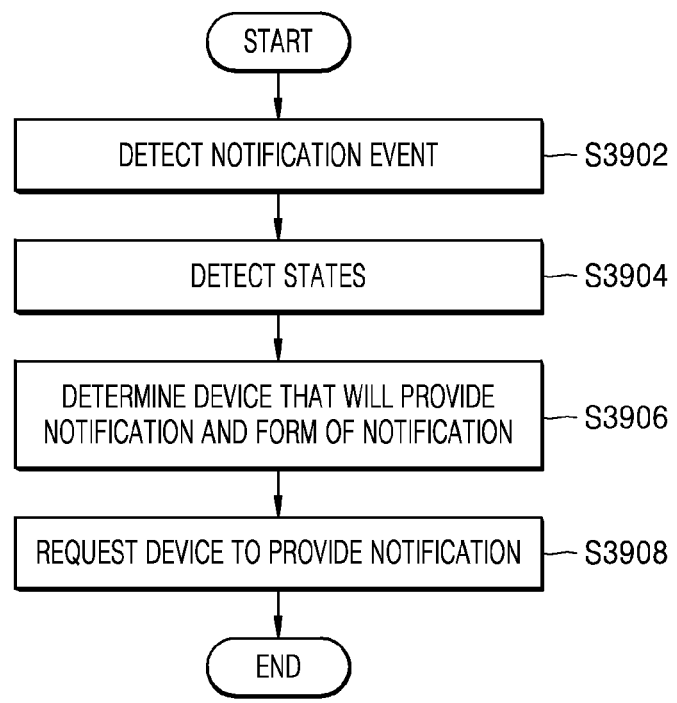
FIG. 39 is a flowchart of a method of providing a notification according to an exemplary embodiment.

FIG. 39 is a flowchart of a method of providing a notification according to an exemplary embodiment.

According to the current exemplary embodiment, a notification event is detected (operation S3902), the states of the electronic device 110 and the at least one wearable device 120 are detected (operation S3904), and a device that will provide a notification and a form of the notification are determined (operation S3906). According to the current exemplary embodiment, the processor 210 determines a device that will provide the notification and a form of the notification based on the states of the electronic device 110 and the at least one wearable device 120.

Since the form of the notification is also considered based on the states of the electronic device 110 and the at least one wearable device 120, a probability that a user will immediately check the notification may be increase and interruptions that may be caused to the user may be minimized.

When the device that will provide the notification and the form of the notification are determined, the device that will provide the notification is requested to provide the notification (operation S3908).

Figure 40:
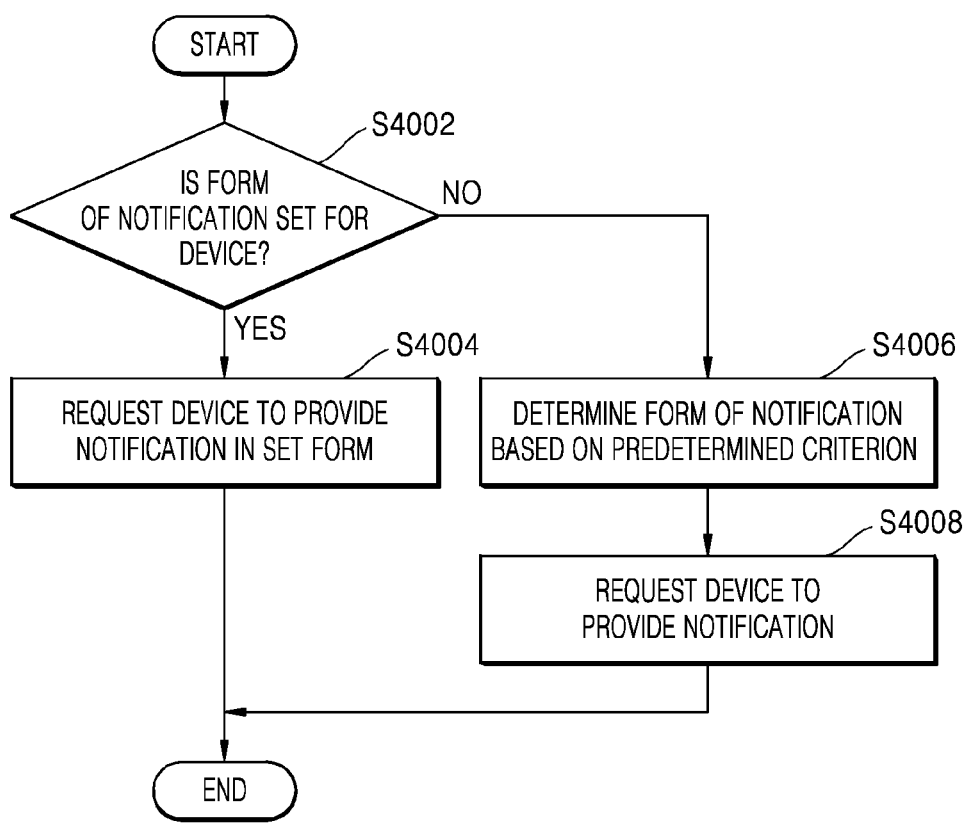
FIG. 40 is a flowchart of a method of determining a form of a notification according to an exemplary embodiment.

FIG. 40 is a flowchart of a method of determining a form of a notification according to an exemplary embodiment.

According to the current exemplary embodiment, when a form of a notification is set for the electronic device 110 or the at least one wearable device 120, the notification is provided in the set form. According to one exemplary embodiment, the form of the notification may vary according to the type of an event.

When a form of the notification is set for a device determined to provide the notification (operation S4002), the processor 210 requests the device to provide the notification in the set form (operation S4004). When a form of the notification is not set for a device determined to provide the notification (operation S4002), the processor 210 determines a form of the notification based on a predetermined criterion (operation S4006) and requests the device determined to provide the notification to provide the notification in the form (operation S4008).

For example, the predetermined criterion for determining the form of the notification includes determining the form of the notification according to the type of the notification event, providing the notification in a form that is set as a default, etc.

Figure 41:
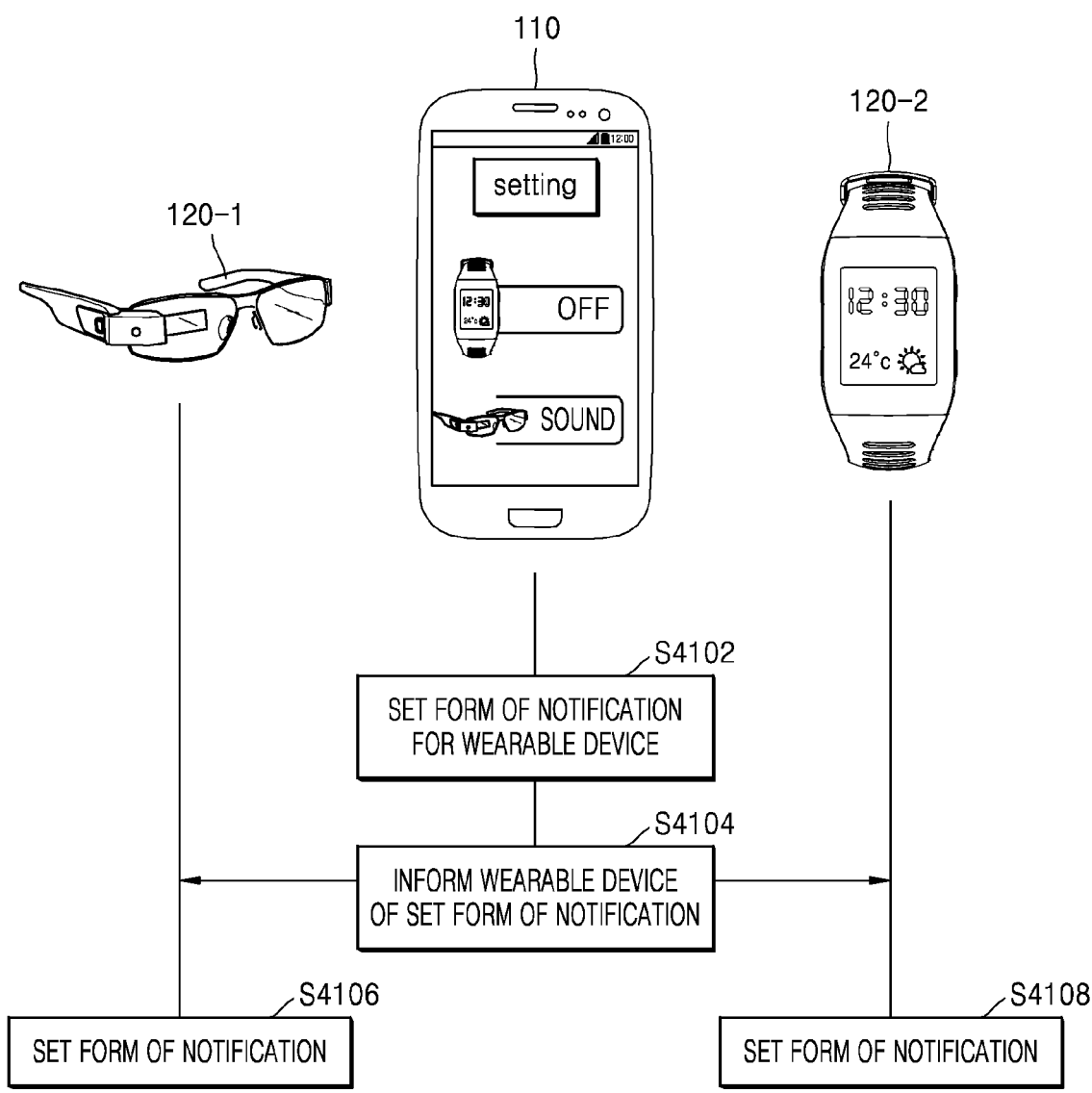
FIG. 41 is a flowchart of a method of setting a form of a notification according to an exemplary embodiment.

FIG. 41 is a flowchart of a method of setting a form of a notification according to an exemplary embodiment.

According to the current exemplary embodiment, a form of a notification may be set for all of the wearable devices 120-1 and 120-2 connected to the electronic device 110 to establish communication with the electronic device 110 (operation S4102). For example, the electronic device 110 may set a sound notification as the form of the notification of the smart glasses 120-1 and turn off the notification of the smart watch 120-2 according to user input as illustrated in FIG. 41.

When the electronic device 110 sets a form of the notification of at least one wearable device among the wearable devices 120-1 and 120-2 (operation S4102), the electronic device 110 informs the at least one wearable device of the set form of the notification (operation S4104). For example, when the electronic device 110 does not change the form of the notification of the smart glasses 120-1 and changes the form of the notification of the smart watch 120-2, a control signal for setting the form of the notification may be transmitted to the smart watch 120-2 for which the form of the notification is changed. The at least one wearable device 120-1 or 120-2 that receives the control signal from the electronic device 110 may set the form of the notification thereof according to the control signal (operations S4106 and S4108).

Figure 42:
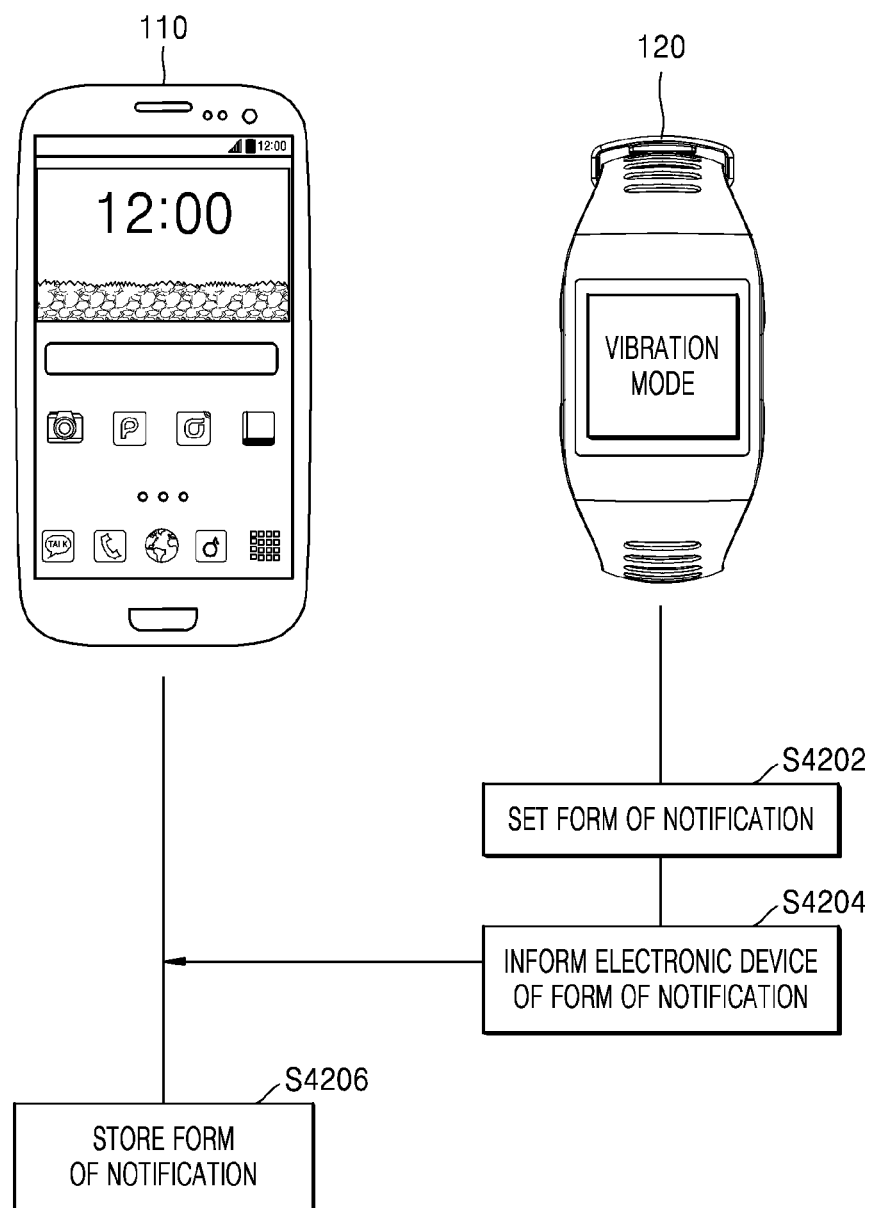
FIG. 42 is a flowchart of a method of setting a form of a notification according to an exemplary embodiment.

FIG. 42 is a flowchart of a method of setting a form of a notification according to an exemplary embodiment.

According to the current exemplary embodiment, each of the at least one wearable device 120 may set a form of a notification thereof. According to one exemplary embodiment, when each of the at least one wearable device 120 sets a form of a notification thereof (operation S4202), each of the at least one wearable device 120 may inform the electronic device 110 of the form of the notification thereof (operation S4204). For example, when a user sets a form of the notification of the smart watch 120 as a vibration notification (operation S4202), the smart watch 120 informs the electronic device 110 of this fact (operation S4204). When the electronic device 110 receives the information that the form of the notification of the smart watch 120s is set as the vibration notification from the smart watch 120, the electronic device 110 stores and manages the information (operation S4206).

Figure 43:
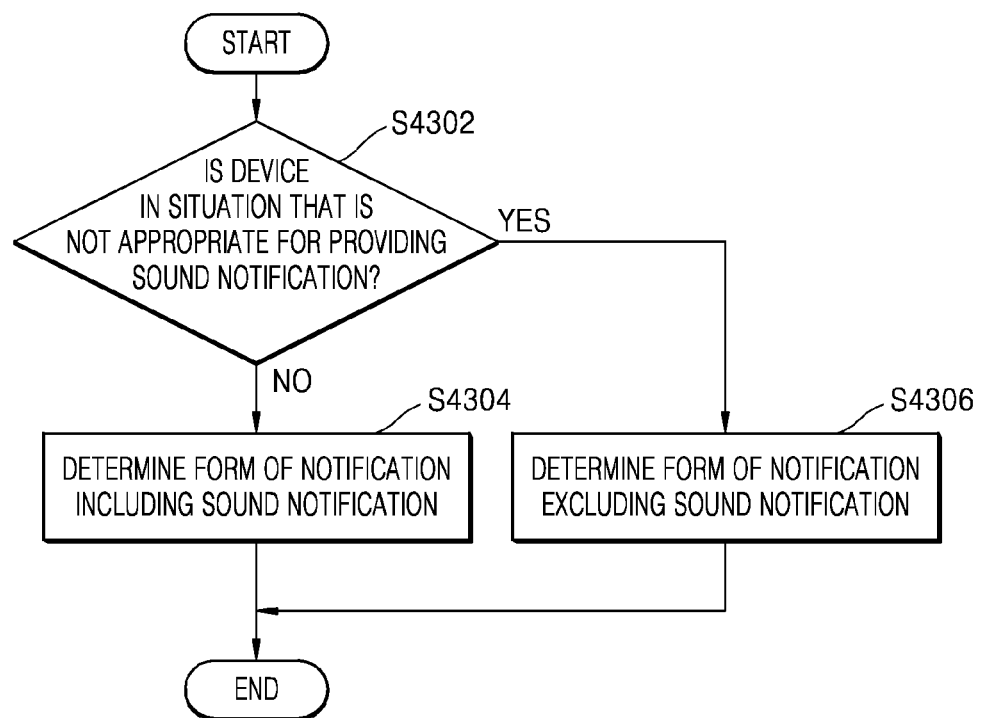
FIG. 43 is a flowchart of a method of determining a form of a notification according to an exemplary embodiment.

FIG. 43 is a flowchart of a method of determining a form of a notification according to an exemplary embodiment.

According to the current exemplary embodiment, when a device that will provide a notification is determined, the processor 210 determines whether the device is in a situation that is not appropriate for providing a sound notification (operation S4302). Here, the situation that is not appropriate for providing a sound notification means a situation in which a user is not likely to recognize the sound notification due to surrounding noise or that is interrupted by the sound notification. The situation that is interrupted by the sound notification may include, for example, when a user is attending a lecture or is in a movie theater, etc.

According to one exemplary embodiment, information for determining whether the device is in a situation that is not appropriate for providing the sound notification may be obtained by a device capable of obtaining this information among the electronic device 110 and the at least one wearable device 120. For example, in order to obtain the information whether the user is attending a lecture or is in a movie theater, smart glasses may capture an image by using a camera, the processor 210 of the electronic device 110 or the smart glasses may recognize a current situation based on the image captured by the smart glasses, and the processor 210 may determine that both the electronic device 110 and the at least one wearable device 120 are in the situation that is not appropriate for providing the sound notification when the user is attending a lecture.

When the device is not in the situation that is not appropriate for providing the sound notification (operation S4302), the processor 210 determines a form of the notification, including the sound notification (operation S4304). When the device is in the situation that is not appropriate for providing the sound notification (operation S4302), the processor 210 determines a form of the notification excluding the sound notification (operation S4306).

FIG. 44 is a table illustrating a list of cases in which a sound notification is not appropriate according to an exemplary embodiment.

According to the current exemplary embodiment, the processor 210 may determine a case in which a noise level is equal to or greater than a reference level, a case in which a user is attending a lecture, a case in which a user is in a movie theater, etc., as situations in which a sound notification is not appropriate. The processor 210 may receive noise via a microphone included in the electronic device 110 or the wearable device 120 and determine whether the level of the noise is equal to or greater than a reference level. Whether a user is attending a lecture or is in a move theater may be determined based on an image captured by a camera included in smart glasses.

FIG. 45 is a table illustrating examples of a predetermined device that will provide a notification and a predetermined form of the notification according to an exemplary embodiment.

According to one exemplary embodiment, the processor 210 may determine a device that will provide a notification and a form of the notification based on predetermined criteria. FIG. 45 illustrates examples of predetermined criteria for a device that will provide a notification of a notification event except for a phone call and a form of the notification when the smart watch 120 and the electronic device 110 are used together.

When pressure having a reference level or more is detected by a pressure sensor included in a housing of the electronic device 110 or the wearable device 120 and the electronic device 110 or the wearable device 120 is neither on a table nor in a pocket or a bag, it may be determined that the electronic device 110 or the wearable device 120 is held with a user's hand.

When acceleration perpendicular to a direction of gravity is detected and a motion is not detected, the electronic device 110 or the wearable device 120 may be determined that it is on a table.

Figure 47:
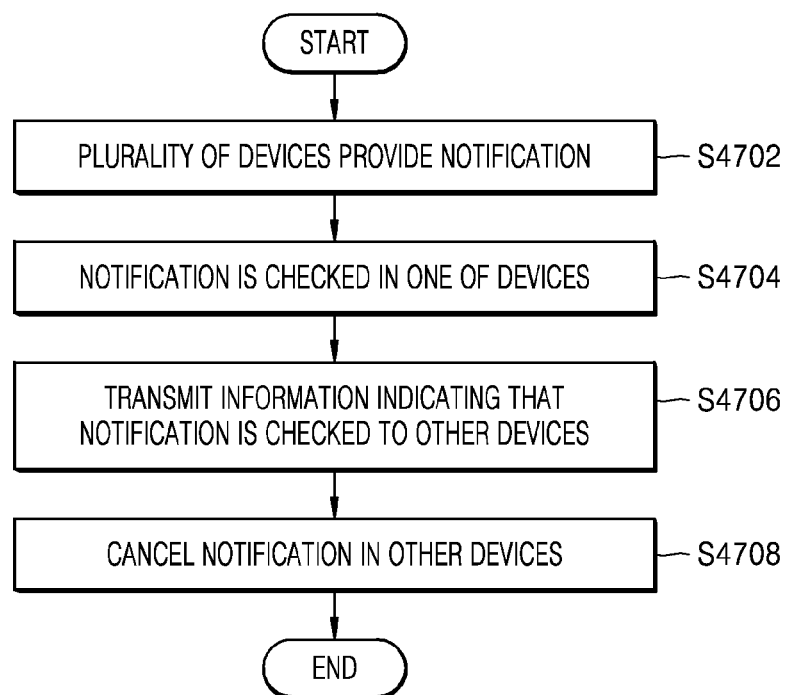
FIG. 47 is a flowchart of a method of providing a notification according to an exemplary embodiment.

FIG. 46 is a table illustrating examples of predetermined criteria for a device that will provide a notification of a notification event that communication between the smart watch 120 and the electronic device 110 is disconnected and a form of the notification when the smart watch 120 and the electronic device 110 are used together, according to an exemplary embodiment FIG. 47 is a flowchart of a method of providing a notification according to an exemplary embodiment.

According to the current exemplary embodiment, when a plurality of devices provide a notification (operation S4702) and the notification is checked in one of the plurality of devices (operation S4704), the device transmits information indicating that the notification is checked to the other devices (operation S4706) and cancels the notification in the other devices (operation S4708). According to the current exemplary embodiment, the notification may be prevented from being continued unnecessarily.

Figure 48:
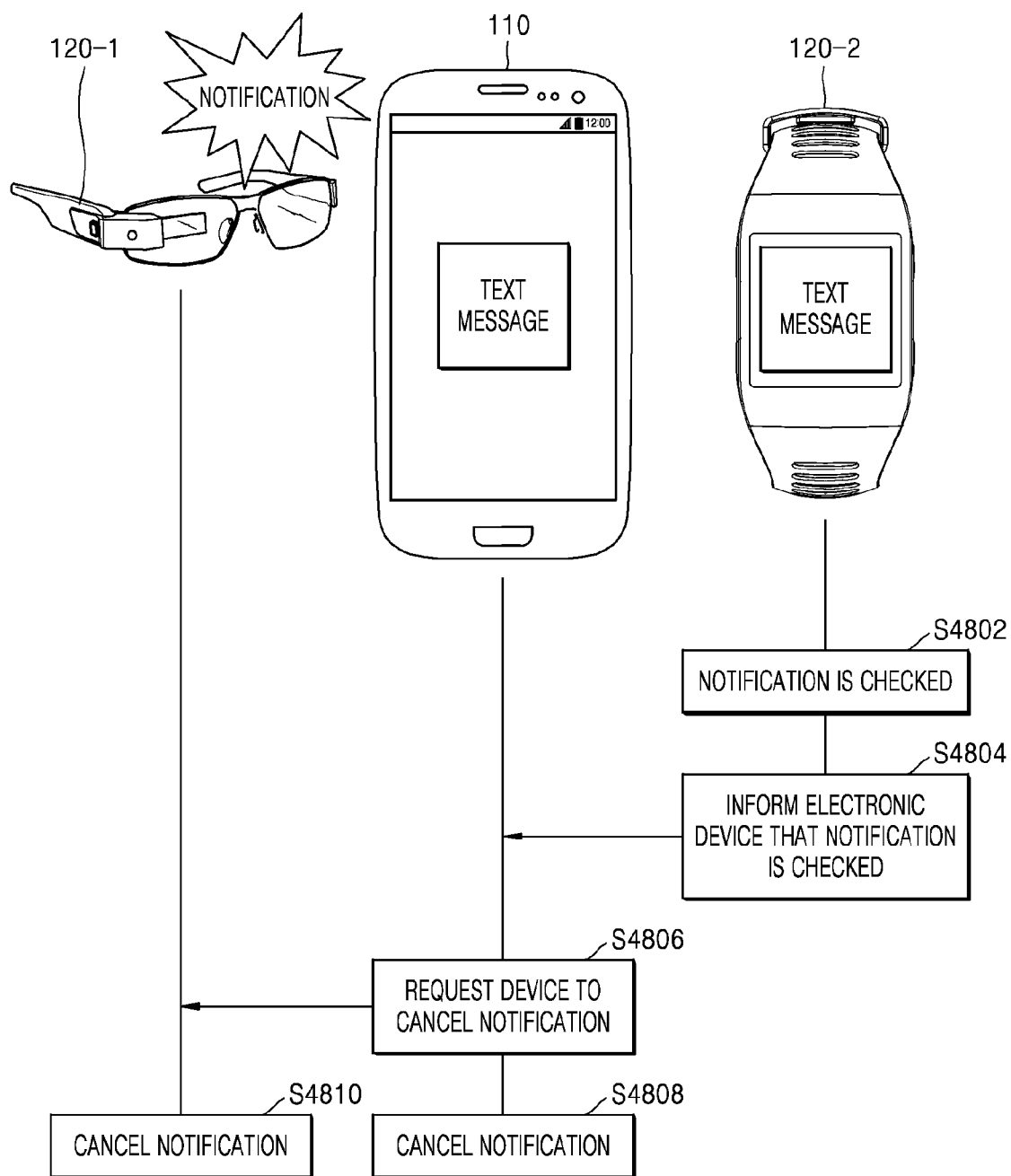
FIG. 48 is a flowchart of a method of providing a notification according to an exemplary embodiment.

FIG. 48 is a flowchart of a method of providing a notification according to an exemplary embodiment.

According to the current exemplary embodiment, when a plurality of devices 110, 120-1, and 120-2 provide a notification and the notification is checked in a device among them, the device informs the other devices that the notification is checked and the electronic device 110 requests the other devices to cancel the notification. For example, when the notification is provided to the electronic device 110, the first wearable device 120-1, and the second wearable device 120-2 and is checked in the second wearable device 120-2 (operation S4802), the second wearable device 120-2 informs the electronic device 110 that the notification is checked (operation S4804). When the electronic device 110 receives the information indicating the notification is checked from the second wearable device 120-2 (operation S4804), it is determined whether the notification is provided to another device except for the second wearable device 120-2 and the electronic device 110. When the notification is provided to another device, the device is requested to cancel the notification (operation S4806). Referring to FIG. 48, the electronic device 110 requests the first wearable device 120-1 to cancel the notification (operation S4806). Then, the notification is canceled in the first wearable device 120-1 and the electronic device 110 (operations S4808 and S4810).

In one exemplary embodiment, once a notification is received, acknowledged or seen by a user at one device from among the plurality of wearable devices and electronic device, the notification may be removed from one or more of the remaining devices from among the plurality of wearable devices and electronic device.

Figure 49:
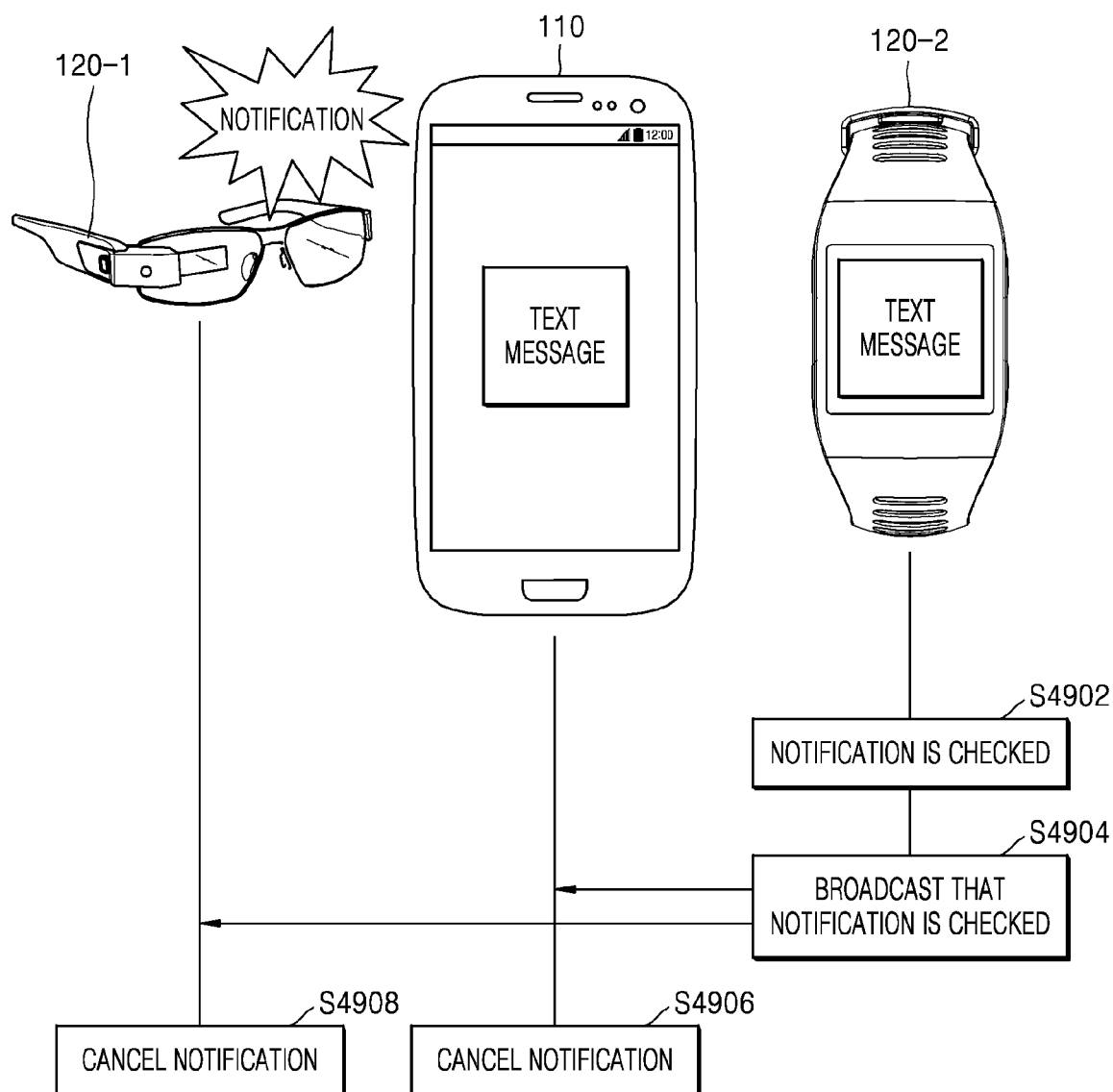
FIG. 49 is a flowchart of a method of providing a notification according to an exemplary embodiment.

FIG. 49 is a flowchart of a method of providing a notification according to an exemplary embodiment.

According to the current exemplary embodiment, when a plurality of devices 110, 120-1, and 120-2 provide a notification and the notification is checked in a device among them, the device informs the other devices or another device to which the notification is provided of the fact that the notification is checked. For example, when the notification is provided to the electronic device 110, the first wearable device 120-1, and the second wearable device 120-2 and is checked in the second wearable device 120-2 (operation S4902), the second wearable device 120-2 informs the electronic device 110 and the first wearable device 120-1 of the fact that the notification is checked (operation S4904). Then, the electronic device 110 and the first wearable device 120-1 receive this information from the second wearable device 120-2, and cancel the notification (operations S4906 and S4908).

Figure 50:
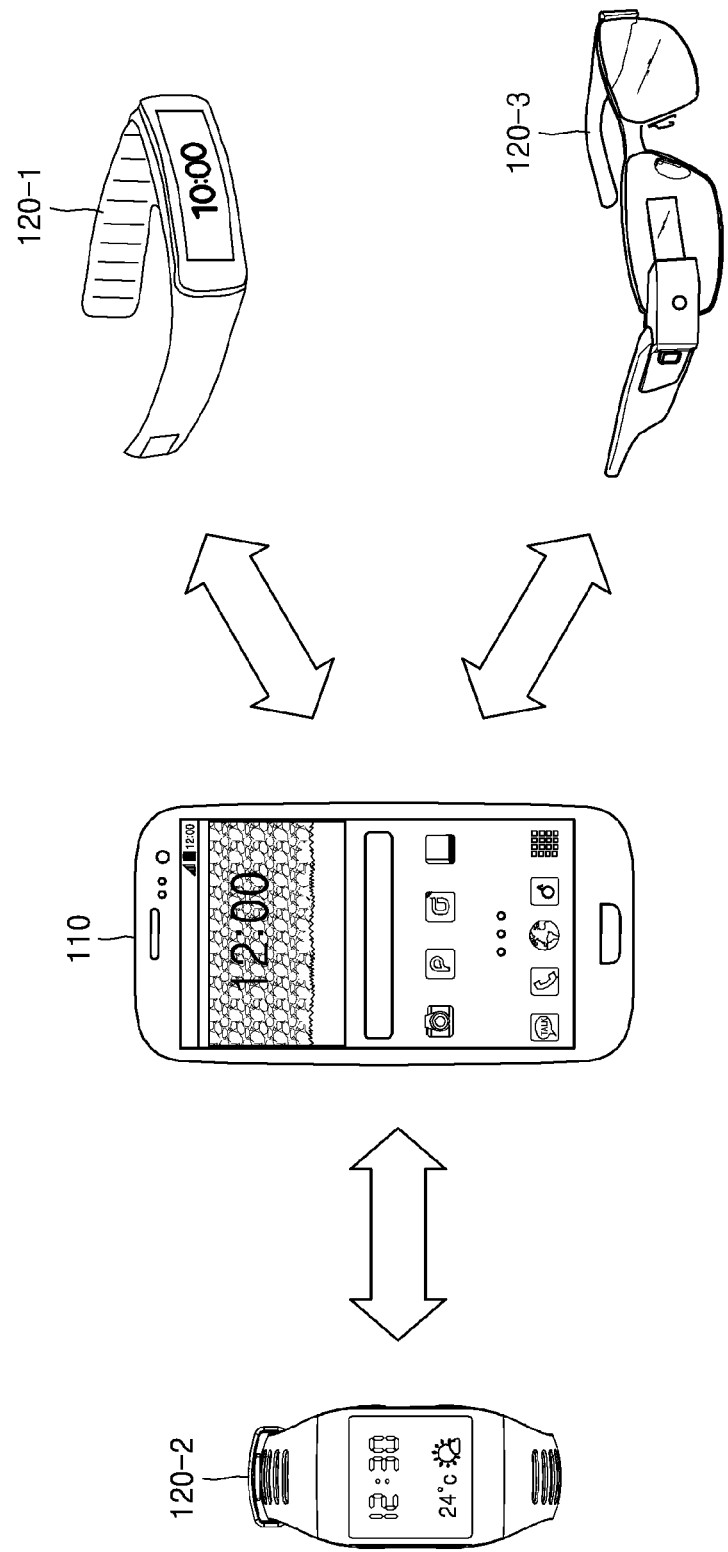
FIG. 50 is a diagram illustrating a method of determining a device that provides a notification according to an exemplary embodiment.

FIG. 50 is a diagram illustrating a method of determining a device that provides a notification according to an exemplary embodiment;

According to the current exemplary embodiment, an electronic device 110 determines either a device that will provide a notification or a form of the notification regardless of a device in which a notification event occurs. In this case, information regarding the states of the wearable devices 120-1, 120-2, and 120-3 is transmitted to the electronic device 110 and the electronic device 110 may determine a device that will provide a notification or a form of the notification based on the information regarding the states of the wearable devices 120-1, 120-2, and 120-3.

Figure 51:
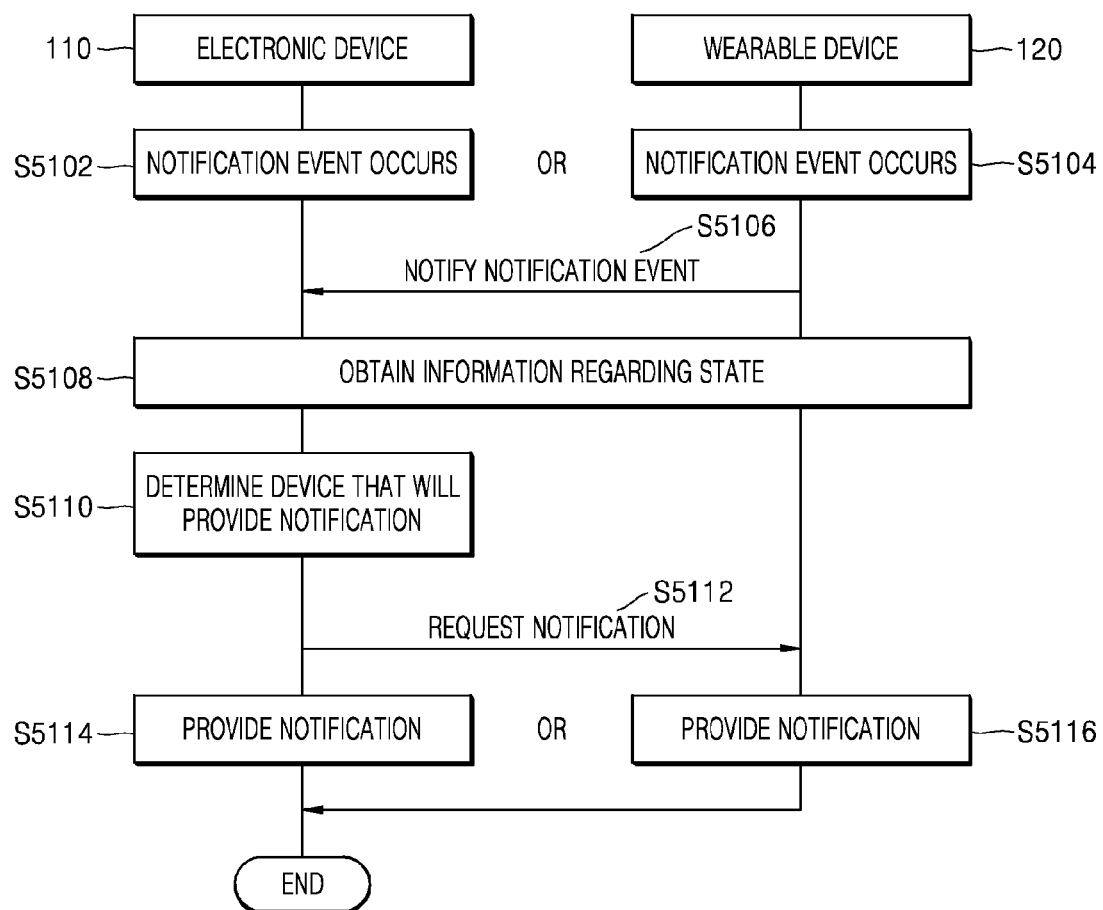
FIG. 51 is a flowchart of a method of determining a device that will provide a notification according to an exemplary embodiment.

FIG. 51 is a flowchart of a method of determining a device that will provide a notification according to an exemplary embodiment.

According to the current exemplary embodiment, a notification event may occur in the electronic device 110 or the wearable device 120 (operations S5102 and S5104). When the notification event occurs in the wearable device 120 (operation S5104), the at least one wearable device 120 informs the electronic device 110 of the notification event (operation S5106). The electronic device 110 obtains information regarding the state of the wearable device 120 periodically or at a point of time when the occurrence of the notification event is informed (operation S5108).

When the electronic device 110 obtains the information regarding the states of the electronic device 110 and the at least one wearable device 120, the electronic device 110 may determine a device that will provide a notification according to one of the previous exemplary embodiments (operation S5110). If it is determined that the wearable device 120 will provide the notification, the electronic device 110 requests the wearable device 120 to provide the notification (operation S5112). Then, the electronic device 110 and/or the wearable device 120 provide the notification (operations S5114 and S5116).

Figure 52:
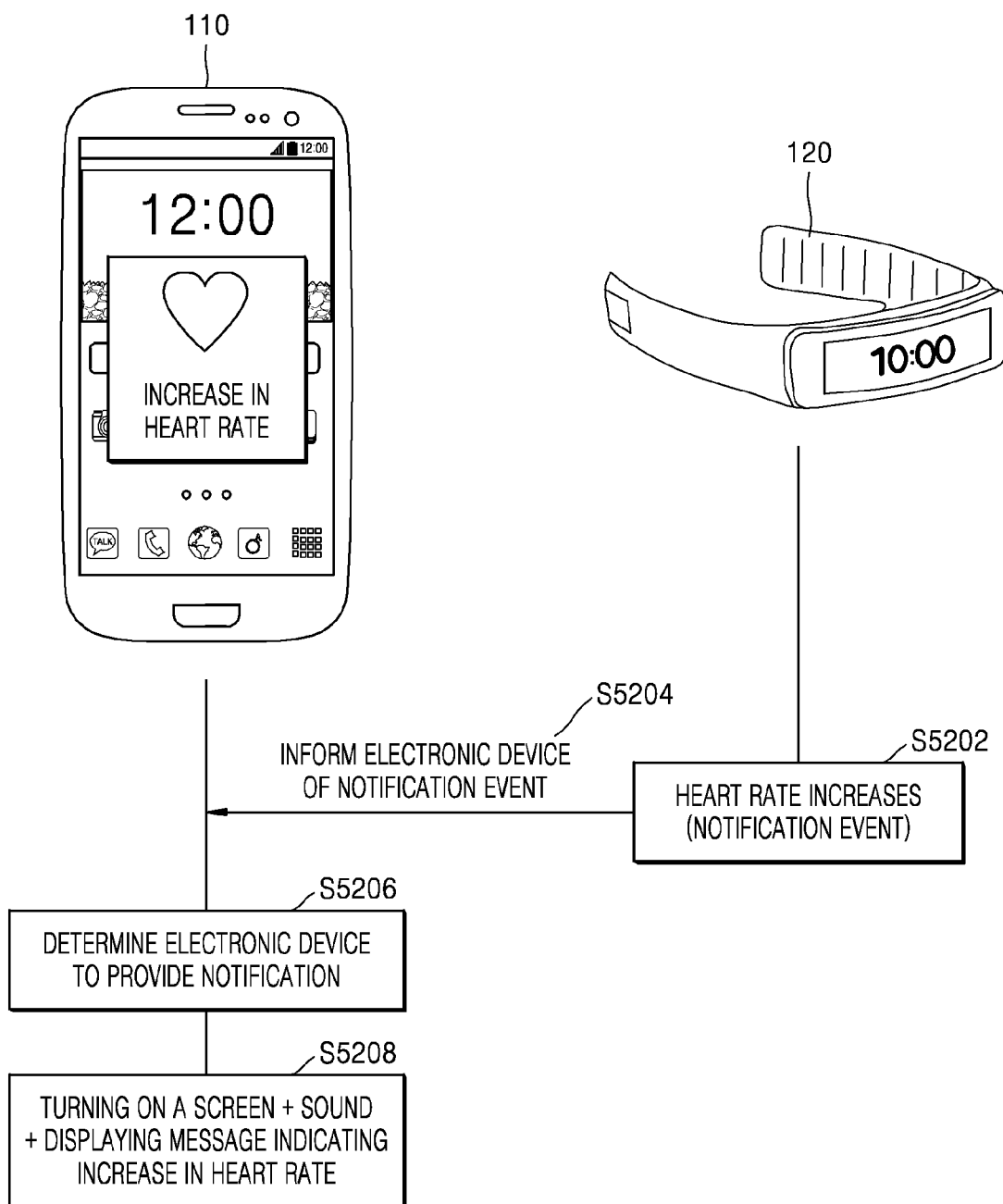
FIG. 52 is a flowchart of a method of determining a device that will provide a notification according to an exemplary embodiment.

FIG. 52 is a flowchart of a method of determining a device that will provide a notification according to an exemplary embodiment. FIG. 52 illustrates a detailed example of the exemplary embodiment of FIG. 51.

According to the current exemplary embodiment, when a heart rate increases and a notification event thus occurs while the wearable device 120 monitors the heart rate (operation S5202), the wearable device 120 informs the electronic device 110 of the notification event regarding an increase in the heart rate (operation S5204). When the electronic device 110 receives the information regarding the event from the wearable device 120, the electronic device 110 determines a device that will provide a notification and a form of the notification (operation S5206). For example, the electronic device 110 determines the notification to be provided by itself by turning on a screen, using a sound notification, or displaying a message. Then, the electronic device 110 provides the notification in the determined form (operation S5208).

According to one exemplary embodiment, the electronic device 110 may additionally inform the wearable device 120 (in which the notification event occurs) that another device will provide the notification.

Figure 53:
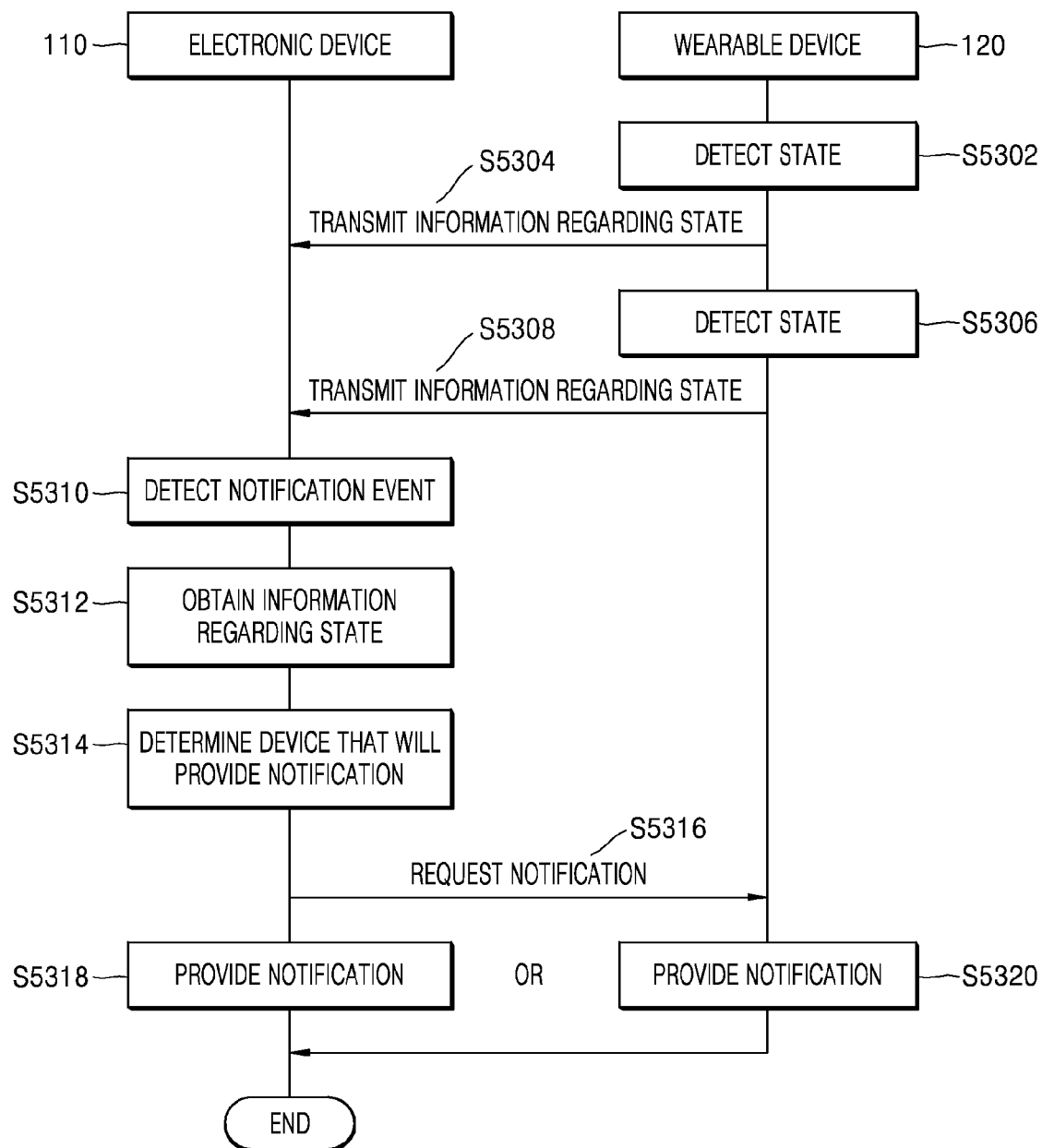
FIG. 53 is a flowchart of a method of providing a notification according to an exemplary embodiment.

FIG. 53 is a flowchart of a method of providing a notification according to an exemplary embodiment.

According to the current exemplary embodiment, the at least one wearable device 120 provides information regarding a state thereof to the electronic device 110 regardless of whether a notification event occurs, and the electronic device 110 determines a device that will provide a notification when a notification event occurs, based on the information regarding the state of the at least one wearable device 120 that the electronic device 110 receives and stores.

According to one exemplary embodiment, the at least one wearable device 120 may periodically detect information regarding the state thereof (operations S5302 and S5306), and transmit the information to the electronic device 110 (operations S5304 and S5308). For example, the information regarding the state of the at least one wearable device 120 may include information regarding whether a locking structure of the at least one wearable device 120 is fastened, information regarding motion detection, a bio-signal, etc.

According to one exemplary embodiment, the electronic device 110 may periodically request the at least one wearable device 120 to provide information regarding the state thereof, and the at least one wearable device 120 may transmit the information regarding the state thereof to the electronic device 110 whenever the electronic device 110 requests this information.

According to another exemplary embodiment, the at least one wearable device 120 may transmit the information regarding the state thereof to the electronic device 110 in a predetermined cycle even when the electronic device 110 does not request this information. In this case, when communication is established between the electronic device 110 and the at least one wearable device 120, the electronic device 110 transmits to the at least one wearable device 120 information regarding a cycle in which the information regarding the state of the at least one wearable device 120 is transmitted, and the at least one wearable device 120 may transmit the information regarding the state thereof in the cycle set by the electronic device 110.

According to another exemplary embodiment, when the at least one wearable device 120 detects a change in the information regarding the state thereof (operations S5302 and S5306), the at least one wearable device 120 may transmit information regarding the state thereof or a change value in the information regarding the state to the electronic device 110 (operations S5304 and S5308). According to the current exemplary embodiment, when communication is established between the electronic device 110 and the at least one wearable device 120, information regarding a current state of the at least one wearable device 120 may be transmitted to the electronic device 110 and be then transmitted to the electronic device 110 whenever the state of the at least one wearable device 120 changes.

According to one exemplary embodiment, when a degree of a change in the information regarding the state of the at least one wearable device 120 is equal to or greater than a reference value, the at least one wearable device 120 may transmit information regarding the state thereof to the electronic device 110. For example, the at least one wearable device 120 may transmit information regarding a heart rate to the electronic device 110 only when a degree of a change in the information regarding the heart rate is 10% or more.

When the electronic device 110 receives the information regarding the state of the at least one wearable device 120 according to one of the previous exemplary embodiments, the electronic device 110 stores this information. When a notification event is detected (operation S5310), the electronic device 110 obtains the stored information (operation S5312) and determines a device that will provide a notification or a form of the notification (operation S5314). In exemplary embodiments, information regarding a state of the electronic device 110 may be detected periodically or when a notification event is detected.

When it is determined that the at least one wearable device 120 will provide the notification (operation S5316), the electronic device 110 requests the at least one wearable device 120 to provide the notification (operation S5316). When the at least one wearable device 120 receives a notification request, the at least one wearable device 120 provides the notification (operation S5320). When it is determined that the electronic device 110 will provide the notification, the electronic device 110 provides the notification (operation S5318).

According to the current exemplary embodiment, when a notification event occurs, a device that will provide a notification may be determined directly without collecting state information notification, thereby minimizing a delay in transmitting the notification.

Figure 54:
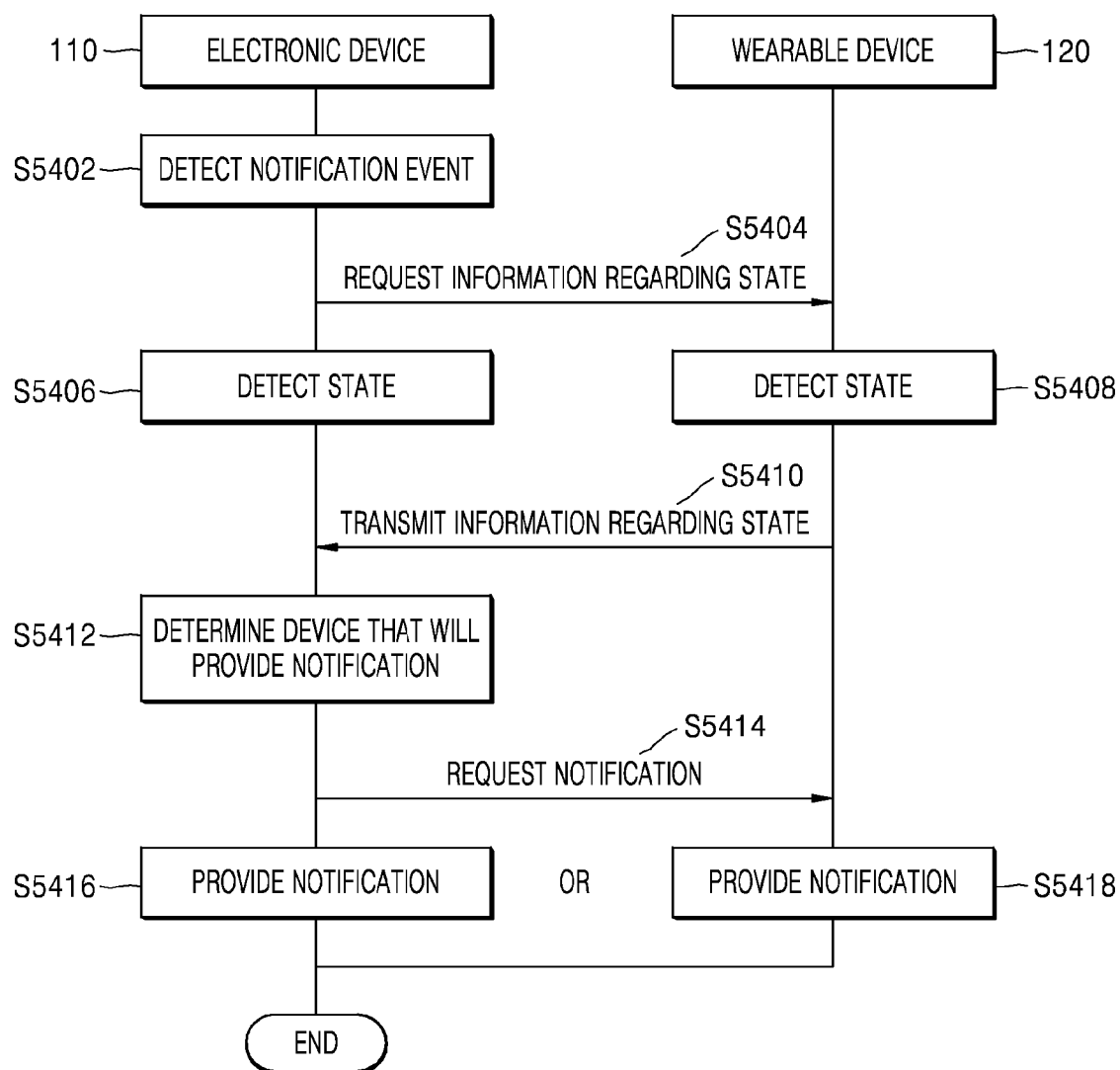
FIG. 54 is a flowchart of a method of providing a notification according to an exemplary embodiment.

FIG. 54 is a flowchart of a method of providing a notification according to an exemplary embodiment.

According to the current exemplary embodiment, when a notification event is detected, information regarding states of the electronic device 110 and the at least one wearable device 120 is detected and shared.

When a notification event is detected (operation S5402), the electronic device 110 requests the at least one wearable device 120 to provide information regarding the state thereof (operation S5404). When the at least one wearable device 120 receives the request for the information regarding the state from the electronic device 110, the at least one wearable device 120 detects the state thereof (operation S5408) and transmit information regarding the state to the electronic device 110 (operation S5410). When the notification event is detected (operation S5402), the electronic device 110 detects information regarding the state thereof (operation S5406).

When the information regarding the states of the electronic device 110 and the at least one wearable device 120 is obtained, the electronic device determines a device that will provide a notification and a form of the notification based on this information (operation S5412).

When it is determined that the at least one wearable device 120 will provide the notification, the electronic device 110 requests the at least one wearable device 120 to provide the notification (operation S5414). When the at least one wearable device 120 receives a notification request, the at least one wearable device 120 provides the notification (operation S5418). When it is determined that the electronic device 110 will provide the notification, the electronic device 110 provides the notification (operation S5416).

According to the current exemplary embodiment, the states of the electronic device 110 and the at least one wearable device 120 are detected only when a notification event is detected, thereby minimizing load when the states are detected.

Figure 55:
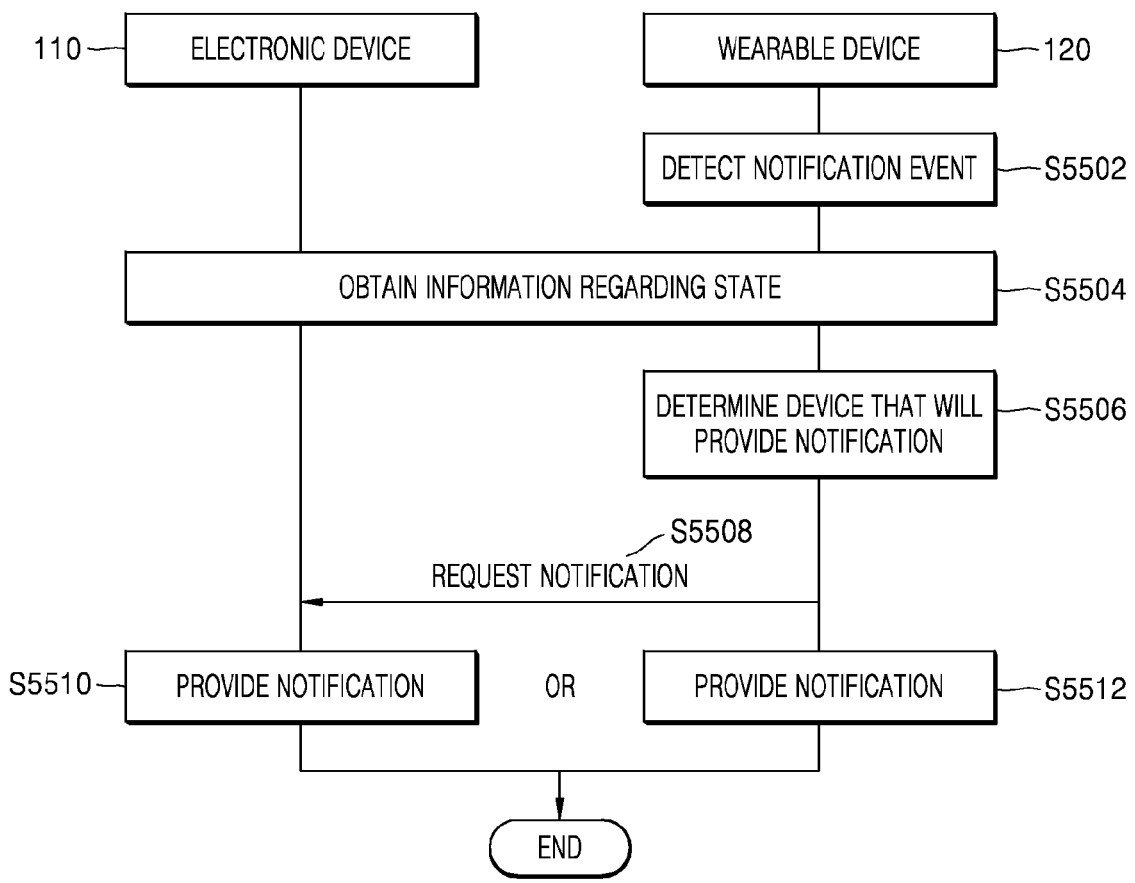
FIG. 55 is a flowchart of a method of providing a notification according to an exemplary embodiment.

FIG. 55 is a flowchart of a method of providing a notification according to an exemplary embodiment.

According to the current exemplary embodiment, a device in which a notification event occurs determines a device that will provide a notification. Referring to FIG. 55, a case in which a notification event occurs in the wearable device 120 while the electronic device 110 and the wearable device 120 operate such that communication can be established therebetween will be described below.

When a notification event occurs in the wearable device 120 (operation S5502), the wearable device 120 determines a device that will provide the notification based on information regarding the states of the electronic device 110 and the wearable device 120 (operation S5506). A point of time when the information regarding the states of the electronic device 110 and the wearable device 120 is obtained (operation S5504) may vary according to an exemplary embodiment.

When it is determined that the electronic device 110 or another wearable device will provides a notification, the wearable device 120 requests the electronic device 110 or the other wearable device to provide the notification (operation S5508). When the electronic device 110 receives a notification request, the electronic device 110 provides the notification (operation S5510). When it is determined that the wearable device 120 will provides the notification, the wearable device 120 provides the notification (operation S5512).

According to the current exemplary embodiment, it is possible to reduce load on the electronic device 110 and load caused when communication is established between devices.

Figure 56:
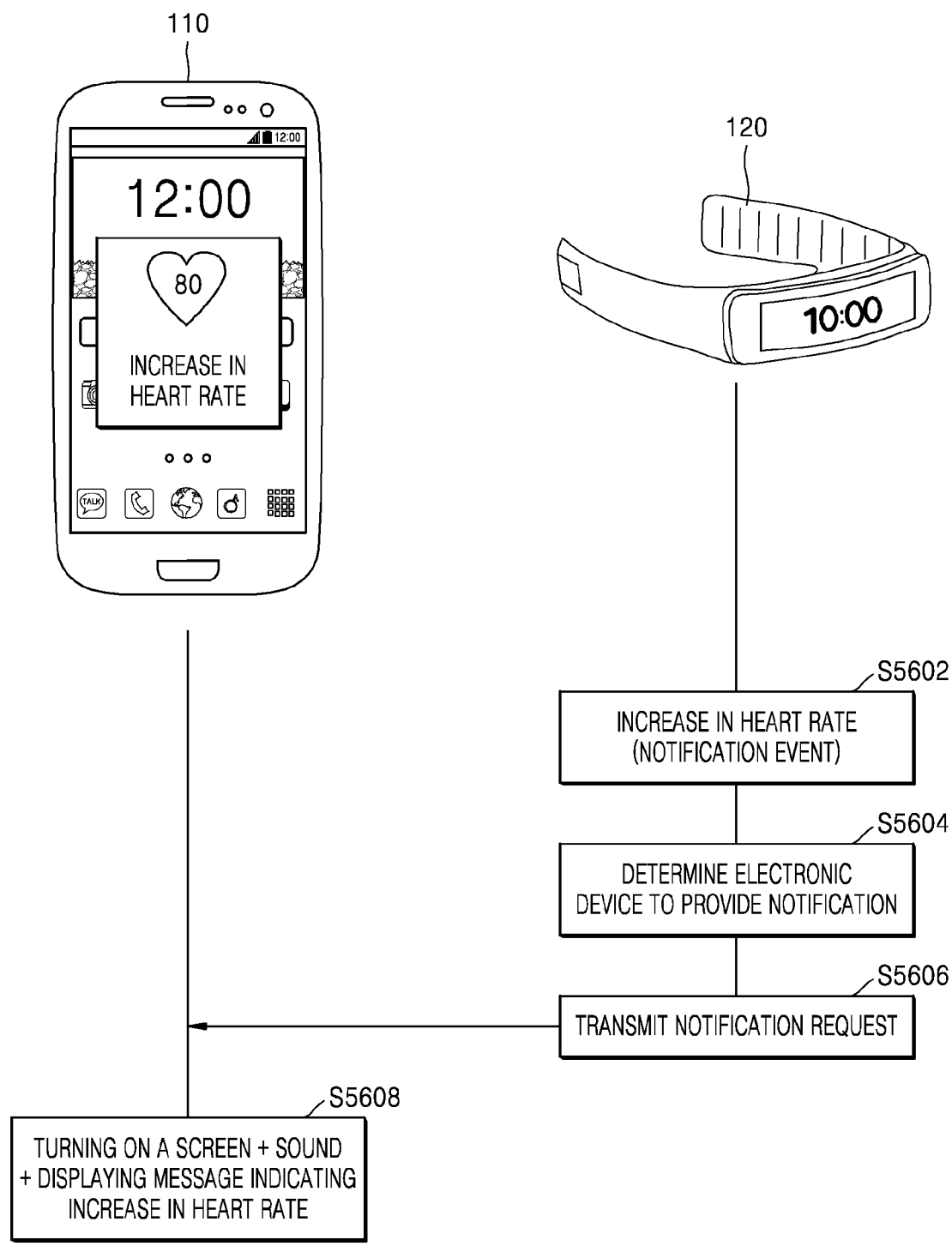
FIG. 56 is a flowchart of a method of providing a notification according to an exemplary embodiment.

FIG. 56 is a flowchart of a method of providing a notification according to an exemplary embodiment. FIG. 56 illustrates a detailed example of the exemplary embodiment of FIG. 55.

When a notification event that an increase in a heart rate should be informed occurs while the wearable device 120 monitors the heart rate (operation S5602), the wearable device 120 in which the notification event occurs determines a device that will provide a notification, based on the states of the electronic device 110 and the at least one wearable device 120 (operation S5604). When it is determined that the electronic device 110 will provide a notification (operation S5604), the at least one wearable device 120 transmits a notification request to the electronic device 110 (operation S5606).

When the electronic device 110 receives the notification request, the electronic device 110 provides a notification regarding the increase in the heart rate, based on the contents of the notification request (operation S5608). For example, when the notification request indicates turning on a screen, outputting sound, and displaying a message indicating the increase in the heart rate as a form of the notification, sound is output and the message is displayed as illustrated in FIG. 56.

Figure 57:
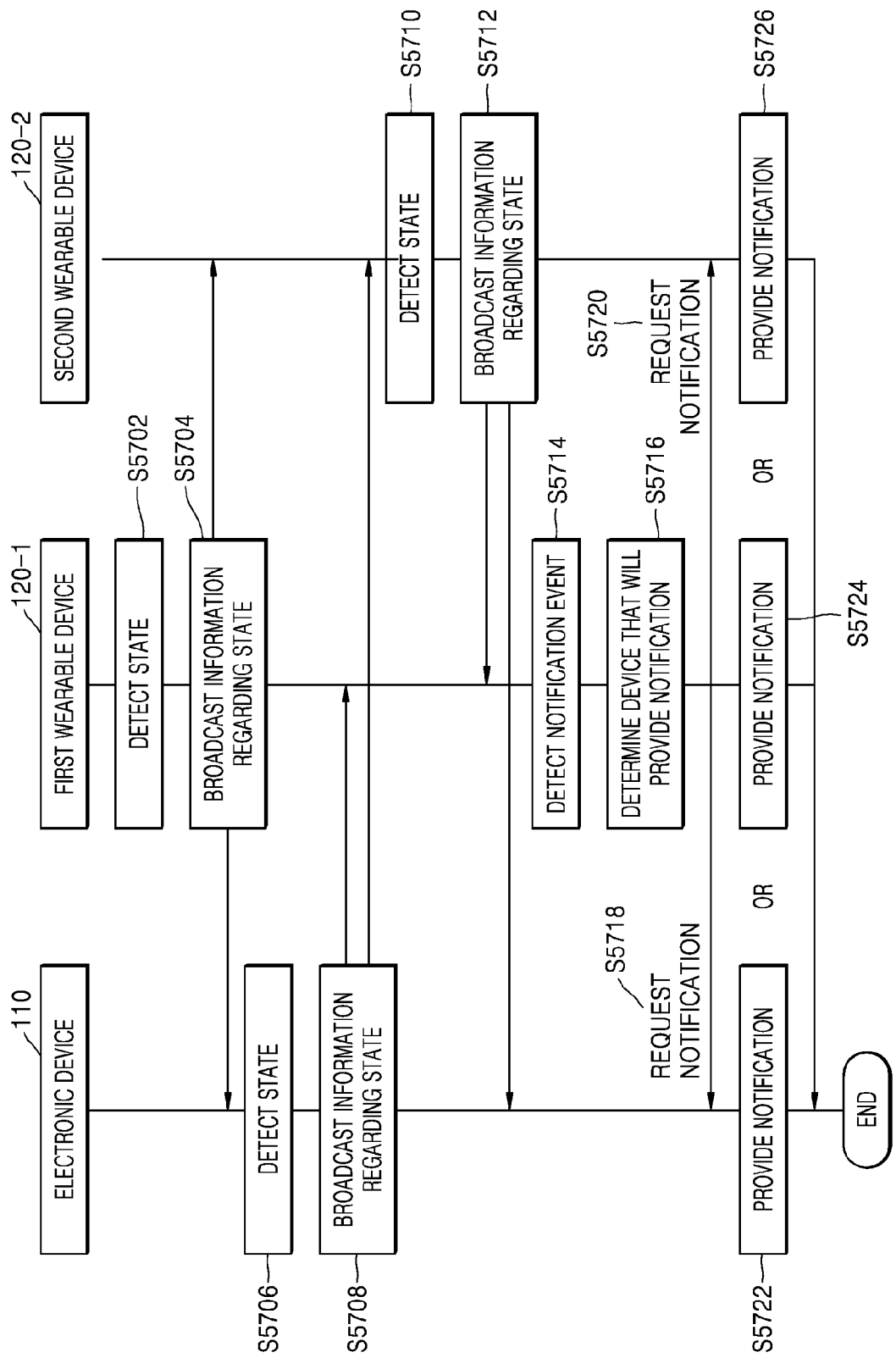
FIG. 57 is a flowchart of a method of providing a notification according to an exemplary embodiment.

FIG. 57 is a flowchart of a method of providing a notification according to an exemplary embodiment.

According to the current exemplary embodiment, the electronic device 110 and at least one wearable device, e.g., the first and second wearable devices 120-1 and 120-2, share information regarding the states thereof regardless of whether a notification event occurs, and a device in which a notification event occurs determines a device that will provide a notification. FIG. 57 illustrates a case in which the notification event occurs in the first wearable device 120-1.

The electronic device 110, the first wearable device 120-1, and the second wearable device 120-2 detect the states thereof (operations S5702, S5706, and S5710), and broadcast information regarding the states thereof to one another (operations S5704, S5708, and S5712).

According to one exemplary embodiment, the information regarding the states of the devices may be periodically detected and broadcast. According to one exemplary embodiment, the information regarding the states of the devices may also be sequentially detected and broadcast in a predetermined order. For example, the information regarding the states of the devices may be sequentially detected and transmitted in the order of the first wearable device 120-1, the electronic device 110, and the second wearable device 120-2.

According to another exemplary embodiment, the detecting and broadcasting of the information regarding the states thereof may be performed after a change in this information is detected. For example, when a change in an attached/detached state of the first wearable device 120-1 is detected, information regarding the wearing/not-wearing state (e.g., state information indicating whether the device is attached to a user) of the first wearable device 120-1 may be broadcast to the electronic device 110 and the second wearable device 120-2. As another example, when a degree of a change in a heart rate detected by the second wearable device 120-2 is a reference level or more, information regarding the heart rate detected by the second wearable device 120-2 may be broadcast to the electronic device 110 and the first wearable device 120-1.

When a notification event is detected in one of the electronic device 110 and the first and second wearable devices 120-1 and 120-2 (operation S5714), the device in which the notification event occurs determines a device that will provide a notification (operation S5716). If the notification event occurs in the first wearable device 120-1 (operation S5714), the first wearable device 120-1 determines a device that will provide the notification (operation S5716).

If it is determined that a device except for the device in which the notification event occurs determines a device that will provide the notification, the device in which the notification event occurs transmits a notification request to the device that will provide the notification (operations S5718 and S5720). When the electronic device 110 or the second wearable device 120-2 receives the notification request, the electronic device 110 or the second wearable device 120-2 provides the notification (operations S5722 and S5726). If it is determined that the first wearable device 120-1 will provide the notification, the first wearable device 120-1 provides the notification (operation S5724).

Figure 58:
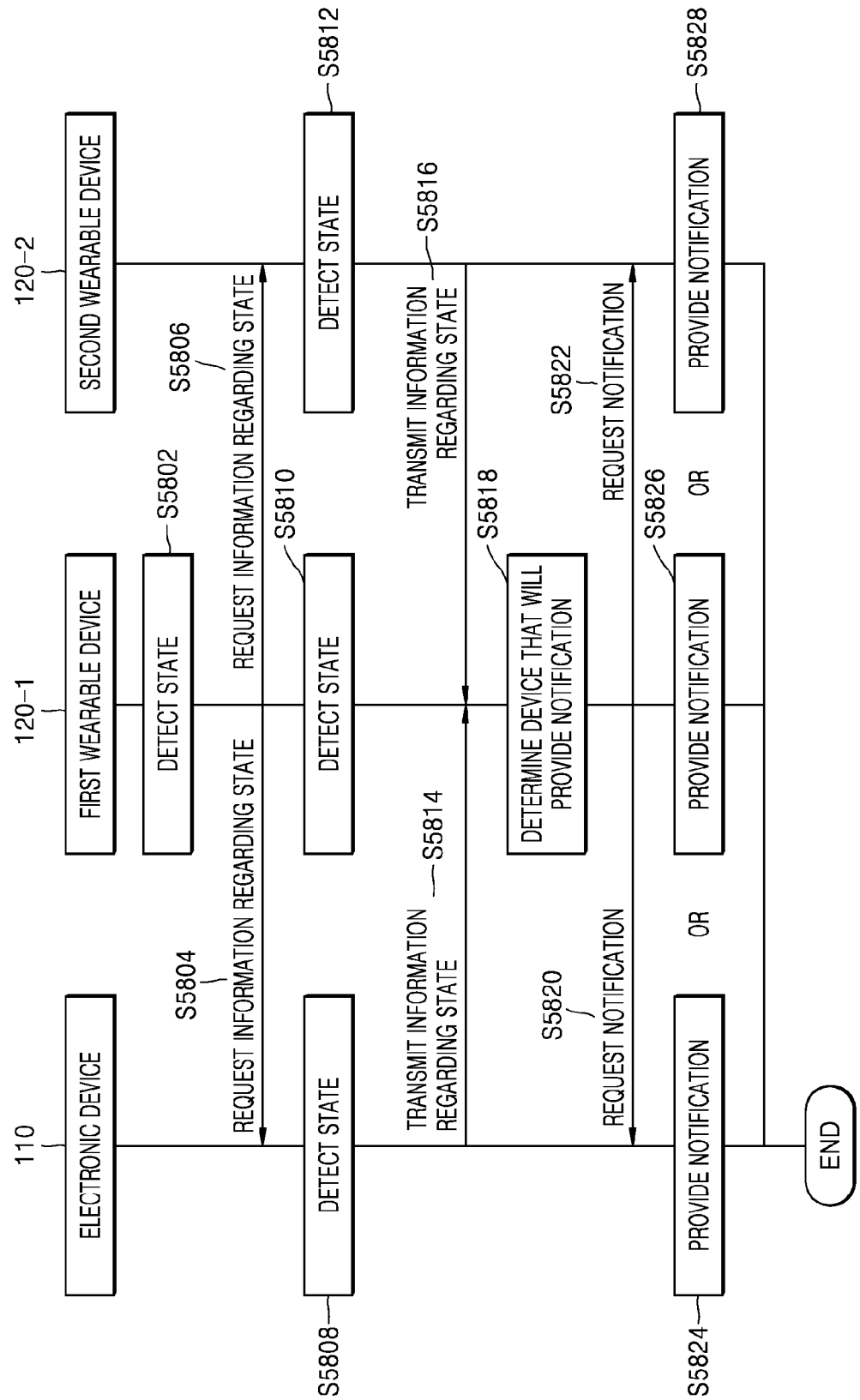
FIG. 58 is a flowchart of a method of providing a notification according to an exemplary embodiment.

FIG. 58 is a flowchart of a method of providing a notification according to an exemplary embodiment.

According to the current exemplary embodiment, when a notification event is detected, the electronic device 110 and the at least one wearable device 120 detect and share information regarding the states thereof, and a device in which the notification event occurs determines a device that will provide a notification. FIG. 58 illustrates a case in which the notification event occurs in the first wearable device 120-1.

When the notification event is detected by one of the electronic device 110 and the first and second wearable devices 120-1 and 120-2 (operation S5802), the device that detects the notification event requests the other devices to provide information regarding the states thereof (operation S5804). If the notification events occurs in the first wearable device 120-1 (operation S5802), the first wearable device 120-1 requests the electronic device 110 and the second wearable device 120-2 to provide the information regarding the states thereof (operations S5804 and S5806).

A device that receives the request to provide the information regarding the state thereof detects the state thereof (operations S5808 and S5812), and transmits information regarding the states thereof to the device in which the notification event occurs (operations S5812 and S5814). The device in which the notification event occurs detects the state thereof (operation S5810).

When the first wearable device 120-1 in which the notification event is detected obtains the information regarding the states of the electronic device 110 and the second wearable device 120-2, the first wearable device 120-1 determines a device that will provide a notification, based on the states of the electronic device 110, the first wearable device 120-1, and the second wearable device 120-2 (operation S5816).

When it is determined that at least one device (except for the device in which the notification event occurs) will provide the notification, the device in which the notification event occurs transmits a notification request to the at least one device that will provide the notification (operations S5818, S5820 and S5822). When the electronic device 110 or the second wearable device 120-2 receives the notification request, the electronic device 110 or the second wearable device 120-2 provides the notification (operations S5824 and S5828). When it is determined that the first wearable device 120-1 will provide the notification, the first wearable device 120-1 provides the notification (operation S5826).

Figure 59:
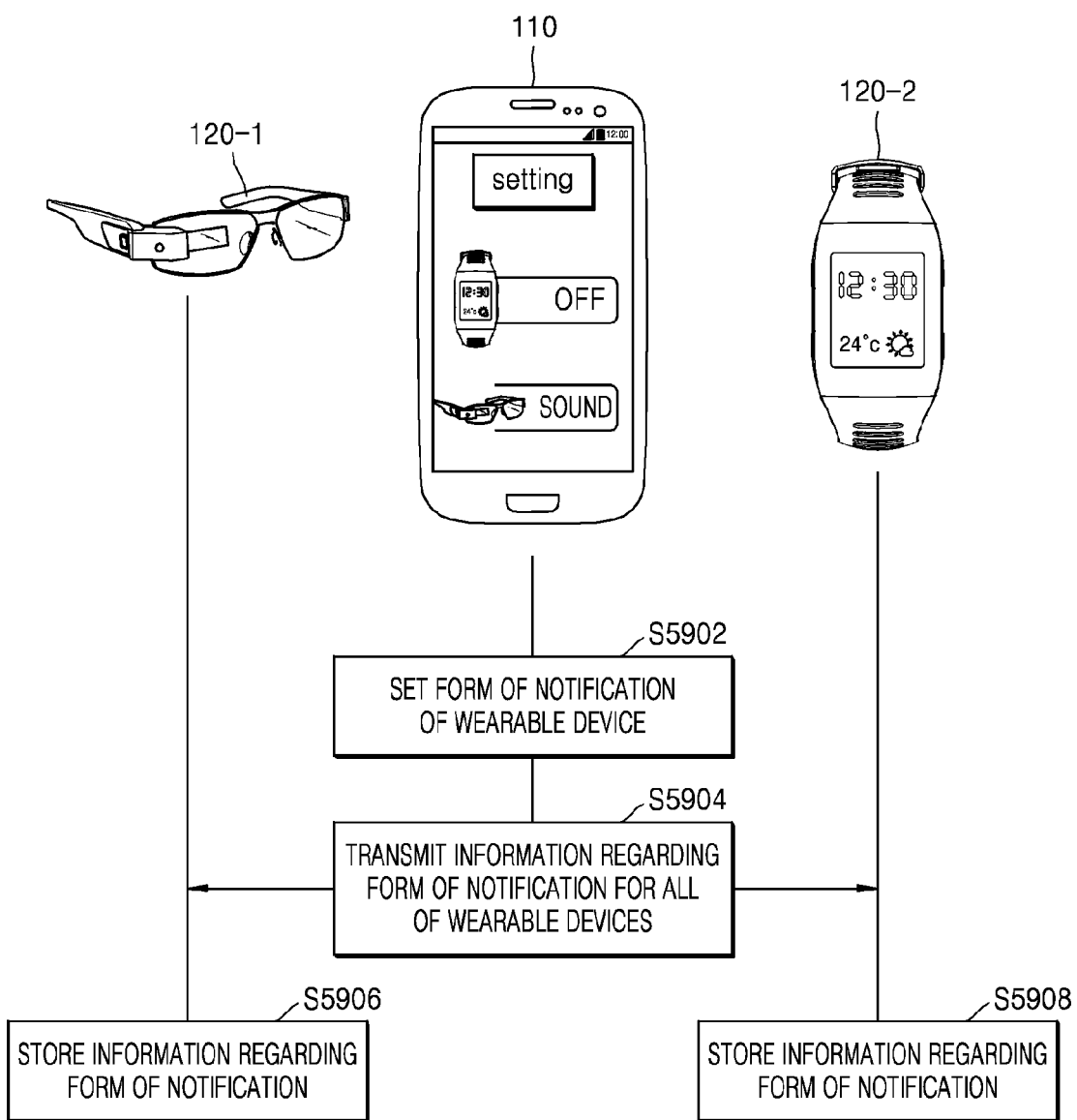
FIG. 59 is a flowchart of a method of setting a form of a notification according to an exemplary embodiment.

FIG. 59 is a flowchart of a method of setting a form of a notification according to an exemplary embodiment.

According to the current exemplary embodiment, an electronic device 110 may set a form of notification of all of wearable devices 120-1 and 120-2 connected to the electronic device 110 such that communication may be established therebetween. After the form of the notification is set, the electronic device 110 may transmit information regarding the form of the notification to all of the wearable devices 120-1 and 120-2.

According to the current exemplary embodiment, the electronic device 110 may set a form of notification of each of the wearable devices 120-1 and 120-2 connected to the electronic device 110 such that communication may be established therebetween (operation S5902). For example, the electronic device 110 may set a form of the notification of the smart glasses 120-1 as a sound notification and turn off the notification of the smart watch 120-2 according to user input as illustrated in FIG. 59.

When the electronic device 110 sets the form of the notification of at least one among the wearable devices 120-1 and 120-2 (operation S5902), the electronic device 110 transmits information regarding the form of the notification to all of the wearable devices 120-1 and 120-2 (operation S5904). For example, when the electronic device 110 does not change the form of the notification of the smart glasses 120-1 and changes the form of the notification of the smart watch 120-2, the electronic device 110 transmits information regarding the form of the notification of the smart watch 120-2 to the smart watch 120-1 and the smart watch 120-2. According to one exemplary embodiment, the electronic device 110 may transmit a control signal for setting the form of the notification to a device for which the form of the notification is changed.

Next, a device that receives the information regarding the form of the notification stores this information (operations S5906 and S5908). When the information regarding the form of the notification is information regarding the form of the notification of the device, the form of the notification of the device is set based on the information regarding the form of the notification. For example, when the electronic device 110 changes and sets the form of the notification of the smart watch 120-2, information regarding the form of the notification of the smart watch 120-2 is transmitted to the smart glasses 120-1 and the smart watch 120-2. The smart watch 120-2 may also change the form of the notification thereof, based on the information regarding the form of the notification or according to the control signal for setting the form of the notification which is transmitted from the electronic device 110 (operation S5908).

Figure 60:
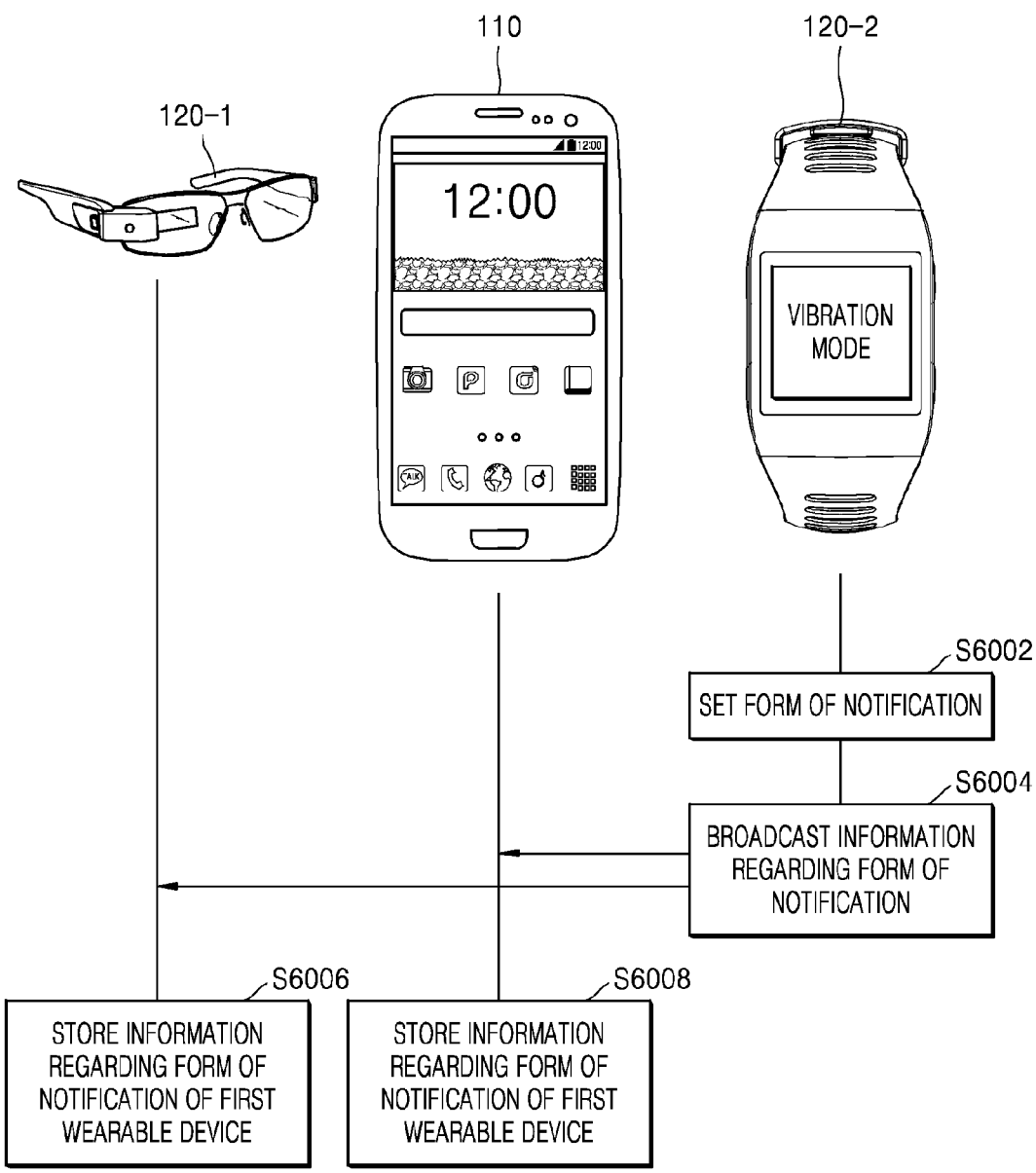
FIG. 60 is a flowchart of a method of setting a form of a notification according to an exemplary embodiment.

FIG. 60 is a flowchart of a method of setting a form of a notification according to an exemplary embodiment.

According to the current exemplary embodiment, each wearable device may set a form of a notification thereof and broadcast information regarding the set form of the notification to the electronic device 110 and other wearable devices.

For example, when the second wearable device 120-2 sets a form of the notification thereof (operation S6002), the second wearable device 120-2 broadcasts information regarding the set form of the notification to the electronic device 110 and the other wearable device 120-1 (operation S6004). For example, when a user sets a form of the notification of the smart watch 120-2 as a vibration notification (operation S6002), the smart watch 120-2 transmits information indicating that the form of the notification thereof is set as the vibration notification to the smart glasses 120-1 and the electronic device 110 (operation S6004). When the smart glasses 120-1 receive from the smart watch 120-2 the information indicating that the form of the notification of the smart watch 120-2 is set as the vibration notification, the smart glasses 120-1 store and manage this information (operation S6006). The electronic device 110 receives from the smart watch 120-2 the information indicating that the form of the notification of the smart watch 120-2 is set as the vibration notification, the electronic device 110 stores and manages this information (operation S6008).

Figure 61:
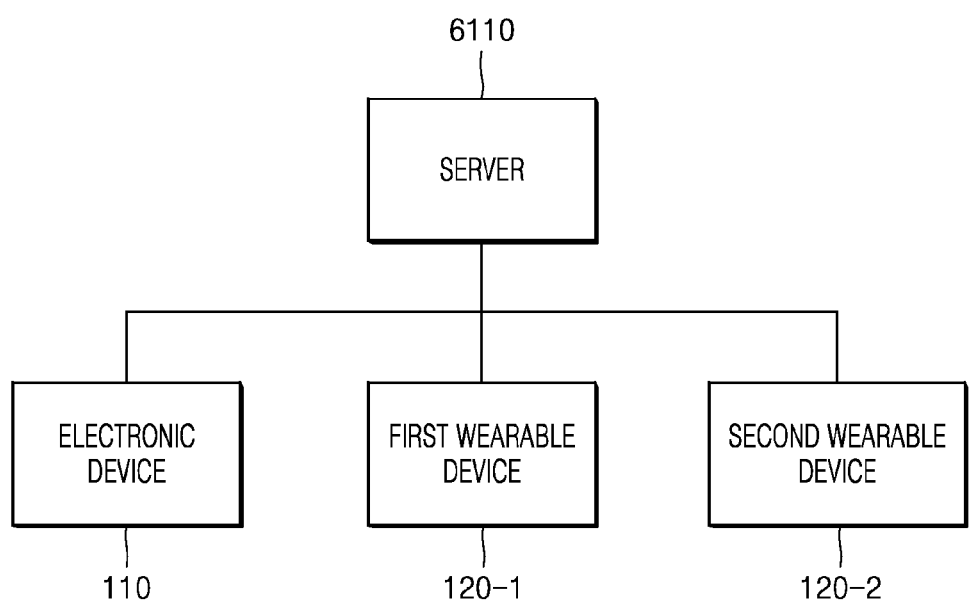
FIG. 61 is a block diagram of a server, an electronic device, and at least one wearable device according to an exemplary embodiment.

FIG. 61 is a block diagram of a server 6110, an electronic device 110, and at least one wearable device, e.g., first and second wearable devices 120-1 and 120-2 according to an exemplary embodiment.

According to the current exemplary embodiment, when a notification event occurs in the electronic device 110 and the first and second wearable devices 120-1 and 120-2, the server 6110 may determine a device that will provide a notification, based on the states of the electronic device 110 and the first and second wearable devices 120-1 and 120-2.

The server 6110 may communicate with the electronic device 110 and the first and second wearable devices 120-1 and 120-2 via a predetermined network.

Figure 62:
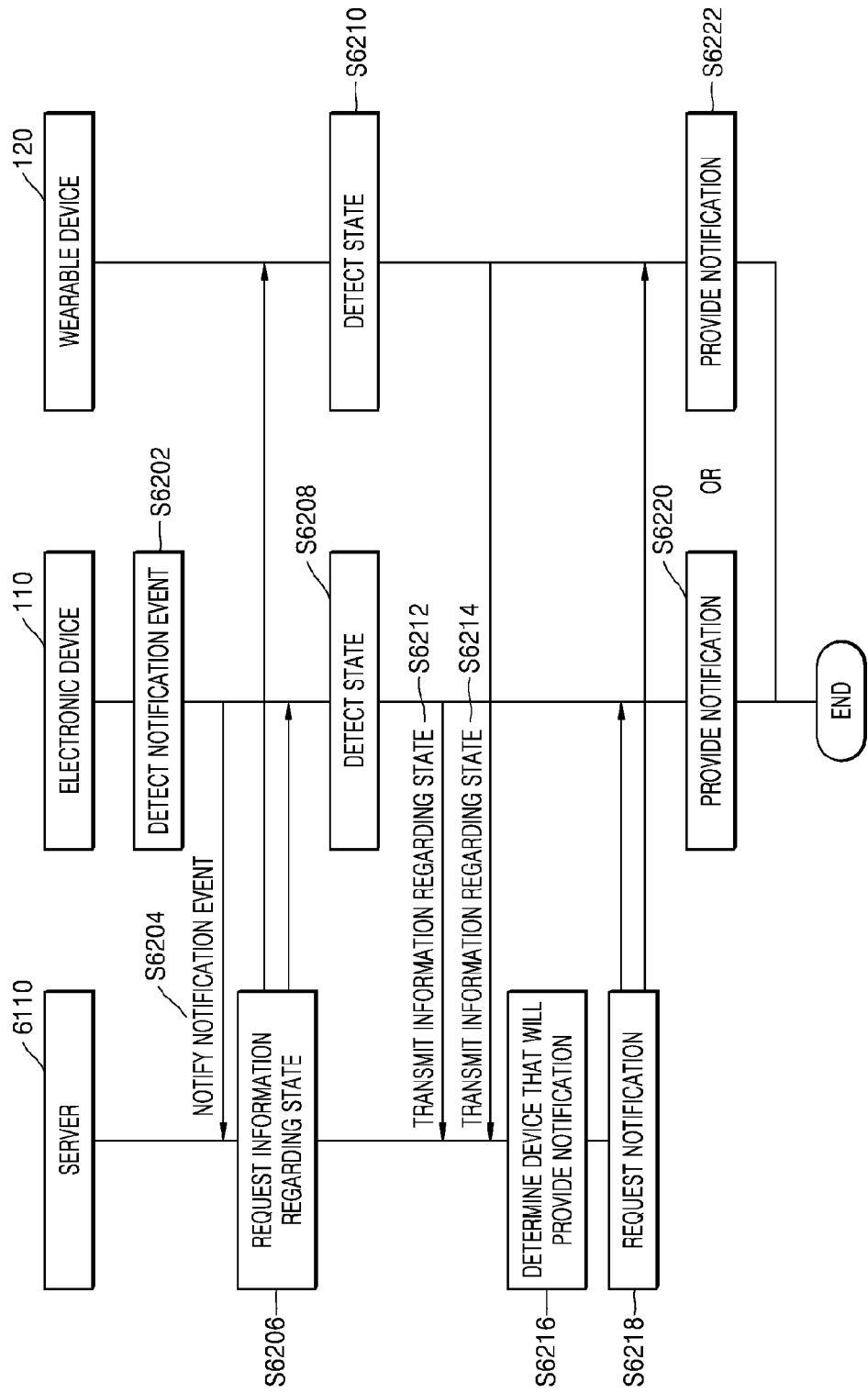
FIG. 62 is a flowchart of a method of providing a notification according to an exemplary embodiment.

FIG. 62 is a flowchart of a method of providing a notification according to an exemplary embodiment.

When a notification event is detected in a device among an electronic device 110 and at least one wearable device 120 (operation S6202), a device in which the notification event occurs informs a server 6110 of the notification event (operation S6204). When the server 6110 is informed of the notification event, the server 6110 requests the electronic device 110 and the at least one wearable device 120 to provide information regarding the states thereof (operation S6206). When the electronic device 110 and the at least one wearable device 120 receive the request for the information regarding the states thereof, they detect the states thereof (operations S6208 and S6210) and transmit information regarding the states thereof to the server 6110 (operations S6212 and S6214).

When the server 6110 receives the information regarding the states of the electronic device 110 and the at least one wearable device 120, the server 6110 determines a device that will provide a notification and a form of the notification, based on this information (operation S6216).

When the device that will provide the notification and the form of the notification are determined (operation S6216), the server 6110 transmits a notification request to the device that will provide the notification (operation S6218). A device that receives the notification request among the electronic device 110 and the at least one wearable device 120 provides the notification (operations S6220 and S6222).

Figure 63:
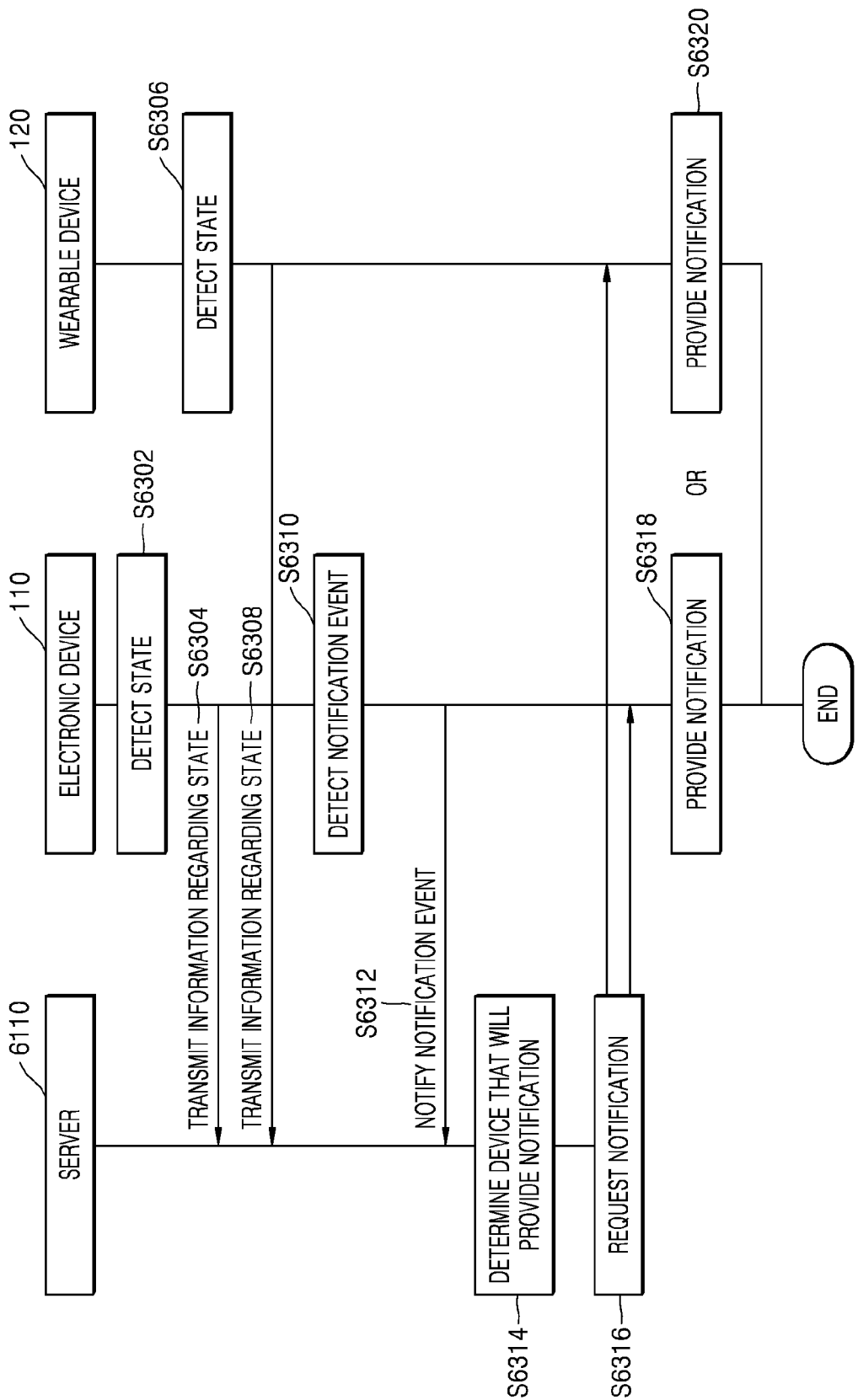
FIG. 63 is a flowchart of a method of providing a notification according to an exemplary embodiment.

FIG. 63 is a flowchart of a method of providing a notification according to an exemplary embodiment.

According to the current exemplary embodiment, an electronic device 110 and at least one wearable device 120 transmit information regarding the states thereof to a server 6110 regardless of whether a notification event occurs, and the server 6110 determines a device that will provide a notification based on the information regarding the states of the devices, which the server 6110 receives and stores, when a notification event occurs. FIG. 63 illustrates a case in which a notification event occurs in the electronic device 110.

The electronic device 110 and the at least one wearable device 120 detect the states thereof (operations S6302 and S6306), and transit information regarding the states thereof to the server 6110 (operations S6304 and S6308).

According to one exemplary embodiment, the information regarding the states of the electronic device 110 and the at least one wearable device 120 may be periodically detected and transmitted. According to one exemplary embodiment, the information regarding the states of the electronic device 110 and the at least one wearable device 120 may be sequentially detected and transmitted in a predetermined order.

According to another exemplary embodiment, the information regarding the states of the electronic device 110 and the at least one wearable device 120 may be detected and transmitted when a change in this information is detected. For example, when a change in a wearing/not-wearing state of the at least one wearable device 120 is detected, information regarding the attached/detached state of the at least one wearable device 120 may be transmitted to the server 6110.

When a notification event is detected in a device among the electronic device 110 and the at least one wearable device 120 (operation S6310), a device in which the notification event occurs informs the server 6110 of the notification event. When the notification event occurs in the electronic device 110 (operation S6310), the electronic device 110 informs the server 6110 of the notification event (operation S6312).

When the server 6110 is informed of the notification event, the server 6110 determines a device that will provide a notification and a form of the notification, based on the information regarding the states of the electronic device 110 and the at least one wearable device 120 (operation S6314).

When the device that will provide the notification and the form of the notification are determined (operation S6314), the server 6110 transmits a notification request to the device that will provide the notification (operation S6316). A device that receives the notification request among the electronic device 110 and the at least one wearable device 120 provides the notification (operations S6318 and S6320).

Figure 64:
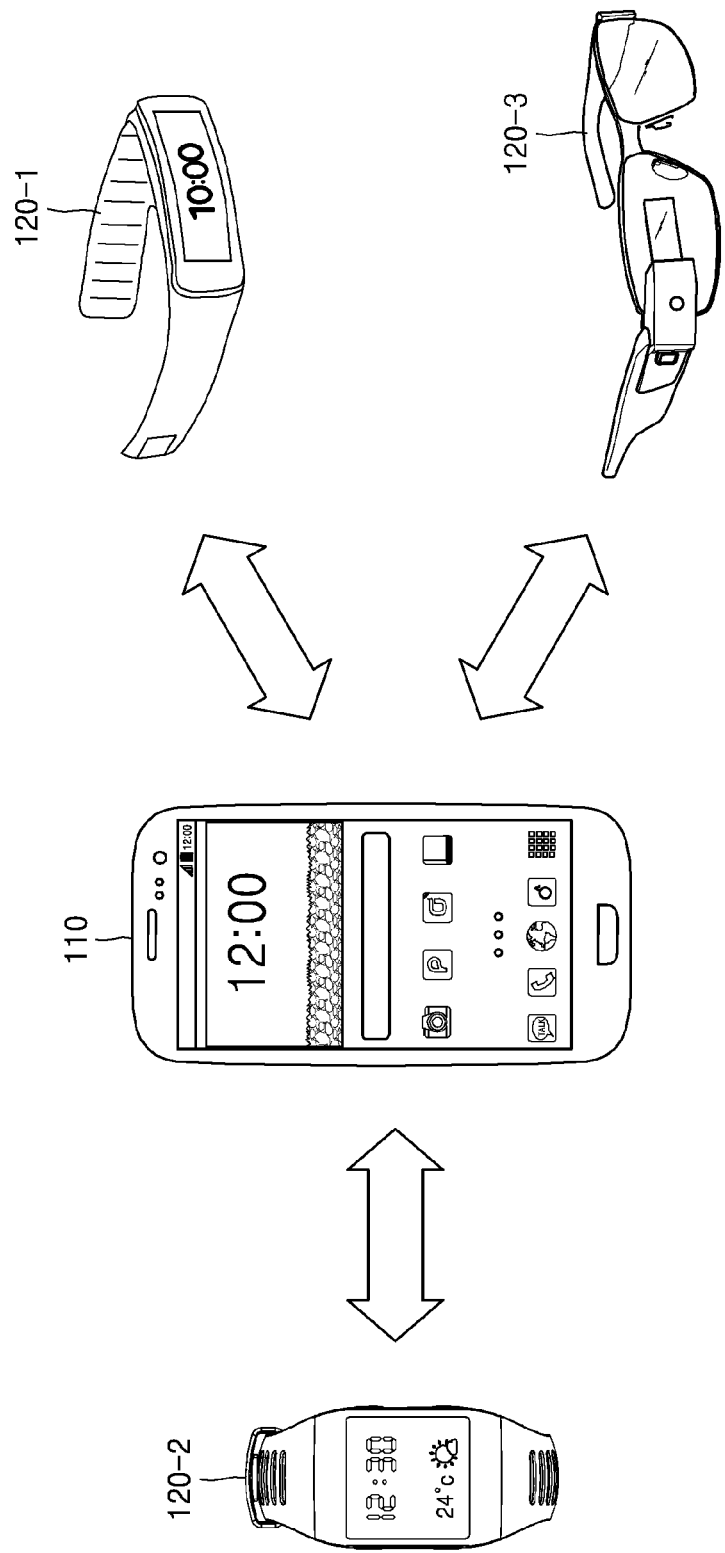
FIG. 64 is a diagram illustrating a communication manner according to an exemplary embodiment.

FIG. 64 is a diagram illustrating a communication manner according to an exemplary embodiment.

According to exemplary embodiments, an electronic device 110 and at least one wearable device (e.g., wearable devices 120-1, 120-2, and 120-3) exchange signals (e.g., a notification of a notification event, a request for information regarding a device state, information regarding a device state, a notification request, etc.) with one another. The exchange of the signals may be performed between the communication unit 230 of the electronic device 110 (see FIG. 2) and the communication unit 630 of each of the wearable devices 120-1, 120-2, and 120-3. Communication may be established between the electronic device 110 and the wearable devices 120-1, 120-2, and 120-3 according to communication standards employed to establish communication between devices.

According to one exemplary embodiment, communication may be established between the electronic device 110 and the wearable devices 120-1, 120-2, and 120-3 via the electronic device 110. According to the current exemplary embodiment, the wearable devices 120-1, 120-2, and 120-3 may establish communication with another wearable device via the electronic device 110. For example, when the electronic device 110 and the wearable devices 120-1, 120-2, and 120-3 communicate with one another based on a BLE communication mode, the electronic device 110 may act as a master and the wearable devices 120-1,120-2, and 120-3 may act as slaves.

According to one exemplary embodiment, when the electronic device 110 is in a non-communicable state, a device among the wearable devices 120-1, 120-2, and 120-3 may act as a master in place of the electronic device 110.

Figure 65:
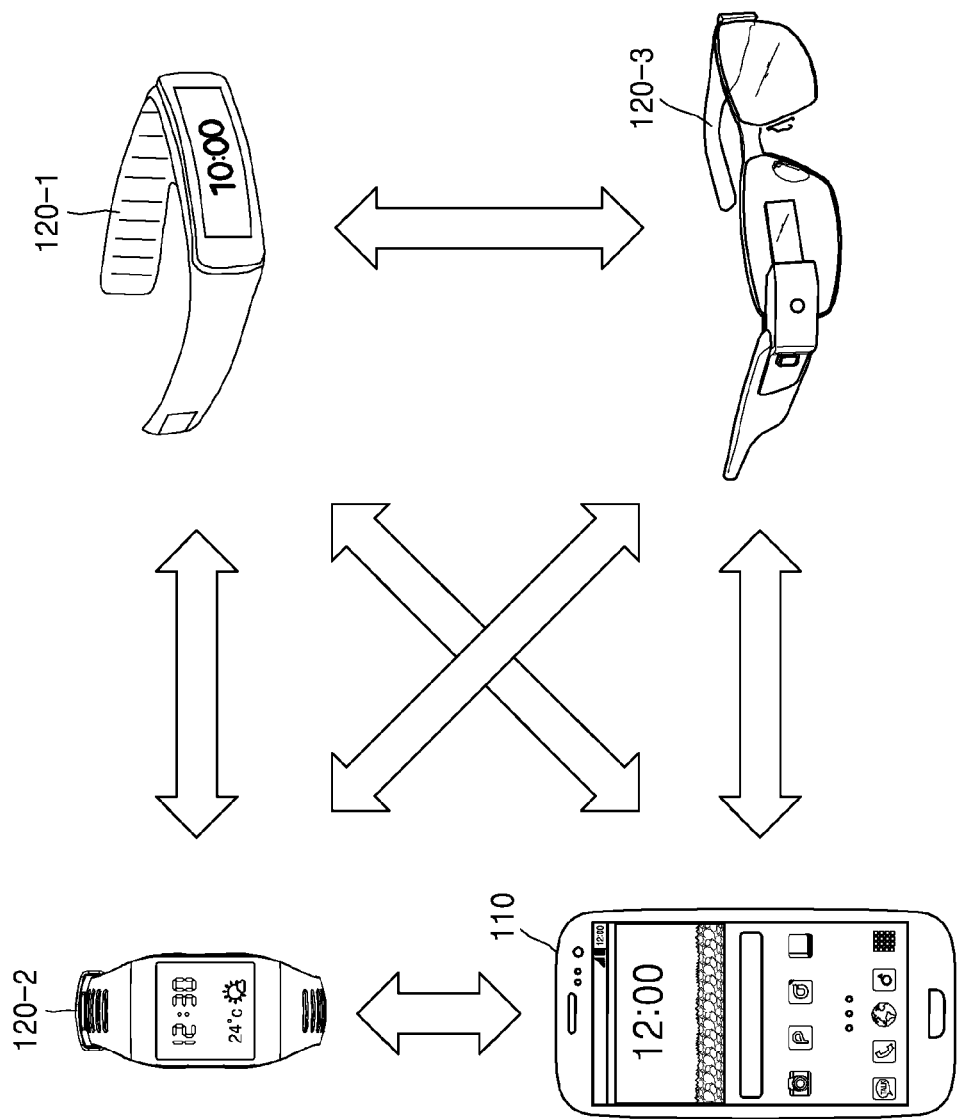
FIG. 65 is a diagram illustrating a communication manner according to an exemplary embodiment.

FIG. 65 is a diagram illustrating a communication manner according to an exemplary embodiment.

According to the current exemplary embodiment, an electronic device 110 and at least one wearable device, e.g., wearable devices 120-1, 120-2, and 120-3, may directly communicate with each other. According to the current exemplary embodiment, the electronic device 110 and the wearable devices 120-1, 120-2, and 120-3 may communicate with one another according to the same communication manner.

Figure 66:
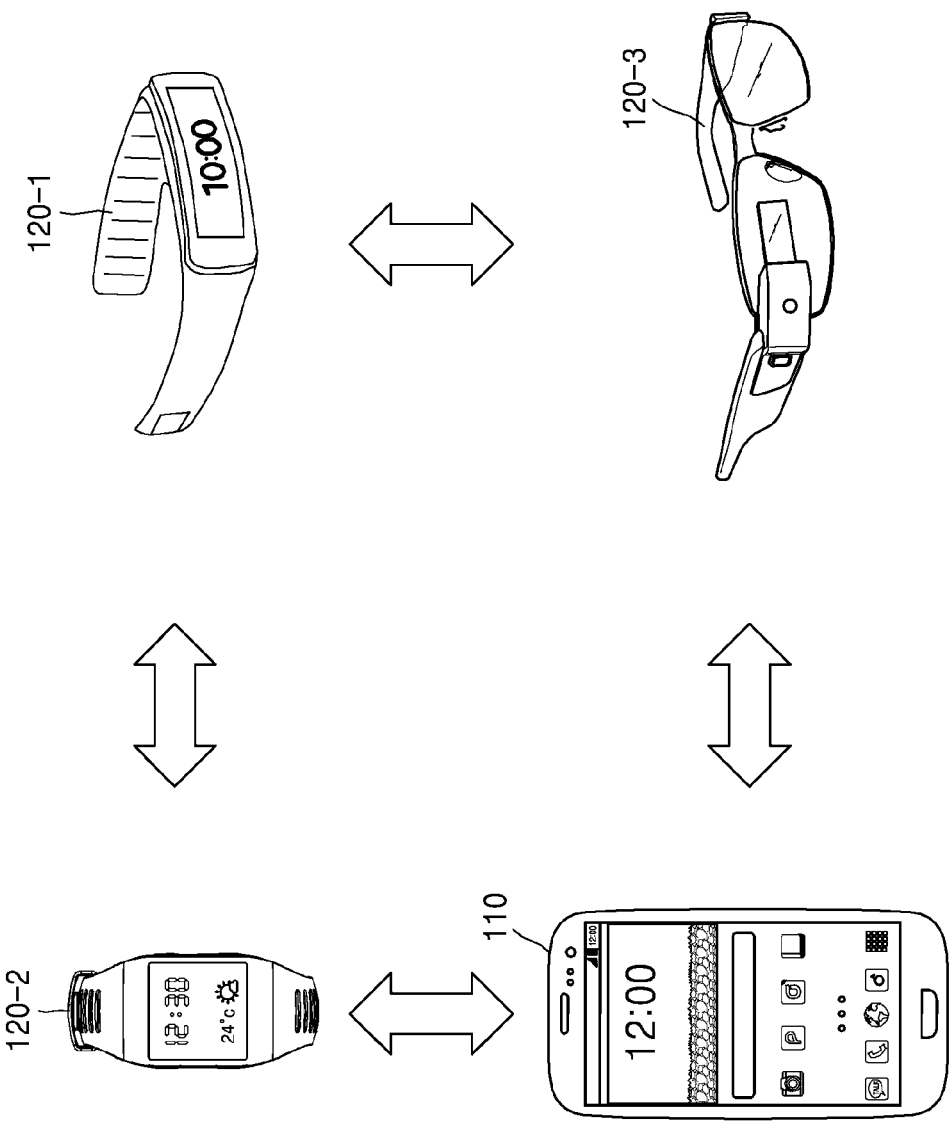
FIG. 66 is a diagram illustrating a communication manner according to an exemplary embodiment.

FIG. 66 is a diagram illustrating a communication manner according to an exemplary embodiment.

According to the current exemplary embodiment, an electronic device 110 and at least one wearable device, e.g., wearable devices 120-1, 120-2, and 120-3, may communicate with only some devices. For example, the current exemplary embodiment may apply to a case in which devices employ different communication manners, a case in which direct communication cannot be established due to a distance or the like, a case in which devices have insufficient available resources for communicating with another device, etc.

Figure 67:
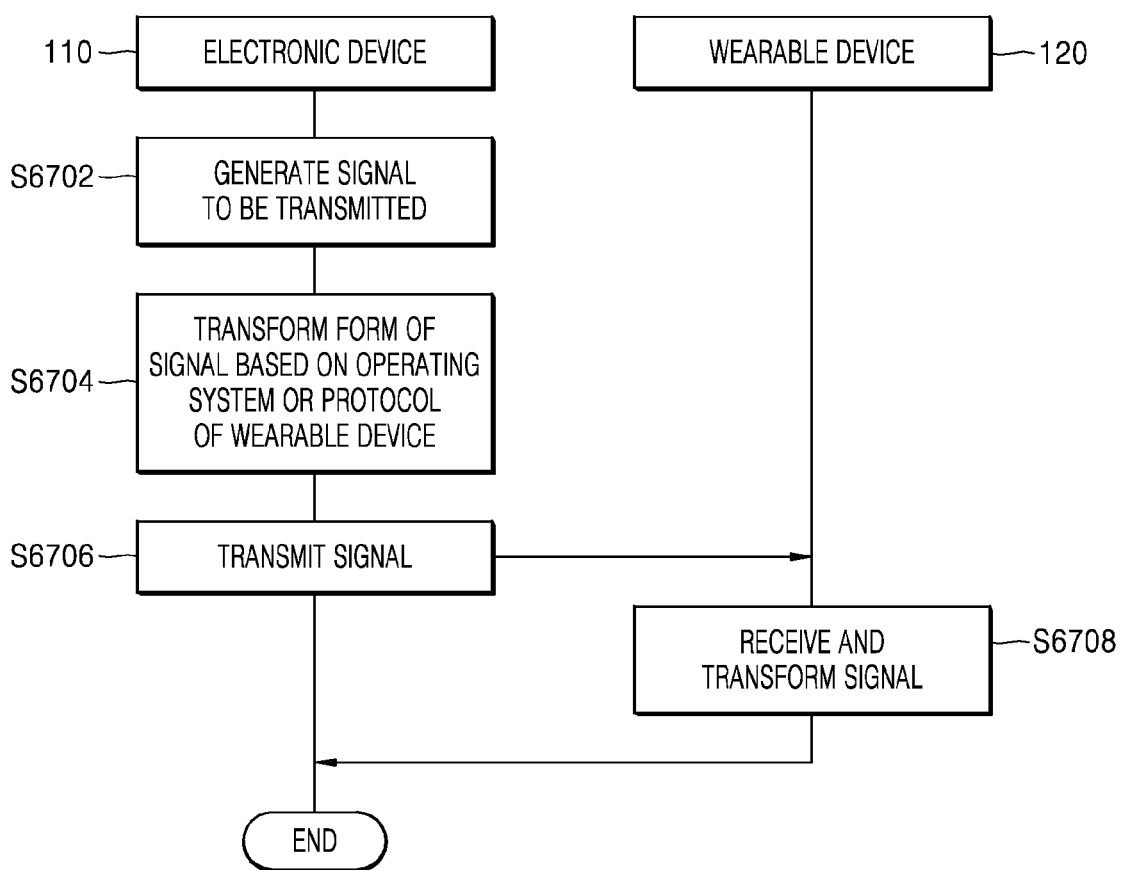
FIG. 67 is a flowchart of a method of transmitting a signal according to an exemplary embodiment.

FIG. 67 is a flowchart of a method of transmitting a signal according to an exemplary embodiment.

If the operating systems or protocols of an electronic device 110 and at least one wearable device 120 are different, when a signal is transmitted between the electronic device 110 and at least one wearable device 120, the form of the signal may be transformed according to the operating system of a device that will receive the signal and then the transformed signal may be transmitted to the device. For example, when the electronic device 110 and the at least one wearable device 120 have different operating systems, the electronic device 110 may generate a signal such as a request for state information, a notification request, etc. (operation S6702), and transform the form of the signal based on the operating system or protocol of the at least one wearable device 120 (operation S6704). The electronic device 110 transmits the transformed signal to the at least one wearable device 120 (operation S6706). The at least one wearable device 120 may receive the transformed signal from the electronic device 110 and transform this signal (operation S6708).

The signal may include a signal such as a notification of a notification event, a request for state information, a notification request, etc. The signal may include data such as a document, a photograph, music, video, etc.

Figure 68:
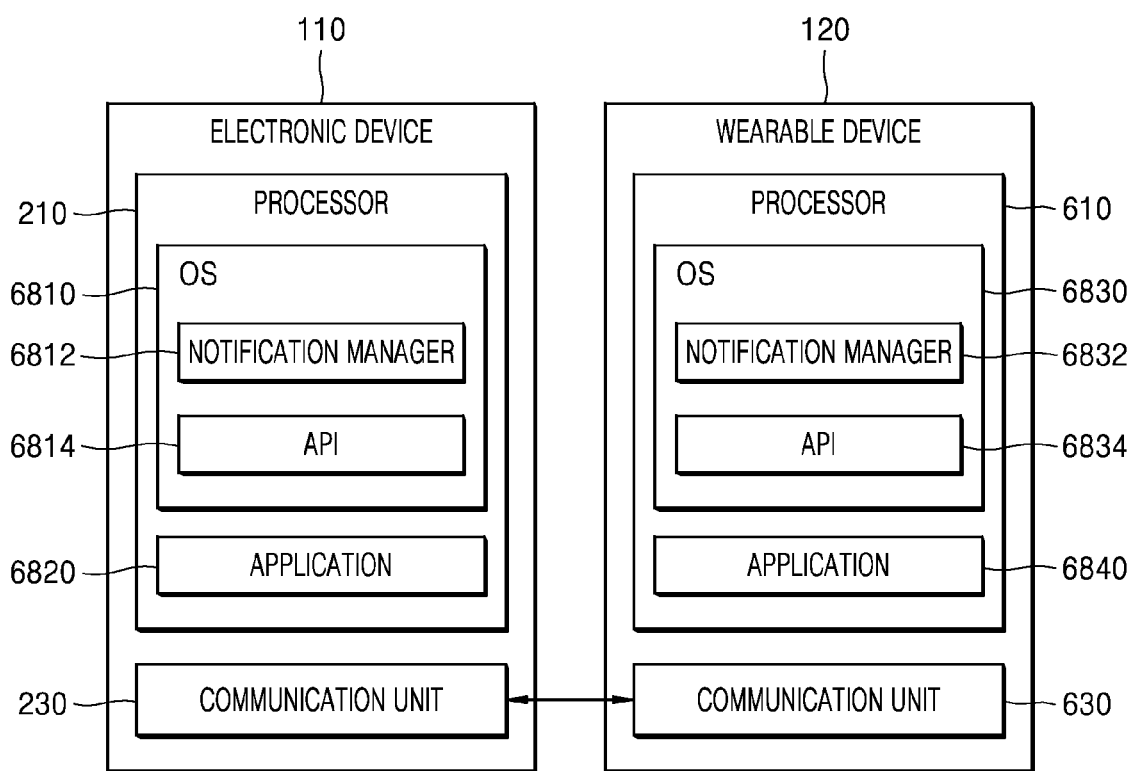
FIG. 68 is a block diagram of structures of an electronic device and a wearable device according to an exemplary embodiment.

FIG. 68 is a block diagram of structures of an electronic device 110 and a wearable device 120 according to an exemplary embodiment.

According to one exemplary embodiment, the transforming of the signal (operation S6704 or S6708) may be performed using an application 6820 installed in the electronic device 110 and/or an application 6840 installed in the wearable device 120.

In the electronic device 110, a notification manager 6812, included in an operating system 6810, controls an operation of determining a device that will provide a notification and/or a form of the notification and providing the notification according to one of the previous exemplary embodiments. The notification manager 6812 generates a control signal related to the notification and transmits a notification request to the application 6820 to the application 6820 via an application programming interface (API) 6814. The application 6820 transforms the form of the control signal transmitted via the API 6814 according to the operating system or protocol of the at least one wearable device 120. The application 6820 transmits the transformed control signal to a communication unit 630 of the wearable device 120 via the communication unit 230.

The at least one wearable device 120 receives the transformed control signal via the communication unit 630 and transmits it to the application 6840. The application 6840 transforms the transformed control signal and transmits a result of transforming the transformed control signal to an API 6834 when the transformed control signal needs to be transformed, and directly transmit the transformed control signal to the API 6834 when the transformed control signal need not be transformed.

The API 6834 transmits the received control signal to a notification manager 6832 included in an operating system 6830 of the wearable device 120. The notification manager 6832 controls an operation related to the notification according to the received control signal.

Similarly, a control signal related to the notification is transmitted from the wearable device 120 to the electronic device 110 via a notification manager 6821, the API 6834, the application 6840, and the communication unit 630. The electronic device 110 receives the control signal related to the notification, which is received via the communication unit 230, from the notification manager 6812 via the application 6820 and the API 6814 and performs an operation related to the notification.

According to one exemplary embodiment, the electronic device 110 and the wearable device 120 may share predetermined criteria (e.g., the predetermined criteria of FIG. 45 or 46) for the form of the notification or set values related to the notification when communication is first established between the electronic device 110 and the wearable device 120 or when the wearable device 120 is first registered with the electronic device 110. For example, the electronic device 110 may transmit the predetermined criteria of FIG. 45 or 46 to the wearable device 120 when communication is first established between the electronic device 110 and the wearable device 120. The notification manager 6812 of the electronic device 110 and the notification manager 6812 of the at least one wearable device 120 may manage and store the shared information related to the notification.

Figure 69:
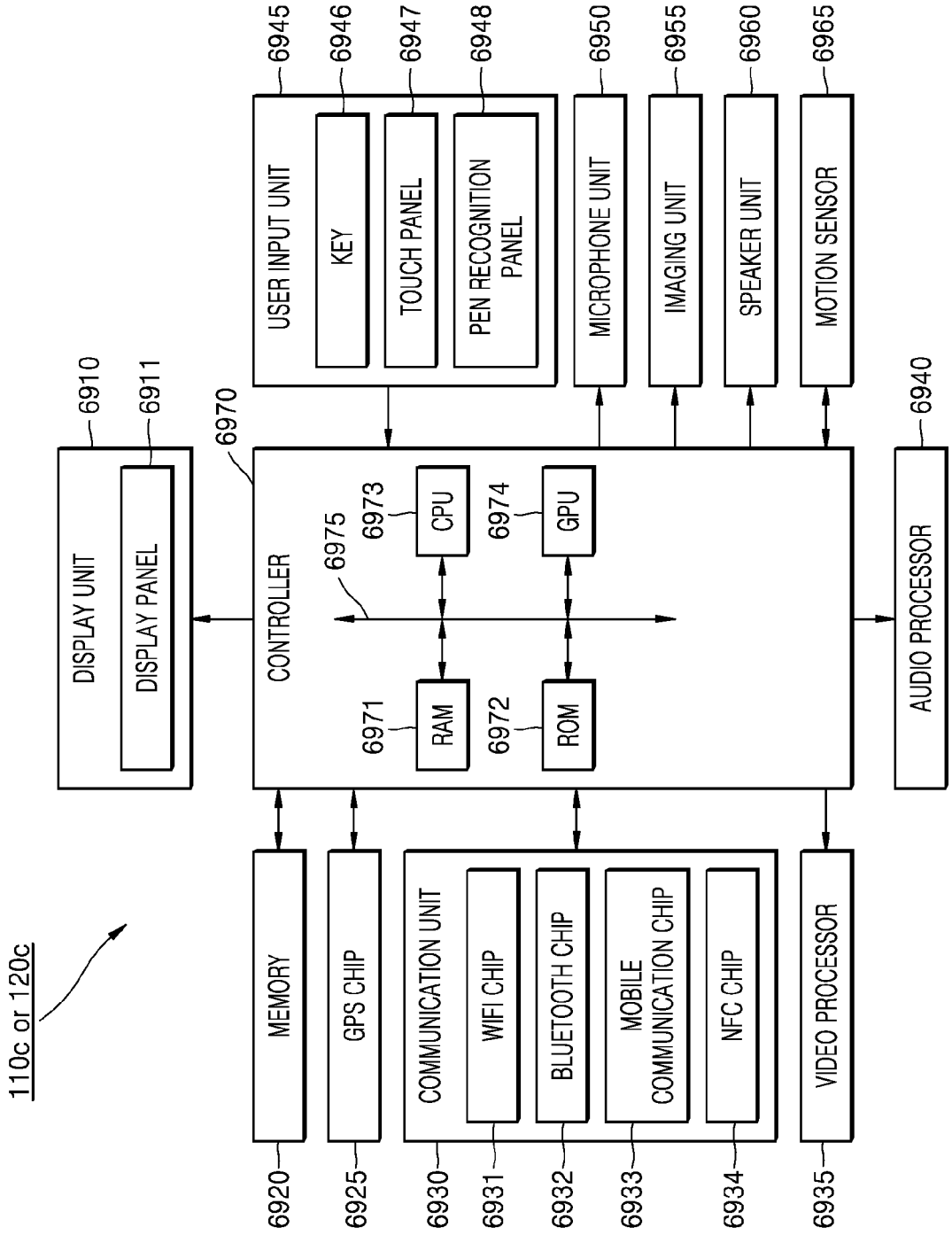
FIG. 69 is a block diagram of a structure of an electronic device or a wearable device according to an exemplary embodiment.

FIG. 69 is a block diagram of a structure of an electronic device 110c or a wearable device 120c according to an exemplary embodiment. The structure of the electronic device 110c or the wearable device 120c illustrated in FIG. 69 may apply to all of the electronic device 110a of FIG. 2, the electronic device 110b of FIG. 20, and the wearable device 120a of FIG. 6, and the wearable device 120b of FIG. 21.

As illustrated in FIG. 69, the structure of the electronic device 110c or the at least one wearable device 120c may apply to various devices, e.g., a mobile phone, a tablet PC, a personal digital assistant (PDA), an MP3 player, a kiosk, an electronic picture frame, a navigation device, a digital TV, or a wearable device such as a wrist watch or a head-mounted display (HMD).

Referring to FIG. 69, the electronic device 110c or the at least one wearable device 120c may include at least one among a display unit 6910, a controller 6970, a memory 6920, a GPS chip 6925, a communication unit 6930, a video processor 6935, an audio processor 6940, a user input unit 6945, a microphone unit 6950, an imaging unit 6955, a speaker unit 6960, and a motion sensor 6965.

The display unit 6910 may include a display panel 6911 and a controller (not shown) for controlling the display panel 6911. The display panel 6911 may be embodied as any of various types of displays such as a liquid crystal display (LCD), an organic light-emitting diode (OLED) display, an active matrix OLED (AM-OLED), a plasma display panel (PDP). The display panel 6911 may be embodied as a flexible, transparent, or wearable display panel. The display unit 6910 may be combined with a touch panel 6947 of the user input unit 6945 to be provided as a touch screen (not shown). For example, the touch screen may include an integral type module in which the display panel 6911 and the touch panel 6947 are combined in an integrated structure.

The memory 6920 may include at least one among an internal memory (not shown) and an external memory (not shown).

The internal memory may include, for example, at least one among a volatile memory (e.g., a dynamic random access memory (DRAM), a static RAM (SRAM), a synchronous DRAM (SDRAM), etc.), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a Flash ROM, etc.), a hard disc drive (HDD), and a solid-state drive (SSD). According to an exemplary embodiment, the controller 6970 may load a command or data received from at least one among a nonvolatile memory and other elements to a volatile memory and process the command or data. The controller 6970 may store data, which is received from or generated by another element, in a nonvolatile memory.

The external memory may include, for example, at least one among a compact flash (CF), a secure digital (SD), a micro-secure digital (micro-SD), a mini-SD, an extreme digital (xD) and a memory stick.

The memory 6920 may store various programs and data for operating the electronic device 110c and the wearable device 120c. For example, the memory 6920 may temporarily or semi-permanently store at least a part of contents to be displayed on a lock screen.

The controller 6970 may control the display unit 6910 to display at least a part of the contents stored in the memory 6920 on the display unit 6910. In other words, the controller

6970 may display some of the contents stored in the memory 6920 on the display unit 6910. Otherwise, when a user makes a gesture on a region of the display unit 6910, the controller 6970 may perform a control operation corresponding to the user's gesture.

The controller 6970 may include at least one among a RAM 6971, a read-only memory (ROM) 6972, a central processing unit (CPU) 6973, a graphic processing unit (GPU) 6974, and a bus 6975. The RAM 6971, the ROM 6972, the CPU 6973, and the GPU 6974 may be connected via the bus 6975.

The CPU 6973 accesses the memory 6920 and boots the system using an operating system (OS) stored in the memory 6920. The CPU 6973 performs various operations using various programs, contents, data, and the like stored in the memory 6920.

Command sets for booting the system are stored in the ROM 6972. For example, when a turn-on command is input to the electronic device 110*c* and the wearable device 120*c* to supply power to the electronic device 110*c* and the wearable device 120*c*, the CPU 6973 copies the OS stored in the memory 6920 to the RAM 6971 according to a command stored in the ROM 6972, and runs the OS to boot the system. When the booting of the system is completed, the CPU 6973 copies the various programs stored in the memory 6920 to the RAM 6971 and runs the various programs copied to the RAM 6971 to perform various operations. When booting of the electronic device 110*c* and the at least one wearable device 120*c* is completed, the GPU 6974 displays a user interface (UI) screen on a region of the display unit 6910. Specifically, the GPU 6974 may create a screen including an electronic document including various objects such as contents, icons, menus, etc. The GPU 6974 calculates attribute values, such as the coordinates, shape, size, and colors of each object, according to the layout of a screen. The GPU 6974 may also create screens including various layouts including objects, based on the calculated attribute values. The screens created by the GPU 6974 may be provided to the display unit 6910 and displayed in regions of the display unit 6910, respectively.

The GPS chip 6925 may receive a global positioning system (GPS) signal from a GPS satellite, and calculate current positions of the electronic device 110*c* and the wearable device 120*c*. The controller 6970 may calculate the position of a user using the GPS chip 6925 when a navigation program is used or when the current position of a user is needed.

The communication unit 6930 may communicate with various external devices according to various communication manners. The communication unit 6930 may include at least one among a WiFi chip 6931, a Bluetooth chip 6932, a mobile communication chip 6933, and an NFC chip 6934. The controller 6970 may communicate with various external devices via the communication unit 6930.

The WiFi chip 6931 and the Bluetooth chip 6932 may establish communication according to a WiFi manner and a Bluetooth manner, respectively. When the WiFi chip 6931 or the Bluetooth chip 6932 is used, various connection information, such as subsystem identification (SSID) and a session key, may first be transmitted/received. Communication may be established using the various connection information, and then various other information may be transmitted/received. The mobile communication chip 6933 means a chip that establishes communication according to various communication standards such as IEEE, Zigbee, 3G, 3G partnership project (3GPP), long-term evolution (LTE), etc. The NFC chip 6934 is a chip that operates according to an NFC method using a frequency of 13.56 MHz among various RF-ID frequencies, e.g., 135 kHz, 13.56 MHz, 433 MHz, 860 to 960 MHz, and 2.45 GHz.

The video processor 6935 may process video data contained in contents received via the communication unit 6930 or contents stored in the memory 6920. The video processor 6935 may perform various image processing, such as decoding, scaling, noise filtering, frame rate conversion, resolution conversion, etc. on video data.

The audio processor 6940 may process audio data contained in contents received via the communication unit 6930 or contents stored in the memory 6920. The audio processor 6940 may perform various processing, such as decoding, amplification, noise filtering, etc., on the audio data.

When a reproduction program related to multimedia contents is run, the controller 6970, the video processor 6935 and the audio processor 6940 may be driven to reproduce the multimedia contents. The speaker unit 6960 may output audio data produced by the audio processor 6940.

The user input unit 6945 may receive various commands from a user. The user input unit 6945 may include at least one among a key 6946, a touch panel 6947, and a pen recognition panel 6948.

The key 6946 may include various types of keys (e.g., mechanical buttons, wheels, etc.) formed in various regions (e.g., a front, side, rear surfaces) of the exterior of a main body of each of the electronic device 6910*c* and the wearable device 120*c*.

The touch panel 6947 may sense a user's touch input and output a touch event value corresponding to a sensed touch signal. When the touch panel 6947 is combined with the display panel 6911 to form a touch screen (not shown), the touch screen may be embodied as various touch sensors such as an electrostatic touch sensor, a pressure-sensitive touch sensor, and a piezoelectric touch sensor. The electrostatic touch sensor calculates the coordinates of a touched point by sensing micro-electricity that occurs on a user's body by using a dielectric coated on a surface of a touch screen when a surface of a touch screen is touched by a part of the user's body. The pressure-sensitive touch sensor includes two electrode plates included in a touch screen, and calculates the coordinates of a touched point by sensing electric current flows when a user touches the touch screen and the upper and lower plates contact on the touched point. In general, a touch event may be generated on the touch screen mainly by a user's finger but may be also generated using a conductive material that may cause a change in an electrostatic capacitance.

The pen recognition panel 6948 may sense a proximity input or a touch input that is input with a user's touch pen (e.g., a stylus pen or a digitizer pen), and output a sensed pen proximity event or a pen touch event. The pen recognition panel 6948 may be embodied, for example, according to an EMR method, and may sense a touch or proximity input according to a change in the intensity of an electromagnetic field, caused when a pen approaches a touch screen or when the touch screen is touched by the pen. In detail, the pen recognition panel 6948 may include an electromagnetic induction coil sensor (not shown) having a grid structure, and an electronic signal processor (not shown) that sequentially supplies an alternate current (AC) signal having a predetermined frequency to loop coils of the electromagnetic induction coil sensor. When a pen including a resonant circuit is located near the loop coil of the pen recognition panel 6948, a magnetic field transmitted from the loop coil generates electric current in the resonant circuit in the pen, based on mutual electromagnetic induction. An induction field is generated from a coil of the resonant circuit in the pen, based on the electric current. The pen recognition panel 6948 may sense a point that a pen approaches or that is touched with the pen by detecting the induction field in the loop coils that is ready to receive a signal. The pen recognition panel 6948 may be prepared to occupy a predetermined region of the bottom of the display panel 6911, e.g., a region covering a display region of the display panel 6911.

The microphone unit 6950 may receive a user's voice or other sound and transform it into audio data. The controller 6970 may use the user's voice input via the microphone unit 6950 to perform a call operation, or transform the user's voice into audio data and store the audio data in the memory 6920.

The imaging unit 6955 may capture a still image or video under control of a user. The imaging unit 6955 may be embodied as, for example, a front camera and a rear camera.

When the imaging unit 6955 and the microphone unit 6950 are prepared, the controller 6970 may perform a control operation according to a user's voice input via the microphone unit 6950 or the user's motion recognized by the imaging unit 6955. For example, the electronic device 110*c* and the wearable device 120*c* may operate in a motion-controlled mode or a voice-controlled mode. When the imaging unit 6955 and the microphone unit 6950 operate in the motion-controlled mode, the controller 6970 may activate the imaging unit 6955 to photograph a user, trace a change in the user's motion, and perform a control operation corresponding to the change in the user's motion. When the imaging unit 6955 and the microphone unit 6950 operate in the voice-controlled mode, the controller 6970 may analyze a user's voice input via the microphone unit 6950, and operate in a voice recognition mode in which a control operation is performed according to the analyzed user's voice.

The motion sensor 6965 may sense motions of the main bodies of the electronic device 110*c* and the at least one wearable device 120*c*. The electronic device 110*c* and the at least one wearable device 120*c* may be rotated or tilted in various directions. In this case, the motion sensor 6965 may sense the features of motions of the main bodies of the electronic device 110*c* and the at least one wearable device 120*c*, such as a direction and angle of rotation, an inclination, etc., by using at least one among various sensors such as a geomagnetic sensor, a gyrosensor, and an acceleration sensor.

In addition, although not shown, in the exemplary embodiment of FIG. 69, the electronic device 110*c* and the at least one wearable device 120*c* may further include a universal serial bus (USB) port to which a USB connector may be connected, various external input ports to which various external terminals (such as a headset, a mouse, a local area network (LAN)) are connected, a DMB chip that receives and processes a digital multimedia broadcasting (DMB) signal, various sensors, etc.

The terms of the elements of the electronic device 110*c* and the at least one wearable device 120*c* described above may, however, be changed. The electronic device 110*c* and the at least one wearable device 120*c* may each include at least one among the elements described above or may further include other elements.

The controller 6970 of FIG. 69 may correspond to the processor 210 of the electronic device 110*a* or 110*b* or the processor 610 of the wearable device 120*a* or 120*b*. The communication unit 6930 of FIG. 69 may correspond to the communication unit 230 of the electronic device 110*a* or 110*b* or the communication unit 630 of the wearable device 120*a* or 120*b*. The display unit 6910 and the speaker unit 6960 of FIG. 69 may correspond to the notification providing unit 220 of the electronic device 110*a* or 110*b* or the notification providing unit 620 of the wearable device 120*a* or 120*b*. The touch panel 6947, the microphone 6950, the imaging unit 6955, and the motion sensor 6965 of FIG. 69 may correspond to the sensor unit 2010 of the electronic device 110*b* and the sensor unit 2110 of the wearable device 120*b*.

As described above, according to the one or more of the above exemplary embodiments, a notification that a user is not likely to check may be prevented from being provided.

According to one or more exemplary embodiments, a probability that a user will immediately check a notification may increase.

According to one or more exemplary embodiments, a notification may be provided such that a user is not interrupted by the notification.

According to one or more exemplary embodiments, a notification may be provided to a wearable device in an appropriate form when an electronic device and the wearable device operate while communicating with each other.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. An electronic device comprising:
a transceiver configured to receive, from a wearable device, status information indicating whether the wearable device is currently being worn; and
a processor configured to:
receive a signal indicating occurrence of an event at the electronic device;
determine whether to send a notification corresponding to the event to the wearable device based on the status information received by the transceiver indicating that the wearable device is currently being worn, in response to the occurrence of the event at the electronic device; and
in response to determining to send the notification to the wearable device based on the status information indicating that the wearable device is currently being worn, control the transceiver to send the notification to the wearable device.

2. The electronic device of claim 1, wherein the event comprises at least one of a text message event, an appointment reminder event, a system event, a social network event, a phone call event, an e-mail event, a low battery event, and a change of setting event.

3. The electronic device of claim 1, wherein the transceiver is further configured to communicate with a plurality of wearable devices including the wearable device, and
wherein the processor is further configured to set an order of notification to the plurality of wearable devices.

4. The electronic device of claim 3, wherein the processor is further configured to determine whether to send the notification to the wearable device of the plurality of wearable devices based on the status information received by the transceiver and the order of notification.

5. The electronic device of claim 3, wherein the processor is further configured to control the transceiver to send a plurality of notifications to the plurality of wearable devices according to the order of notification.

6. The electronic device of claim 1, wherein the status information indicates that the wearable device is currently in use, and
wherein the processor is further configured to determine whether the electronic device is currently in use based on the status information, and in response to determining that the wearable device is currently being worn and determining that the wearable device is currently in use, determine to send the notification to the at least one wearable device and control the transceiver to send the notification to the at least one wearable device.

7. The electronic device of claim 1, wherein the status information indicates that the wearable device is currently in use, and
wherein the processor is further configured to determine whether the electronic device is currently in use based on the status information, and in response to determining that the electronic device is currently in use and determining that the wearable device is currently being worn, control to provide the notification on the electronic device and determine not to control the transceiver to send the notification to the at least one wearable device.

8. The electronic device of claim 1, wherein the status information indicates that the wearable device is currently in use, and
wherein the processor is further configured to determine whether the electronic device is currently in use based on the status information, and in response to determining that the electronic device is currently in use and determining that the wearable device is currently being worn, control the transceiver to send the notification to the at least one wearable device and control not to provide the notification on the electronic device.

9. A method of providing a notification of an electronic device to a wearable device, the method comprising:
receiving a signal indicating occurrence of an event at the electronic device;
receiving, from the wearable device, status information indicating whether the wearable device is currently being worn; and
determining whether to send a notification corresponding to the event to the wearable device based on the status information indicating that the wearable device is currently being worn, in response to the occurrence of the event at the electronic device; and
in response to determining to send the notification to the wearable device based on the status information indicating that the wearable device is currently being worn, transmitting the notification to the wearable device.

10. The method of claim 9, wherein the event comprises at least one of a text message event, an appointment reminder event, a system event, a social network event, a phone call event, an e-mail event, a low battery event, and a change of setting event.

11. The method of claim 9, wherein the receiving comprises receiving, from a plurality of wearable devices including the wearable device, status information indicating whether the plurality of wearable devices are currently being worn, and
wherein the method further comprises setting an order of notification to the plurality of wearable devices.

12. The method of claim 11, wherein the determining comprises determining whether to send the notification to the wearable device from among the plurality of wearable devices based on the status information and the order of notification.

13. The method of claim 11, wherein the transmitting comprises transmitting a plurality of notifications to the plurality of wearable devices according to the order of notification.

14. The method of claim 9, wherein the status information indicates that the wearable device is currently in use,
wherein the determining comprises determining whether the electronic device is currently in use based on the status information, and
wherein the transmitting comprises in response to determining that the wearable device is currently being worn and determining that the wearable device is currently in use, transmitting the notification to the wearable device.

15. The method of claim 9, wherein the status information indicates that the wearable device is currently in use,
wherein the determining comprises determining whether the electronic device is currently in use based on the status information, and
wherein the transmitting comprises transmitting the notification to the wearable device based on the status information indicating that the electronic device is currently in use and the electronic device is currently being worn.

16. The method of claim 15, further comprising providing the notification on the electronic device in response to determining the electronic device is currently in use.

17. A non-transitory computer readable medium comprising instructions executable by a computer to perform the method of claim 9.

* * * * *